(12) United States Patent
Chen et al.

(10) Patent No.: US 10,520,704 B2
(45) Date of Patent: Dec. 31, 2019

(54) OPTICAL IMAGE ASSEMBLY, IMAGE CAPTURING APPARATUS AND ELECTRONIC DEVICE

(71) Applicant: LARGAN PRECISION CO., LTD., Taichung (TW)

(72) Inventors: Chun-Yen Chen, Taichung (TW); Shu-Yun Yang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 240 days.

(21) Appl. No.: 15/611,101

(22) Filed: Jun. 1, 2017

(65) Prior Publication Data

US 2018/0203207 A1 Jul. 19, 2018

(30) Foreign Application Priority Data

Jan. 19, 2017 (TW) .............................. 106101902 A

(51) Int. Cl.
*G02B 13/18* (2006.01)
*G02B 3/02* (2006.01)
*G02B 13/00* (2006.01)
*G02B 13/16* (2006.01)

(52) U.S. Cl.
CPC .......... *G02B 13/0045* (2013.01); *G02B 13/16* (2013.01)

(58) Field of Classification Search
CPC .... G02B 13/0045; G02B 13/16; G02B 13/18; G02B 13/04; G02B 9/62; G02B 7/028
See application file for complete search history.

(56) References Cited

U.S. PATENT DOCUMENTS

| | | | |
|---|---|---|---|
| 3,784,286 A | 1/1974 | Dudragne | |
| 4,934,771 A | 6/1990 | Rogers | |
| 5,617,254 A | 4/1997 | Ohashi | |
| 5,933,284 A | 8/1999 | Narumi | |
| 8,456,763 B2 * | 6/2013 | Hsieh ...................... | G02B 9/62 359/753 |
| 8,743,482 B1 | 6/2014 | Tsai et al. | |
| 8,780,457 B2 | 7/2014 | Tang et al. | |
| 8,908,295 B1 | 12/2014 | Tsai et al. | |
| 9,063,271 B2 | 6/2015 | Huang | |
| 9,140,878 B2 | 9/2015 | Chen | |
| 9,804,380 B2 | 10/2017 | Igarashi | |

(Continued)

FOREIGN PATENT DOCUMENTS

| | | |
|---|---|---|
| CN | 201837770 U | 5/2011 |
| CN | 205193336 U | 4/2016 |

(Continued)

*Primary Examiner* — Alicia M Harrington
(74) *Attorney, Agent, or Firm* — McClure, Qualey & Rodack, LLP

(57) ABSTRACT

An optical image assembly includes six lens elements, which are, in order from an object side to an image side, a first lens element, a second lens element, a third lens element, a fourth lens element, a fifth lens element and a sixth lens element. The second lens element with negative refractive power has an object-side surface being concave in a paraxial region thereof and an image-side surface being convex in a paraxial region thereof. The third lens element has positive refractive power. The fourth lens element has positive refractive power. The fifth lens element has positive refractive power. The sixth lens element has negative refractive power.

25 Claims, 33 Drawing Sheets

(56) References Cited

U.S. PATENT DOCUMENTS

2012/0057251 A1   3/2012  Takato
2015/0338614 A1  11/2015  Tang et al.
2016/0091694 A1   3/2016  Tang et al.
2016/0124184 A1   5/2016  Tang et al.
2017/0269327 A1   9/2017  Mori

FOREIGN PATENT DOCUMENTS

| JP | 63-311224 A | 12/1988 |
| JP | 02-010307 A | 1/1990 |
| JP | 02-050119 A | 2/1990 |
| JP | 04-124607 A | 4/1992 |
| JP | 05-289147 A | 11/1993 |
| JP | 07-306361 A | 11/1995 |
| JP | 08-234104 A | 9/1996 |
| JP | 11-337819 A | 12/1999 |
| JP | 2014115431 A | 6/2014 |
| WO | 2016190184 A1 | 12/2016 |

* cited by examiner

OPTICAL IMAGE ASSEMBLY, IMAGE CAPTURING APPARATUS AND ELECTRONIC DEVICE

RELATED APPLICATIONS

This application claims priority to Taiwan Application Serial Number 106101902, filed Jan. 19, 2017, which is herein incorporated by reference.

BACKGROUND

Technical Field

The present disclosure relates to an optical image assembly and an image capturing apparatus. More particularly, the present disclosure relates to an optical image assembly and an image capturing apparatus with a compact size applicable to electronic devices.

Description of Related Art

In response to various market demands, specifications of photographing modules have become strict. It is difficult for reducing the size of products with conventional lens assemblies due to the limited shape of lens elements and variation of material thereof, and it is also hard to obtain balance among molding of lens elements, convenience of assembling and sensitivity thereof. Moreover, under different environmental conditions, to maintain normal operation of lens assemblies and good image quality is an indispensable factor of current photographing modules. Hence, one lens assembly which has sufficient field of view, compactness, anti-environmental change and high image quality will fully satisfy market specifications and demands.

SUMMARY

According to one aspect of the present disclosure, an optical image assembly includes six lens elements, the six lens elements being, in order from an object side to an image side, a first lens element, a second lens element, a third lens element, a fourth lens element, a fifth lens element and a sixth lens element. The second lens element with negative refractive power has an object-side surface being concave in a paraxial region thereof and an image-side surface being convex in a paraxial region thereof. The third lens element has positive refractive power. The fourth lens element has positive refractive power. The fifth lens element has positive refractive power. The sixth lens element has negative refractive power. When a sum of central thicknesses of the lens elements of the optical image assembly is ΣCT, a sum of axial distances between every two of the lens elements of the optical image assembly that are adjacent to each other is ΣAT, a focal length of the first lens element is f1, a focal length of the second lens element is f2, a focal length of the optical image assembly is f, and a curvature radius of an object-side surface of the fifth lens element is R9, the following conditions are satisfied:

$1.20 < \Sigma CT/\Sigma AT < 5.50;$ $-0.38 < f2/f1 < 15.0;$ and $-1.30 < f/R9 < 5.0.$ According to another aspect of the present disclosure, an image capturing apparatus includes the optical image assembly of the aforementioned aspect and an image sensor, wherein the image sensor is disposed on an image surface of the optical image assembly.

According to another aspect of the present disclosure, an electronic device includes the image capturing apparatus of the aforementioned aspect.

According to another aspect of the present disclosure, an optical image assembly includes six lens elements, the six lens elements being, in order from an object side to an image side, a first lens element, a second lens element, a third lens element, a fourth lens element, a fifth lens element and a sixth lens element. The first lens element has negative refractive power. The second lens element with negative refractive power has an object-side surface being concave in a paraxial region thereof and an image-side surface being convex in a paraxial region thereof. The third lens element has positive refractive power. The fourth lens element has positive refractive power. The fifth lens element has positive refractive power. The sixth lens element has negative refractive power. When a focal length of the optical image assembly is f, a curvature radius of the object-side surface of the second lens element is R3, and a curvature radius of the image-side surface of the second lens element is R4, the following condition is satisfied:

$-9.0 < f/R3 + f/R4 < -1.10.$

According to another aspect of the present disclosure, an optical image assembly includes six lens elements, the six lens elements being, in order from an object side to an image side, a first lens element, a second lens element, a third lens element, a fourth lens element, a fifth lens element and a sixth lens element. The second lens element with negative refractive power has an object-side surface being concave in a paraxial region thereof and an image-side surface being convex in a paraxial region thereof. The third lens element has positive refractive power. The fourth lens element has positive refractive power. The fifth lens element has positive refractive power. The sixth lens element with negative refractive power has an image-side surface being convex in a paraxial region thereof, wherein the image-side surface of the sixth lens element includes a concave shape in an off-axial region thereof.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
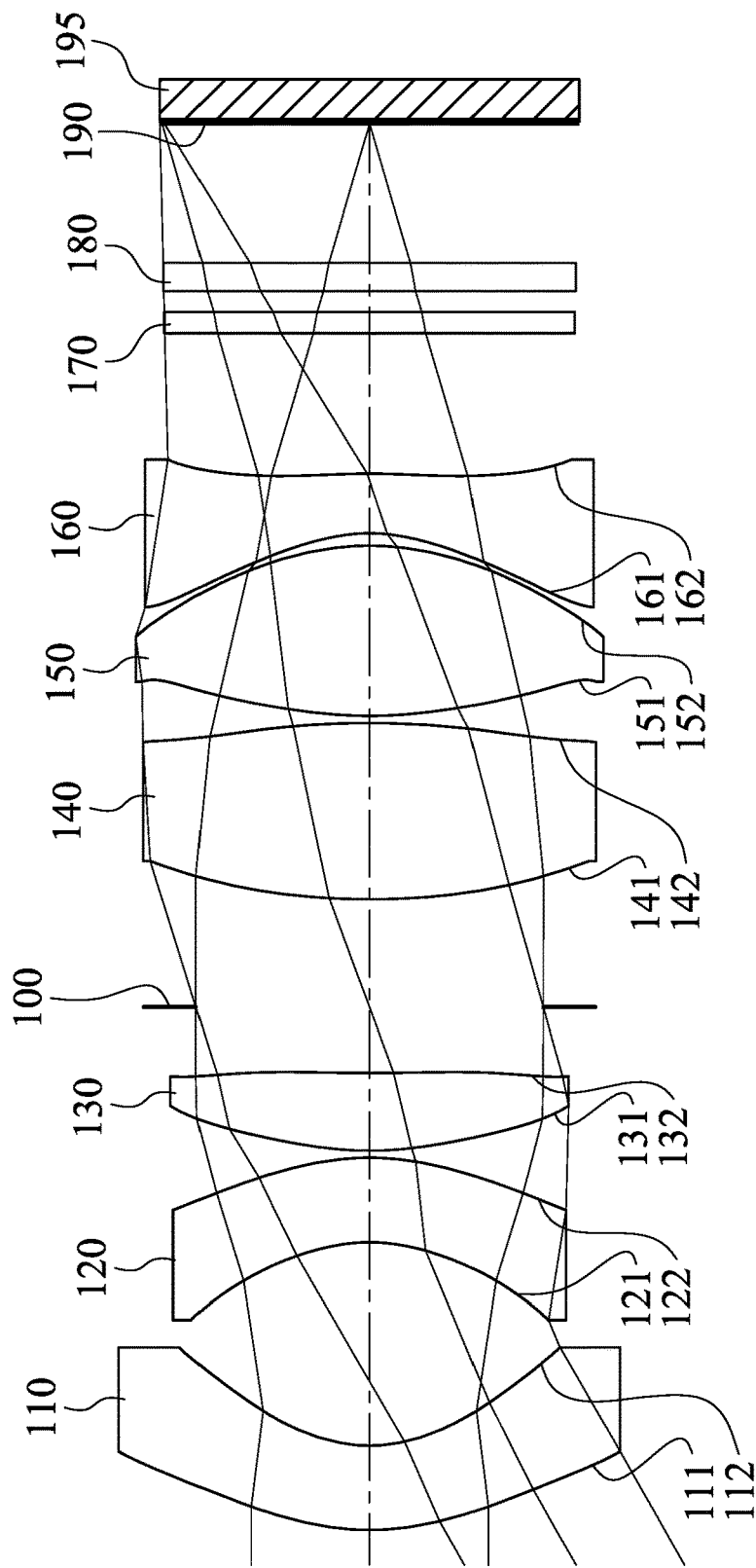
FIG. 1 is a schematic view of an image capturing apparatus according to the 1st embodiment of the present disclosure.

An optical image assembly includes six lens elements, which are, in order from an object side to an image side, a first lens element, a second lens element, a third lens element, a fourth lens element, a fifth lens element and a sixth lens element.

The first lens element can have negative refractive power so as to enlarge the photographing range of the optical image assembly.

The second lens element has negative refractive power, so that it is not only favorable for light entry into the optical image assembly, but also favorable for correcting chromatic aberrations thereof so as to maintain good image quality. The second lens element has an object-side surface being concave in a paraxial region thereof and an image-side surface being convex in a paraxial region thereof. Therefore, it is favorable for correcting astigmatism and further optimizing the image quality.

The third lens element has positive refractive power, so that the negative refractive power on the object side of the optical image assembly can be balanced so as to adapt changes of different environments, and the application range of the optical image assembly applied to various electronic devices can be enlarged.

The fourth lens element has positive refractive power, so that it is favorable for avoiding excessive aberrations by distributing the arrangement of refractive power effectively so as to improve the image quality.

The fifth lens element has positive refractive power, so that the main light converging ability of the optical image assembly can be provided for controlling the total track length thereof so as to obtain compactness. The fifth lens element can have an image-side surface being convex in a paraxial region thereof. Therefore, the arrangement of the refractive power of the fifth lens element can be intensified by controlling the shape of the image-side surface thereof, so that it is more favorable for avoiding the image distortion by correcting the chromatic aberrations.

The sixth lens element has negative refractive power, so that the positive refractive power of the fifth lens element can be balanced and the chromatic aberrations can be corrected effectively so as to avoid the image overlay. The sixth lens element has an object-side surface being concave in a paraxial region thereof, so that the refractive power of the sixth lens element can be intensified by controlling the shape of the object-side surface thereof, and it is more favorable for avoiding the image distortion by correcting the chromatic aberrations. The sixth lens element has an image-side surface being convex and including a concave shape in an off-axial region thereof. Therefore, the incident angle of the off-axial field of view on the image surface can be reduced by adjusting the shape variation of the image-side surface of the sixth lens element, so that the imaging illumination can be maintained and the off-axial aberrations can be corrected for enhancing the image quality.

When a sum of central thicknesses of the lens elements of the optical image assembly is $\Sigma CT$, and a sum of axial distances between every two of the lens elements of the optical image assembly that are adjacent to each other is $\Sigma AT$, the following condition is satisfied: $1.20<\Sigma CT/\Sigma AT<5.50$. Therefore, it is favorable for obtaining the balance between the usage rate of space and compactness of the optical image assembly by adjusting the ratio between the sum of lens thicknesses and the sum of distances between every two lens elements, and it is further favorable for increasing yield rates in lens manufacturing and assembling so as to apply to various products. Preferably, the following condition can be satisfied: $1.40<\Sigma CT/\Sigma AT<4.50$.

When a focal length of the first lens element is f1, and a focal length of the second lens element is f2, the following condition is satisfied: $-0.38<f2/f1<15.0$. Therefore, the sensitivity on the object side of the optical image assembly can be reduced by balancing the refractive power of the first lens element and the second lens element, and it is favorable for light entry into the optical image assembly and maintaining good image quality. Preferably, the following condition can be satisfied: $-0.25<f2/f1<8.50$. More preferably, the following condition can be satisfied: $-0.10<f2/f1<4.50$.

When a focal length of the optical image assembly is f, and a curvature radius of an object-side surface of the fifth lens element is R9, the following condition is satisfied: $-1.30<f/R9<5.0$. Therefore, it is favorable for cooperating to the sixth lens element by positioning the principal point of the fifth lens element closer to the image side so as to obtain better image quality. Preferably, the following condition can be satisfied: $-0.90<f/R9<3.50$. More preferably, the following condition can be satisfied: $-0.50<f/R9<2.0$.

When the focal length of the optical image assembly is f, a curvature radius of the object-side surface of the second lens element is R3, and a curvature radius of the image-side surface of the second lens element is R4, the following condition is satisfied: $-9.0<f/R3+f/R4<-1.10$. Therefore, it is favorable for light entry into the optical image assembly and correcting the astigmatism effectively by controlling the surface curvature of the second lens element so as to enhance the image quality. Preferably, the following condition can be satisfied: $-7.5<f/R3+f/R4<-1.50$.

When the focal length of the optical image assembly is f, and the focal length of the first lens element is f1, the following condition is satisfied: $-0.95<f/f1<0.40$. Therefore, it is favorable for light entry into the optical image assembly and reducing the sensitivity thereof by controlling the distribution of the refractive power of the first lens element.

The optical image assembly can further include an aperture stop. When an axial distance between the aperture stop and an image surface is SL, and an axial distance between an object-side surface of the first lens element and the image surface is TL, the following condition is satisfied: $0<SL/TL<0.75$. Therefore, the symmetrical property of the optical image assembly can be strengthened by balancing the location of the aperture stop, so that demands of the sufficient field of view and high image quality can be both satisfied.

When an axial distance between the first lens element and the second lens element is T12, and an axial distance between the second lens element and the third lens element is T23, the following condition is satisfied: $0.01<T23/T12<0.40$. Therefore, it is favorable for enhancing the yield rate of assembling and minimizing the optical image assembly by properly distributing the distances of the lens elements on the object side thereof so as to widen the utilization of the electronic devices.

When an Abbe number of the second lens element is V2, and an Abbe number of the sixth lens element is V6, the following condition is satisfied: $0<(V2+V6)/2<25.0$. Therefore, it is favorable for correcting the chromatic aberrations of the optical image assembly effectively by distributing materials of the second lens element and the sixth lens element so as to avoid image overlay and enhance image quality.

When an f-number of the optical image assembly is Fno, and an Abbe number of the fifth lens element is V5, the following condition is satisfied: $0.10<10\times Fno/V5<0.35$. Therefore, the distributions of the size of the aperture stop and the material of the fifth lens element can be balanced, and it is favorable for the image capturing apparatus including the optical image assembly to obtain sufficient information under situations such as insufficient external light source (i.e. nighttime), the scene contrast is too obvious (i.e. under the burning sun, capturing the image of the object under the shadow) or dynamic photographing (under short exposure time) etc., so that the electronic device including the image capturing apparatus can obtain the image with certain quality after calculate by the processor so as to increase the using opportunity thereof.

When a maximum effective radius of an object-side surface of the first lens element is SD11, and a maximum effective radius of the image-side surface of the sixth lens element is SD62, the following condition is satisfied: $0.10<SD62/SD11<0.95$. Therefore, the ratio of maximum effective radius of each lens element on the object side and the image side of the optical image assembly can be adjusted so as to moderate the light path, which is favorable for reducing the stray light and avoiding the unwanted light spot.

When a maximum effective radius of the image-side surface of the sixth lens element is SD62, and an entrance pupil diameter of the optical image assembly is EPD, the following condition is satisfied: $1.35<(2\times SD62)/EPD<2.30$. Therefore, the ratio of the maximum effective radius of the image-side surface of the sixth lens element and the entrance pupil diameter of the optical image assembly can be adjusted which is favorable for facilitating miniaturization and increasing the flexibility of the mechanical design.

When half of a maximum field of view of the optical image assembly is HFOV, the following condition is satisfied: $0.35<\tan(HFOV)<1.0$. Therefore, it is favorable for controlling the field of view of the optical image assembly so as to satisfy the wider application.

At least one of the lens elements of the optical image assembly has at least one surface comprising at least one inflection point. Therefore, it is favorable for reducing the number of lens elements of the optical image assembly and maintaining the image quality in the off-axial region thereof by arranging lens surface with inflection point, so that the cost and the total track length can be both reduced for obtaining compactness.

When a displacement in parallel with an optical axis from an axial vertex on an image-side surface of the fifth lens element to a maximum effective radius position on the image-side surface of the fifth lens element is SAG52, and a displacement in parallel with an optical axis from an axial vertex on an object-side surface of the sixth lens element to a maximum effective radius position on the object-side surface of the sixth lens element is SAG61, the following condition is satisfied: $1.0<SAG52/SAG61<2.30$. Therefore, it is favorable for moderating the light path on the image side of the optical image assembly and the incident angle on the image surface by adjusting the shape of the image-side surface of the fifth lens element and the object-side surface of the sixth lens element, so that the illumination on the image surface can be increased effectively, and the image resolution and the image quality can be further enhanced.

When the curvature radius of the object-side surface of the fifth lens element is R9, and a curvature radius of an image-side surface of the fifth lens element is R10, the following condition is satisfied: $-1.80<(R9+R10)/(R9-R10)<1.80$. Therefore, it is favorable for strengthening the symmetrical property of the optical image assembly and the convergence of the light by adjusting the surface shape of the fifth lens element.

When a curvature radius of the object-side surface of the sixth lens element is R11, and a curvature radius of an image-side surface of the sixth lens element is R12, the following condition is satisfied: $-4.50<(R11+R12)/(R11-R12)<-0.30$. Therefore, the optical image assembly can obtain sufficient back focal length for placing other optical elements by controlling the curvatures of the surfaces of the sixth lens element so as to increase the flexibility of design.

When an axial distance between the first lens element and the second lens element is T12, and the focal length of the optical image assembly is f, the following condition is satisfied: $0<T12/f<0.95$. Therefore, it is favorable for the optical image assembly to obtain proper balance among good image quality, yield rate of assembling and compactness by adjusting the distance between the first lens element and the second lens element.

When a refractive power of the first lens element is P1, a refractive power of the second lens element is P2, a refractive power of the third lens element is P3, a refractive power of the fourth lens element is P4, a refractive power of the fifth lens element is P5, and a refractive power of the sixth lens element is P6, the following condition is satisfied: $(|P1|+|P2|+|P3|+|P4|)/(|P5|+|P6|)<1.65$. Therefore, by adjusting the distribution of the refractive power of each lens element, the ability of aberration correction on the object side of the optical image assembly can be enhanced, and the refractive power of the lens elements on the image side of the optical image assembly can be strengthened so as to reduce the total track length. Thus, the compactness can be obtained and the chromatic aberration can be corrected.

When a refractive index of the first lens element is N1, and a refractive index of the third lens element is N3, the following condition is satisfied: $1.750<(N1+N3)/2$. Therefore, it is favorable for the optical image assembly to maintain normal operation in different environments (such as different temperature, humidity, pH, etc.) by properly arranging the material of the first lens element and the third lens element so as to effectively increase the application range thereof.

When a vertical distance between an inflection point closest to an optical axis on the image-side surface of the sixth lens element and the optical axis is Yp62, and the focal length of the optical image assembly is f, the following condition is satisfied: $0<Yp62/f<1.0$. Therefore, it is favorable for correcting the off-axial aberrations by effectively controlling the shape in the off-axial region of the image-side surface of the sixth lens element so as to optimize the image quality.

Each of the aforementioned features of the optical image assembly can be utilized in numerous combinations, so as to achieve the corresponding effects.

According to the optical image assembly of the present disclosure, the lens elements thereof can be made of glass or plastic materials. When the lens elements are made of glass materials, the distribution of the refractive power of the optical image assembly may be more flexible to design. When the lens elements are made of plastic materials, manufacturing costs can be effectively reduced. Furthermore, surfaces of each lens element can be arranged to be aspheric, since the aspheric surface of the lens element is easy to form a shape other than a spherical surface so as to have more controllable variables for eliminating aberrations thereof, and to further decrease the required amount of lens elements in the optical image assembly. Therefore, the total track length of the optical image assembly can also be reduced.

According to the optical image assembly of the present disclosure, each of an object-side surface and an image-side surface has a paraxial region and an off-axial region. The paraxial region refers to the region of the surface where light rays travel close to an optical axis, and the off-axial region refers to the region of the surface away from the paraxial region. Particularly unless otherwise stated, when the lens element has a convex surface, it indicates that the surface can be convex in the paraxial region thereof; when the lens element has a concave surface, it indicates that the surface can be concave in the paraxial region thereof. According to the optical image assembly of the present disclosure, the refractive power or the focal length of a lens element being positive or negative may refer to the refractive power or the focal length in a paraxial region of the lens element.

According to the optical image assembly of the present disclosure, the optical image assembly can include at least one stop, such as an aperture stop, a glare stop or a field stop. Said glare stop or said field stop is for eliminating the stray light and thereby improving the image resolution thereof.

According to the optical image assembly of the present disclosure, the image surface of the optical image assembly, based on the corresponding image sensor, can be flat or curved. In particular, the image surface can be a concave curved surface facing towards the object side.

According to the optical image assembly of the present disclosure, an aperture stop can be configured as a front stop or a middle stop. A front stop disposed between an object and the first lens element can provide a longer distance between an exit pupil of the optical image assembly and the image surface, and thereby obtains a telecentric effect and improves the image-sensing efficiency of the image sensor, such as CCD or CMOS. A middle stop disposed between the first lens element and the image surface is favorable for enlarging the field of view of the optical image assembly and thereby provides a wider field of view for the same.

According to the optical image assembly of the present disclosure, the optical image assembly can be applied to 3D (three-dimensional) image capturing applications, in products such as car lens assemblies, ADAS (Advanced Driver Assistance Systems), recognition devices, multiple lens devices, various smart electronic devices, wearable devices, digital cameras, surveillance systems, human-computer interaction platform and so on.

According to the present disclosure, an image capturing apparatus is provided. The image capturing apparatus includes the aforementioned optical image assembly and an image sensor, wherein the image sensor is disposed on the image side of the aforementioned optical image assembly, that is, the image sensor can be disposed on or near the image surface of the aforementioned optical image assembly. By the arrangement of the refractive power of the second to sixth lens elements, it is favorable for applying to various electronic devices which has good image quality and compactness. Preferably, the image capturing apparatus can further include a barrel member, a holder member or a combination thereof.

According to the present disclosure, an electronic device is provided, which includes the aforementioned image capturing apparatus. Preferably, the electronic device can further include but not limited to a control unit, a display, a storage unit, a random access memory unit (RAM) or a combination thereof.

According to the above description of the present disclosure, the following 1st-16th specific embodiments are provided for further explanation.

1st Embodiment

Figure 2:
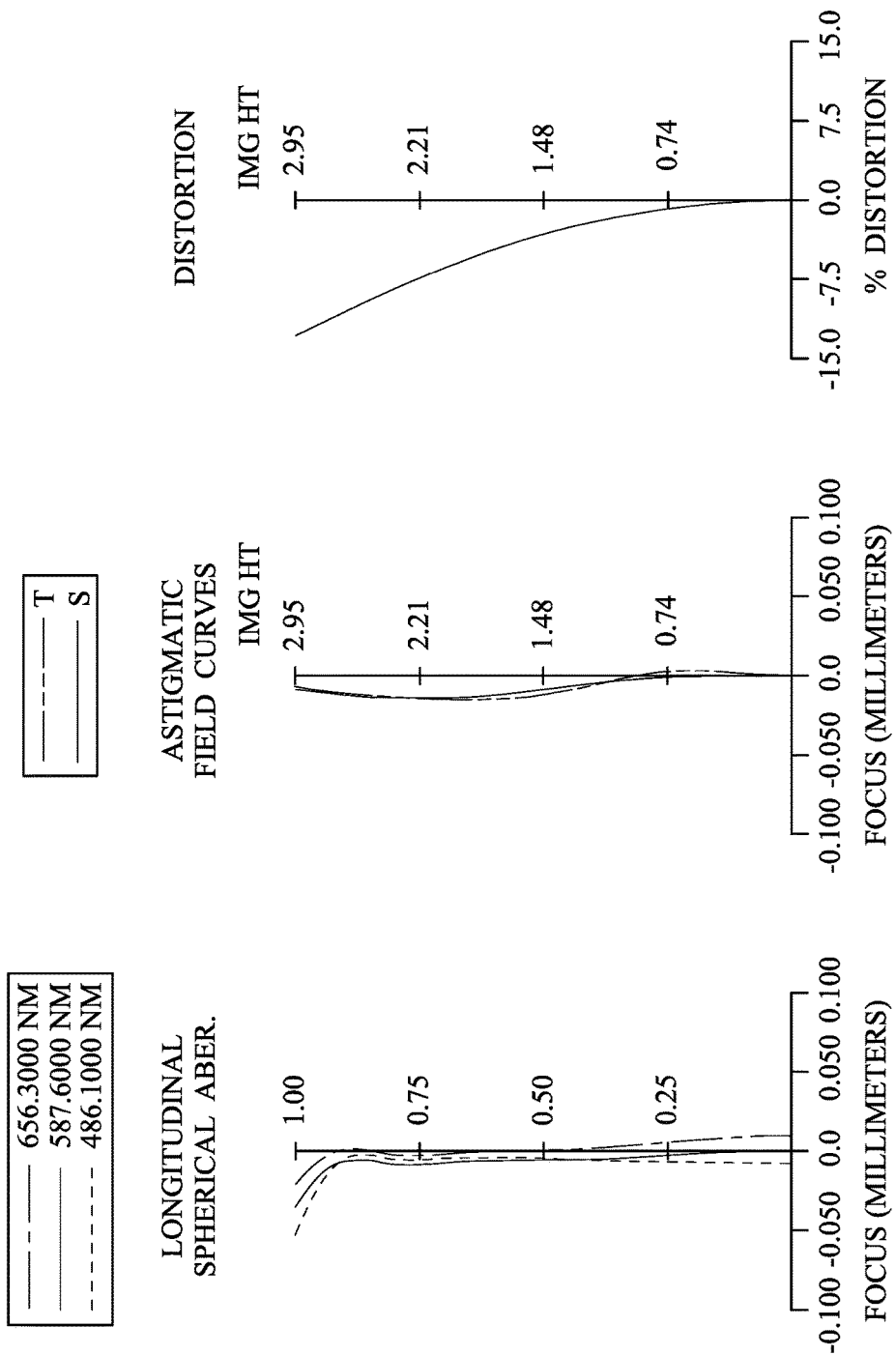
FIG. 2 shows spherical aberration curves, astigmatic field curves and a distortion curve of the image capturing apparatus according to the 1st embodiment.

FIG. 1 is a schematic view of an image capturing apparatus according to the 1st embodiment of the present disclosure. FIG. 2 shows spherical aberration curves, astigmatic field curves and a distortion curve of the image capturing apparatus according to the 1st embodiment. In FIG. 1, the image capturing apparatus includes an optical image assembly (its reference numeral is omitted) and an image sensor 195. The optical image assembly includes, in order from an object side to an image side, a first lens element 110, a second lens element 120, a third lens element 130, an aperture stop 100, a fourth lens element 140, a fifth lens element 150, a sixth lens element 160, a filter 170, a cover glass 180 and an image surface 190, wherein the image sensor 195 is disposed on the image surface 190 of the optical image assembly. The optical image assembly includes six lens elements (110, 120, 130, 140, 150, and 160) without additional one or more lens elements inserted between the first lens element 110 and the sixth lens element 160.

The first lens element 110 with negative refractive power has an object-side surface 111 being convex in a paraxial region thereof and an image-side surface 112 being concave in a paraxial region thereof. The first lens element 110 is made of a plastic material, and has the object-side surface 111 and the image-side surface 112 being both aspheric. Furthermore, the object-side surface 111 includes at least one inflection point.

The second lens element 120 with negative refractive power has an object-side surface 121 being concave in a paraxial region thereof and an image-side surface 122 being convex in a paraxial region thereof. The second lens element 120 is made of a plastic material, and has the object-side surface 121 and the image-side surface 122 being both aspheric. Furthermore, the image-side surface 122 includes at least one inflection point.

The third lens element 130 with positive refractive power has an object-side surface 131 being convex in a paraxial region thereof and an image-side surface 132 being concave in a paraxial region thereof. The third lens element 130 is made of a plastic material, and has the object-side surface 131 and the image-side surface 132 being both aspheric. Furthermore, the image-side surface 132 includes at least one inflection point.

The fourth lens element 140 with positive refractive power has an object-side surface 141 being convex in a paraxial region thereof and an image-side surface 142 being convex in a paraxial region thereof. The fourth lens element 140 is made of a plastic material, and has the object-side surface 141 and the image-side surface 142 being both aspheric. Furthermore, each of the object-side surface 141 and the image-side surface 142 includes at least one inflection point.

The fifth lens element 150 with positive refractive power has an object-side surface 151 being convex in a paraxial region thereof and an image-side surface 152 being convex in a paraxial region thereof. The fifth lens element 150 is made of a plastic material, and has the object-side surface 151 and the image-side surface 152 being both aspheric.

The sixth lens element 160 with negative refractive power has an object-side surface 161 being concave in a paraxial region thereof and an image-side surface 162 being convex in a paraxial region thereof. The sixth lens element 160 is made of a plastic material, and has the object-side surface 161 and the image-side surface 162 being both aspheric. Furthermore, each of the object-side surface 161 and the image-side surface 162 includes at least one inflection point, and the image-side surface 162 includes a concave shape in an off-axial region thereof.

The filter 170 is made of a glass material, and the filter 170 and the cover glass 180 are located between the sixth lens element 160 and the image surface 190 in order, and will not affect the focal length of the optical image assembly.

The equation of the aspheric surface profiles of the aforementioned lens elements of the 1st embodiment is expressed as follows:

$$X(Y)=(Y^2/R)/(1+\text{sqrt}(1-(1+k)\times(Y/R)^2))+\Sigma(Ai)\times(Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical image assembly according to the 1st embodiment, when a focal length of the optical image assembly is f, an f-number of the optical image assembly is Fno, and half of a maximum field of view of the optical image assembly is HFOV, these parameters have the following values: f=5.99 mm; Fno=1.78; and HFOV=29.5 degrees.

In the optical image assembly according to the 1st embodiment, when half of a maximum field of view of the optical image assembly is HFOV, the following condition is satisfied: tan(HFOV)=0.57.

In the optical image assembly according to the 1st embodiment, when an Abbe number of the second lens element 120 is V2, and an Abbe number of the sixth lens element 160 is V6, the following condition is satisfied: (V2+V6)/2=23.50.

In the optical image assembly according to the 1st embodiment, when the f-number of the optical image assembly is Fno, and an Abbe number of the fifth lens element 150 is V5, the following condition is satisfied: 10×Fno/V5=0.32.

In the optical image assembly according to the 1st embodiment, when a refractive index of the first lens element 110 is N1, and a refractive index of the third lens element 130 is N3, the following condition is satisfied: (N1+N3)/2=1.545.

In the optical image assembly according to the 1st embodiment, when an axial distance between the first lens element 110 and the second lens element 120 is T12, and an axial distance between the second lens element 120 and the third lens element 130 is T23, the following condition is satisfied: T23/T12=0.03.

In the optical image assembly according to the 1st embodiment, when a central thickness of the first lens element 110 is CT1, a central thickness of the second lens element 120 is CT2, a central thickness of the third lens element 130 is CT3, a central thickness of the fourth lens element 140 is CT4, a central thickness of the fifth lens element 150 is CT5, a central thickness of the sixth lens element 160 is CT6, a sum of central thicknesses of the lens elements of the optical image assembly is ΣCT (that is, ΣCT=CT1+CT2+CT3+CT4+CT5+CT6), the axial distance between the first lens element 110 and the second lens element 120 is T12, the axial distance between the second lens element 120 and the third lens element 130 is T23, an axial distance between the third lens element 130 and the fourth lens element 140 is T34, an axial distance between the fourth lens element 140 and the fifth lens element 150 is T45, an axial distance between the fifth lens element 150 and the sixth lens element 160 is T56, and a sum of axial distances between every two of the lens elements of the optical image assembly that are adjacent to each other is ΣAT (that is, ΣAT=T12+T23+T34+T45+T56), the following condition is satisfied: ΣCT/ΣAT=1.62.

In the optical image assembly according to the 1st embodiment, when a curvature radius of the object-side surface 151 of the fifth lens element 150 is R9, and a curvature radius of the image-side surface 152 of the fifth lens element 150 is R10, the following condition is satisfied: (R9+R10)/(R9−R10)=0.23.

In the optical image assembly according to the 1st embodiment, when a curvature radius of the object-side surface 161 of the sixth lens element 160 is R11, and a curvature radius of the image-side surface 162 of the sixth lens element 160 is R12, the following condition is satisfied: (R11+R12)/(R11−R12)=−1.62.

In the optical image assembly according to the 1st embodiment, when the focal length of the optical image assembly is f, and the curvature radius of the object-side surface 151 of the fifth lens element 150 is R9, the following condition is satisfied: f/R9=0.95.

In the optical image assembly according to the 1st embodiment, when the focal length of the optical image assembly is f, a curvature radius of the object-side surface 121 of the second lens element 120 is R3, and a curvature radius of the image-side surface 122 of the second lens element 120 is R4, the following condition is satisfied: f/R3+f/R4=−3.90.

In the optical image assembly according to the 1st embodiment, when the axial distance between the first lens element 110 and the second lens element 120 is T12, and the focal length of the optical image assembly is f, the following condition is satisfied: T12 /f=0.48.

In the optical image assembly according to the 1st embodiment, when the focal length of the optical image assembly is f, a focal length of the first lens element 110 is f1, and a focal length of the second lens element 120 is f2, the following conditions are satisfied: f/f1=−0.46; and f2/f1=1.34.

In the optical image assembly according to the 1st embodiment, when a refractive power of the first lens element 110 is P1 (which is f/f1, a ratio value of the focal length of the optical image assembly f and the focal length of the first lens element f1), a refractive power of the second lens element 120 is P2 (which is f/f2, a ratio value of the focal length of the optical image assembly f and the focal length of the second lens element f2), a refractive power of the third lens element 130 is P3 (which is f/f3, a ratio value of the focal length of the optical image assembly f and the focal length of the third lens element f3), a refractive power of the fourth lens element 140 is P4 (which is f/f4, a ratio value of the focal length of the optical image assembly f and the focal length of the fourth lens element f4), a refractive power of the fifth lens element 150 is P5 (which is f/f5, a ratio value of the focal length of the optical image assembly f and the focal length of the fifth lens element f5), and a refractive power of the sixth lens element 160 is P6 (which is f/f6, a ratio value of the focal length of the optical image assembly f and the focal length of the sixth lens element f6), the following condition is satisfied: (|P1|+|P2|+|P3|+|P4|)/(|P5|+|P6|)=0.79.

In the optical image assembly according to the 1st embodiment, when an axial distance between the aperture stop 100 and the image surface 190 is SL, and an axial distance between the object-side surface 111 of the first lens element 110 and the image surface 190 is TL, the following condition is satisfied: SL/TL=0.63.

Figure 27:
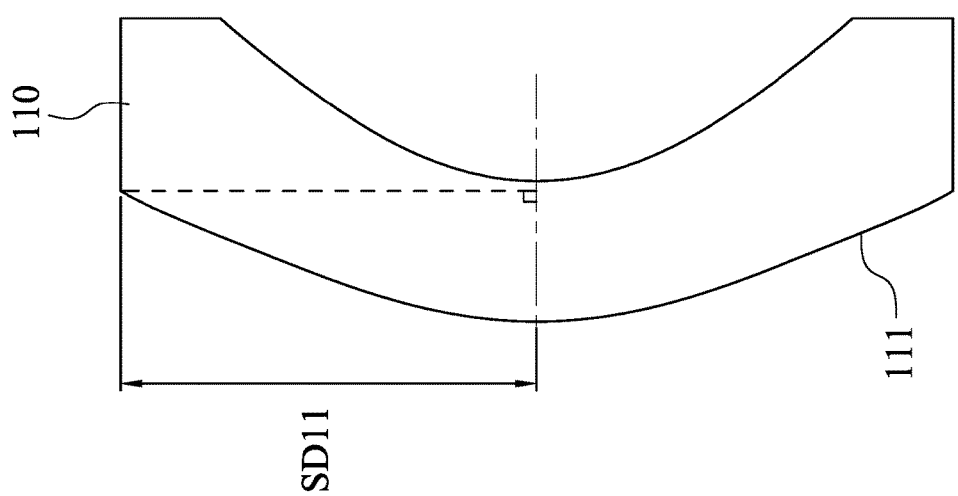
FIG. 27 shows a schematic view of a parameter SD11 of the optical image assembly according to the 1st embodiment of FIG. 1.
Figure 28:
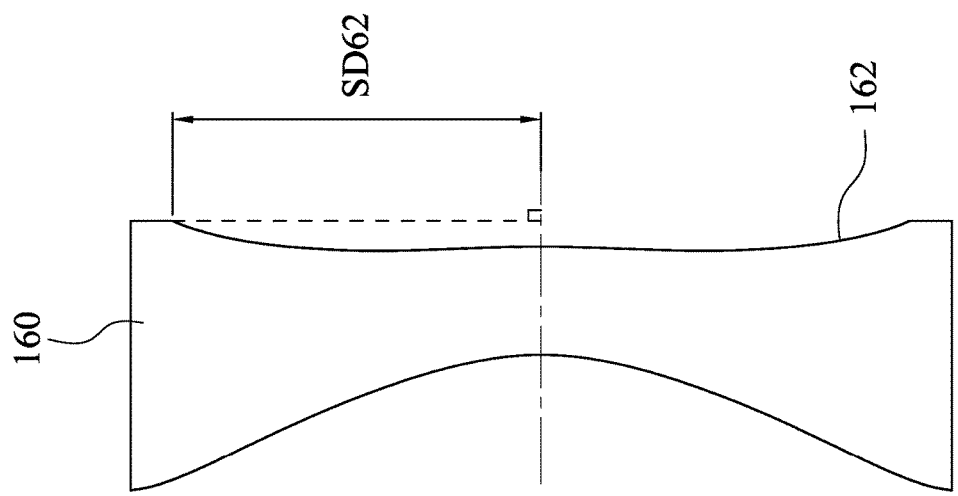
FIG. 28 shows a schematic view of a parameter SD62 of the optical image assembly according to the 1st embodiment of FIG. 1.

FIG. 27 shows a schematic view of a parameter SD11 of the optical image assembly according to the 1st embodiment of FIG. 1, and FIG. 28 shows a schematic view of a parameter SD62 of the optical image assembly according to the 1st embodiment of FIG. 1. In FIGS. 27 and 28, when a maximum effective radius of the object-side surface 111 of the first lens element 110 is SD11, and a maximum effective radius of the image-side surface 162 of the sixth lens element 160 is SD62, the following condition is satisfied: SD62/SD11=0.80.

In the optical image assembly according to the 1st embodiment, when the maximum effective radius of the image-side surface 162 of the sixth lens element 160 is SD62, and an entrance pupil diameter of the optical image assembly is EPD, the following condition is satisfied: (2×SD62)/EPD=1.70.

Figure 29:
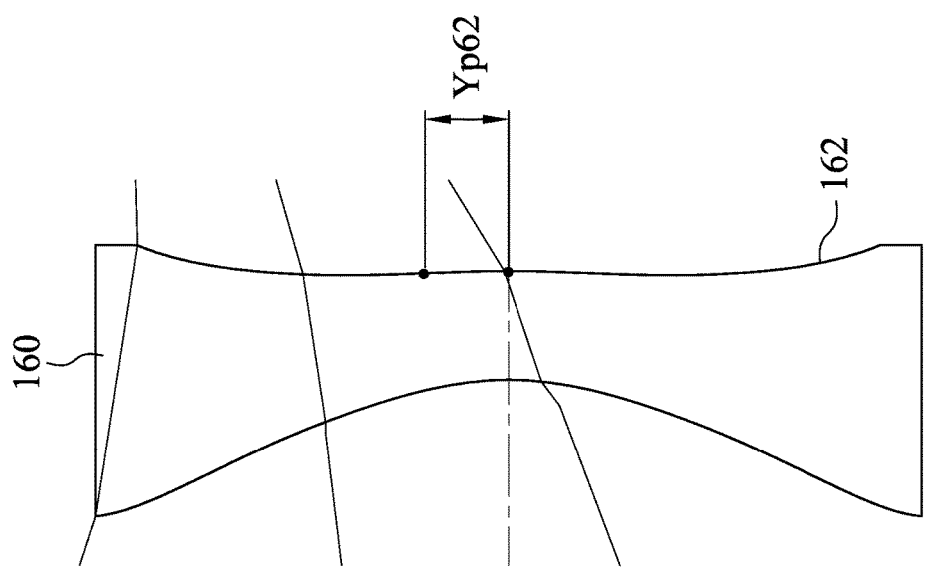
FIG. 29 shows a schematic view of a parameter Yp62 of the optical image assembly according to the 1st embodiment of FIG. 1.

FIG. 29 shows a schematic view of a parameter Yp62 of the optical image assembly according to the 1st embodiment of FIG. 1. In FIG. 29, when a vertical distance between an inflection point closest to an optical axis on the image-side surface 162 of the sixth lens element 160 and the optical axis is Yp62, and the focal length of the optical image assembly is f, the following condition is satisfied: Yp62/f=0.11.

Figure 30:
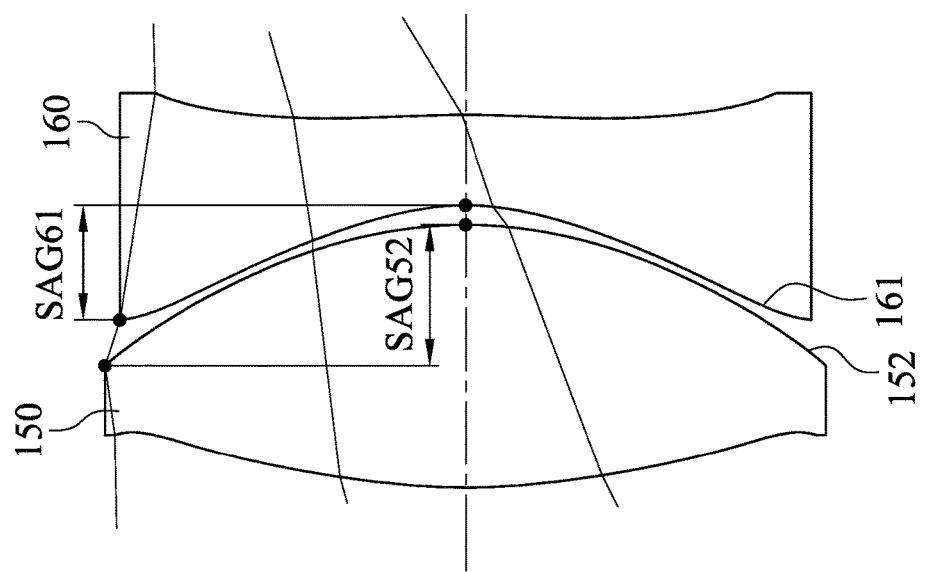
FIG. 30 shows a schematic view of parameters SAG52 and SAG61 of the optical image assembly according to the 1st embodiment of FIG. 1.

FIG. 30 shows a schematic view of parameters SAG52 and SAG61 of the optical image assembly according to the 1st embodiment of FIG. 1. In FIG. 30, when a displacement in parallel with an optical axis from an axial vertex on the image-side surface 152 of the fifth lens element 150 to a maximum effective radius position on the image-side surface 152 of the fifth lens element 150 is SAG52, and a displacement in parallel with an optical axis from an axial vertex on the object-side surface 161 of the sixth lens element 160 to a maximum effective radius position on the object-side surface 161 of the sixth lens element 160 is SAG61, the following condition is satisfied: SAG52/SAG61=1.23.

The detailed optical data of the 1st embodiment are shown in Table 1 and the aspheric surface data are shown in Table 2 below.

TABLE 1

1st Embodiment
f = 5.99 mm, Fno = 1.78, HFOV = 29.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.969 | ASP | 1.200 | Plastic | 1.545 | 56.0 | −13.02 |
| 2 | | 2.274 | ASP | 2.886 | | | | |
| 3 | Lens 2 | −2.541 | ASP | 1.202 | Plastic | 1.639 | 23.5 | −17.47 |
| 4 | | −3.896 | ASP | 0.100 | | | | |
| 5 | Lens 3 | 4.851 | ASP | 1.105 | Plastic | 1.544 | 55.9 | 10.80 |
| 6 | | 25.641 | ASP | 0.933 | | | | |
| 7 | Ape. Stop | Plano | | 1.534 | | | | |
| 8 | Lens 4 | 10.609 | ASP | 2.500 | Plastic | 1.534 | 55.9 | 11.74 |
| 9 | | −14.055 | ASP | 0.100 | | | | |
| 10 | Lens 5 | 6.297 | ASP | 2.421 | Plastic | 1.534 | 55.9 | 4.95 |
| 11 | | −3.950 | ASP | 0.180 | | | | |
| 12 | Lens 6 | −2.398 | ASP | 0.838 | Plastic | 1.639 | 23.5 | −5.12 |
| 13 | | −10.191 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 2.005 | | | | |
| 18 | Image | Plano | | — | | | | |

Reference wavelength is 587.6 nm (d-line).

TABLE 2

Aspheric Coefficients

| | Surface # | | | | | |
|---|---|---|---|---|---|---|
| | 1 | 2 | 3 | 4 | 5 | 6 |
| k = | −3.8364E+00 | −5.0899E−01 | −3.9115E+00 | −3.0389E+00 | −2.6795E+00 | −9.9000E+01 |
| A4 = | 2.9927E−03 | −5.8766E−03 | −3.6236E−03 | 2.9924E−03 | −8.2108E−03 | −7.5672E−03 |
| A6 = | −7.0072E−04 | −9.9775E−04 | −4.5836E−03 | −7.1790E−04 | 1.1468E−03 | 7.5914E−04 |
| A8 = | 4.3597E−05 | −1.5542E−06 | −1.0819E−05 | 9.5032E−05 | −7.7113E−05 | −6.5812E−05 |
| A10 = | −6.0258E−07 | 1.7477E−06 | 3.8876E−06 | −3.9643E−06 | 5.0157E−06 | 6.0498E−06 |

| | Surface # | | | | | |
|---|---|---|---|---|---|---|
| | 8 | 9 | 10 | 11 | 12 | 13 |
| k = | 4.8854E+00 | −2.9736E+01 | −4.9884E+00 | −1.0562E+01 | −5.1880E+00 | −8.7433E+01 |
| A4 = | 1.5738E−03 | −4.1239E−03 | −3.7910E−03 | −1.1773E−02 | 7.2514E−04 | 1.5103E−02 |
| A6 = | −4.3482E−04 | 5.2208E−04 | 1.7805E−04 | 1.2706E−03 | −7.6520E−04 | −2.5644E−03 |
| A8 = | 5.3516E−05 | 1.9173E−05 | 8.7013E−05 | −6.0590E−05 | 8.8278E−05 | 2.3532E−04 |
| A10 = | −2.5631E−06 | −2.9121E−06 | −8.2080E−06 | 3.9511E−07 | −1.6677E−06 | −6.8159E−06 |

In Table 1, the curvature radius, the thickness and the focal length are shown in millimeters (mm). Surface numbers 0-18 represent the surfaces sequentially arranged from the object side to the image side along the optical axis. In Table 2, k represents the conic coefficient of the equation of the aspheric surface profiles. A4-A10 represent the aspheric coefficients ranging from the 4th order to the 10th order. The tables presented below for each embodiment correspond to schematic parameter and aberration curves of each embodiment, and term definitions of the tables are the same as those in Table 1 and Table 2 of the 1st embodiment. Therefore, an explanation in this regard will not be provided again.

2nd Embodiment

Figure 3:
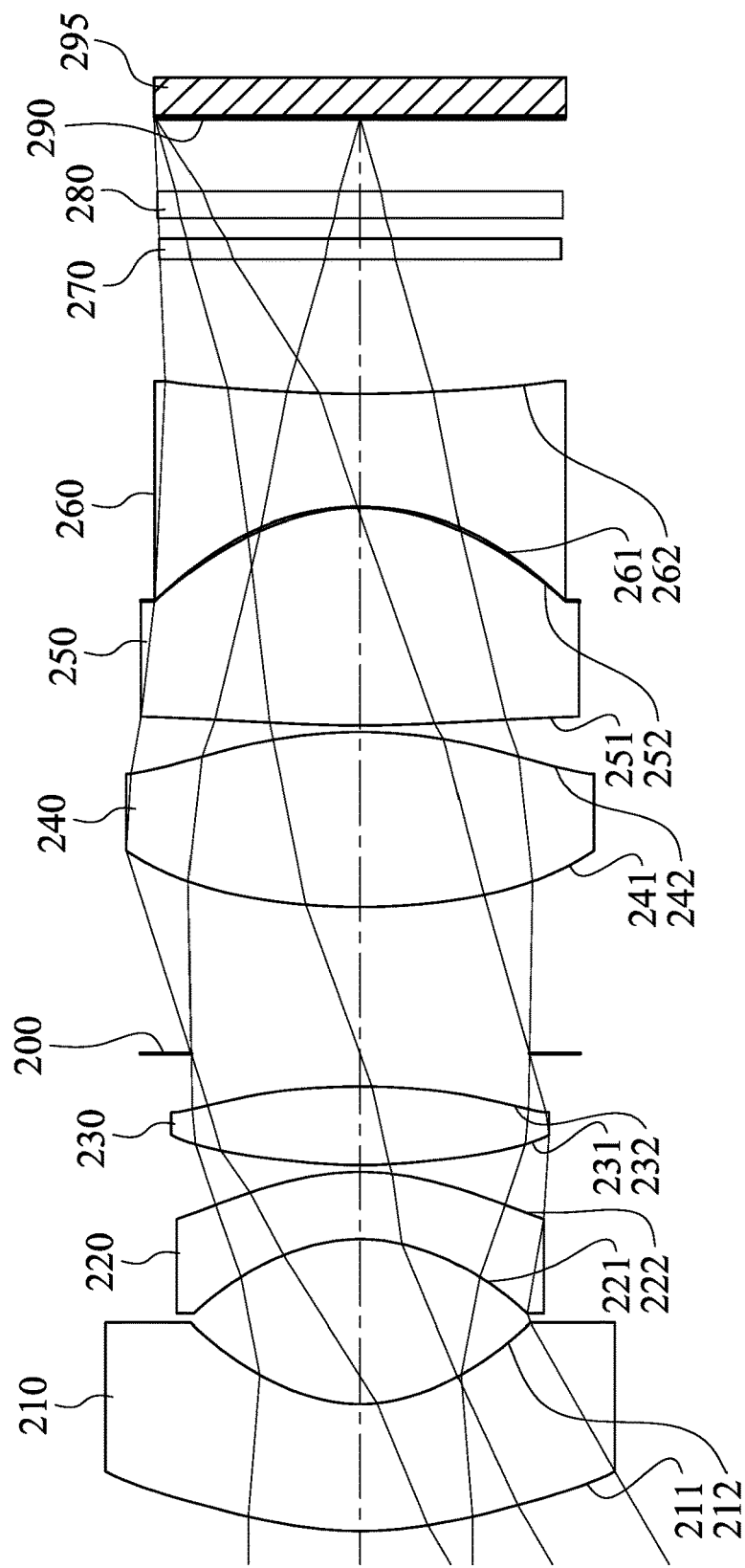
FIG. 3 is a schematic view of an image capturing apparatus according to the 2nd embodiment of the present disclosure.
Figure 4:
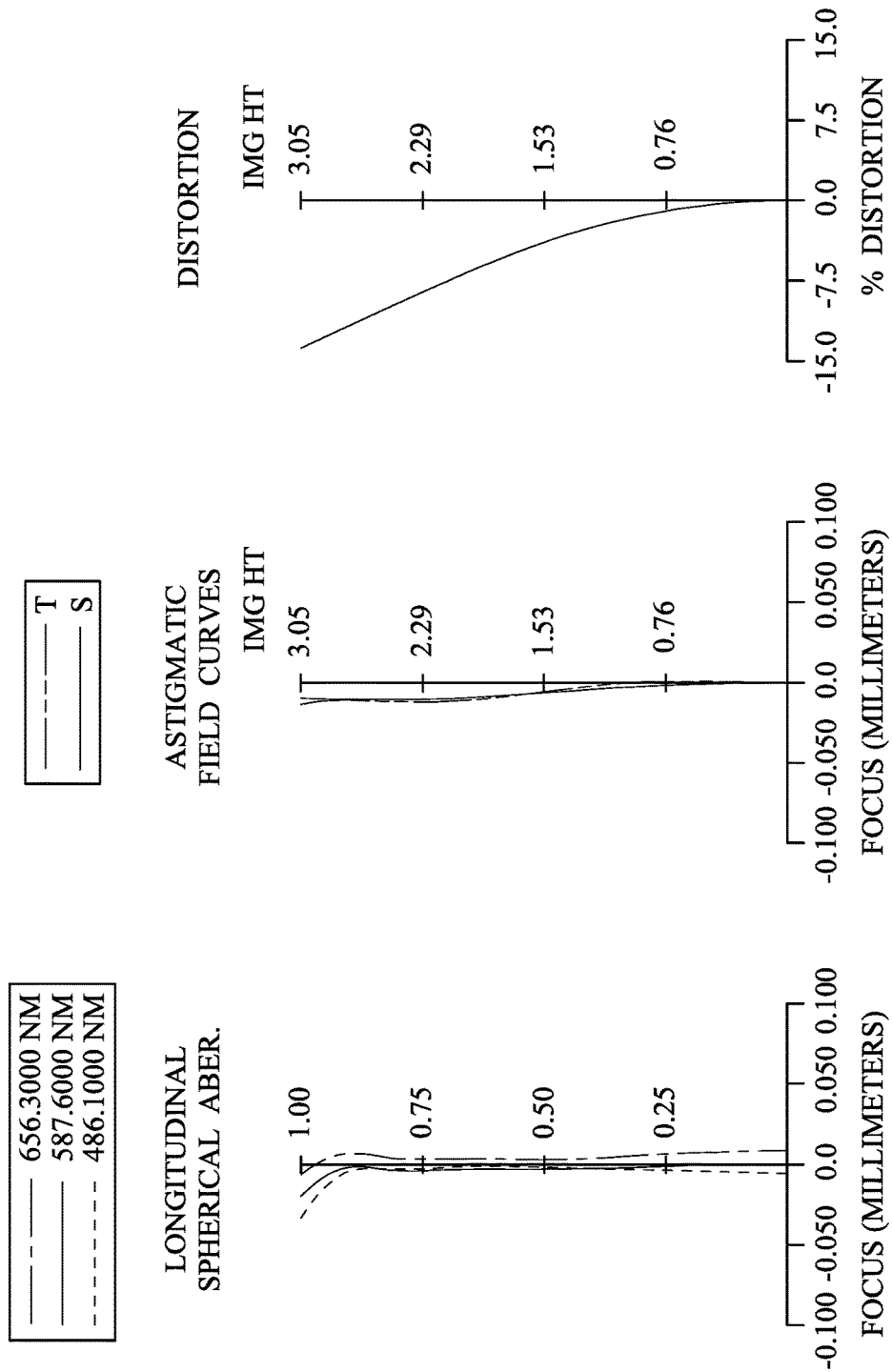
FIG. 4 shows spherical aberration curves, astigmatic field curves and a distortion curve of the image capturing apparatus according to the 2nd embodiment.

FIG. 3 is a schematic view of an image capturing apparatus according to the 2nd embodiment of the present disclosure. FIG. 4 shows spherical aberration curves, astigmatic field curves and a distortion curve of the image capturing apparatus according to the 2nd embodiment. In FIG. 3, the image capturing apparatus includes an optical image assembly (its reference numeral is omitted) and an image sensor 295. The optical image assembly includes, in order from an object side to an image side, a first lens element 210, a second lens element 220, a third lens element 230, an aperture stop 200, a fourth lens element 240, a fifth lens element 250, a sixth lens element 260, a filter 270, a cover glass 280 and an image surface 290, wherein the image sensor 295 is disposed on the image surface 290 of the optical image assembly. The optical image assembly includes six lens elements (210, 220, 230, 240, 250, and 260) without additional one or more lens elements inserted between the first lens element 210 and the sixth lens element 260.

The first lens element 210 with negative refractive power has an object-side surface 211 being convex in a paraxial region thereof and an image-side surface 212 being concave in a paraxial region thereof. The first lens element 210 is made of a plastic material, and has the object-side surface 211 and the image-side surface 212 being both aspheric.

The second lens element 220 with negative refractive power has an object-side surface 221 being concave in a paraxial region thereof and an image-side surface 222 being convex in a paraxial region thereof. The second lens element 220 is made of a plastic material, and has the object-side surface 221 and the image-side surface 222 being both aspheric. Furthermore, the image-side surface 222 includes at least one inflection point.

The third lens element 230 with positive refractive power has an object-side surface 231 being convex in a paraxial region thereof and an image-side surface 232 being convex in a paraxial region thereof. The third lens element 230 is made of a plastic material, and has the object-side surface 231 and the image-side surface 232 being both aspheric. Furthermore, the image-side surface 232 includes at least one inflection point.

The fourth lens element 240 with positive refractive power has an object-side surface 241 being convex in a paraxial region thereof and an image-side surface 242 being convex in a paraxial region thereof. The fourth lens element 240 is made of a plastic material, and has the object-side surface 241 and the image-side surface 242 being both aspheric. Furthermore, the image-side surface 242 includes at least one inflection point.

The fifth lens element 250 with positive refractive power has an object-side surface 251 being convex in a paraxial region thereof and an image-side surface 252 being convex in a paraxial region thereof. The fifth lens element 250 is made of a plastic material, and has the object-side surface 251 and the image-side surface 252 being both aspheric. Furthermore, the object-side surface 251 includes at least one inflection point.

The sixth lens element 260 with negative refractive power has an object-side surface 261 being concave in a paraxial region thereof and an image-side surface 262 being concave in a paraxial region thereof. The sixth lens element 260 is made of a plastic material, and has the object-side surface 261 and the image-side surface 262 being both aspheric. Furthermore, the image-side surface 252 of the fifth lens element 250 and the object-side surface 261 of the sixth lens element 260 are cemented.

The filter 270 is made of a glass material, and the filter 270 and the cover glass 280 are located between the sixth lens element 260 and the image surface 290 in order, and will not affect the focal length of the optical image assembly.

The detailed optical data of the 2nd embodiment are shown in Table 3 and the aspheric surface data are shown in Table 4 below.

TABLE 3

2nd Embodiment
f = 6.06 mm, Fno = 1.82, HFOV = 30.3 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.000 | ASP | 1.890 | Plastic | 1.545 | 56.0 | −9.90 |
| 2 | | 2.524 | ASP | 2.448 | | | | |
| 3 | Lens 2 | −2.550 | ASP | 1.000 | Plastic | 1.639 | 23.5 | −16.9 |
| 4 | | −3.850 | ASP | 0.100 | | | | |
| 5 | Lens 3 | 8.000 | ASP | 1.173 | Plastic | 1.544 | 55.9 | 8.77 |
| 6 | | −11.204 | ASP | 0.480 | | | | |
| 7 | Ape. Stop | Plano | | 2.185 | | | | |
| 8 | Lens 4 | 10.536 | ASP | 2.594 | Plastic | 1.534 | 55.9 | 8.59 |
| 9 | | −7.419 | ASP | 0.100 | | | | |
| 10 | Lens 5 | 18.249 | ASP | 3.232 | Plastic | 1.534 | 55.9 | 5.05 |
| 11 | | −2.967 | ASP | 0.018 | Cement | 1.485 | 53.2 | |
| 12 | Lens 6 | −3.816 | ASP | 1.680 | Plastic | 1.639 | 23.5 | −4.77 |
| 13 | | 17.689 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 1.102 | | | | |
| 18 | Image | Plano | | — | | | | |

Reference wavelength is 587.6 nm (d-line).

TABLE 4

Aspheric Coefficients

| | Surface # | | | | | |
|---|---|---|---|---|---|---|
| | 1 | 2 | 3 | 4 | 5 | 6 |
| k = | −2.1914E+00 | −2.5242E−01 | −3.4607E+00 | −2.9513E+00 | 3.7450E+00 | −6.6418E+00 |
| A4 = | −1.8404E−03 | −7.4277E−03 | −5.8362E−03 | 3.3273E−03 | −7.1915E−03 | −5.3363E−03 |
| A6 = | −4.0436E−05 | −5.5985E−04 | −1.3002E−04 | −7.0320E−04 | 9.1110E−04 | 7.4050E−04 |
| A8 = | 8.8293E−06 | 8.6644E−06 | −4.7227E−05 | 9.5944E−05 | −6.8354E−05 | −6.7683E−05 |
| A10 = | −1.1203E−07 | −4.2075E−06 | 7.2041E−06 | −4.0895E−06 | 3.8246E−06 | 5.3963E−06 |

TABLE 4-continued

Aspheric Coefficients

| Surface # | | | | | |
|---|---|---|---|---|---|
| 8 | 9 | 10 | 11 | 12 | 13 |
| k = 3.3933E+00 | −8.8169E+00 | −4.3642E−01 | −5.6460E+00 | −9.8795E−01 | −9.9000E+01 |
| A4 = 1.0074E−03 | −3.0414E−03 | −2.4479E−03 | −6.3455E−03 | −3.6278E−03 | −7.1933E−04 |
| A6 = −2.4153E−05 | 2.8570E−04 | 1.3761E−05 | −9.2205E−04 | 1.5999E−04 | 1.4126E−04 |
| A8 = 4.7769E−06 | −1.2008E−06 | 2.0379E−05 | 2.2483E−04 | 9.3591E−07 | −9.0504E−06 |
| A10 = −1.3618E−07 | −2.0303E−07 | −1.2289E−06 | −1.2449E−05 | 1.1068E−07 | 9.2691E−07 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 6.06 | f/R9 | 0.33 |
| Fno | 1.82 | f/R3 + f/R4 | −3.95 |
| HFOV [deg.] | 30.3 | T12/f | 0.40 |
| tan(HFOV) | 0.58 | f/f1 | −0.61 |
| (V2 + V6)/2 | 23.49 | f2/f1 | 1.71 |
| 10 × Fno/V5 | 0.33 | (|P1| + |P2| + |P3| + |P4|)/(|P5| + |P6|) | 0.96 |
| (N1 + N3)/2 | 1.544 | SL/TL | 0.66 |
| T23/T12 | 0.04 | SD62/SD11 | 0.76 |
| ΣCT/ΣAT | 2.17 | (2 × SD62)/EPD | 1.74 |
| (R9 + R10)/(R9 − R10) | 0.72 | Yp62/f | — |
| (R11 + R12)/(R11 − R12) | −0.65 | SAG52/SAG61 | 1.00 |

3rd Embodiment

Figure 5:
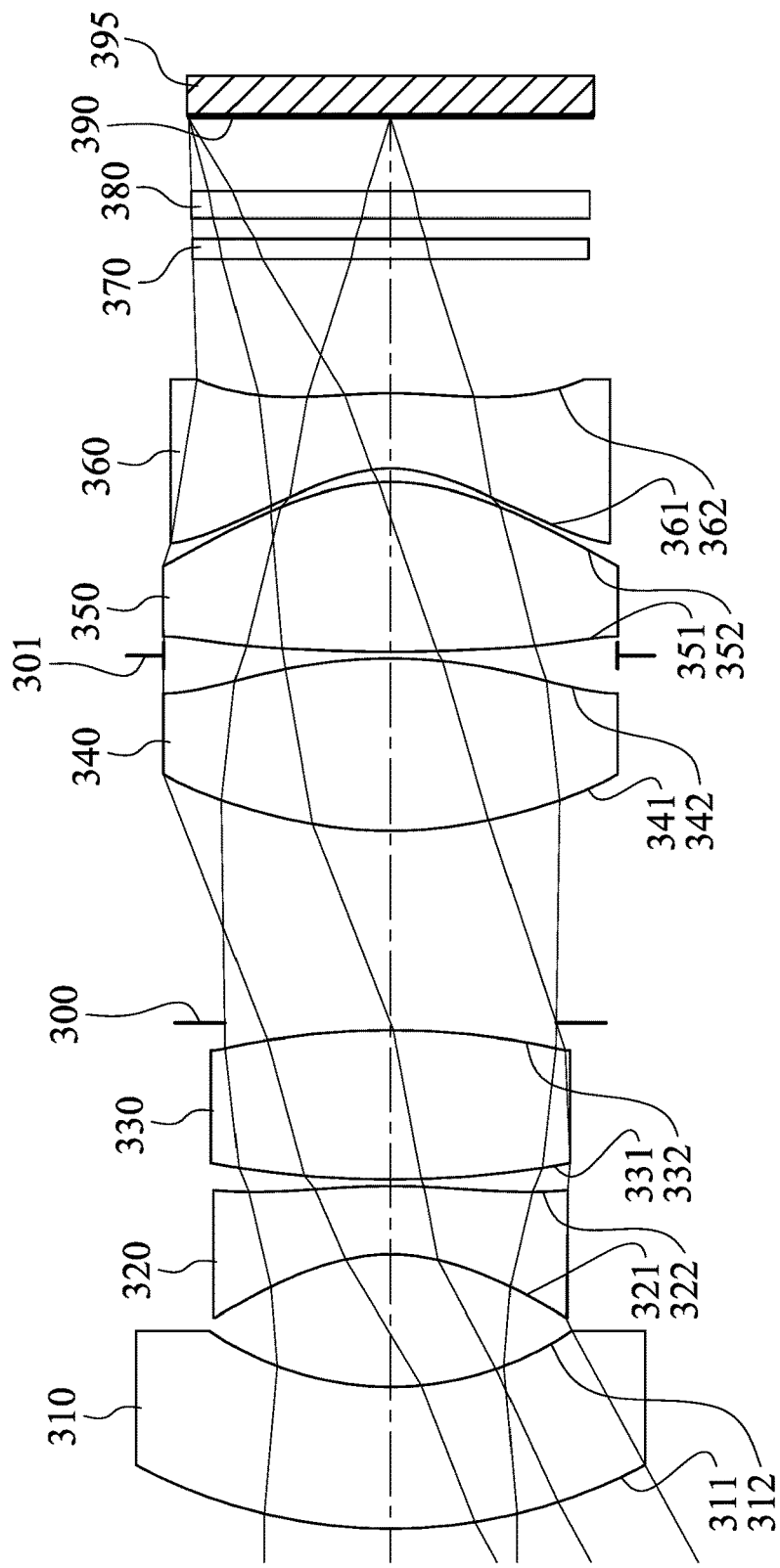
FIG. 5 is a schematic view of an image capturing apparatus according to the 3rd embodiment of the present disclosure.
Figure 6:
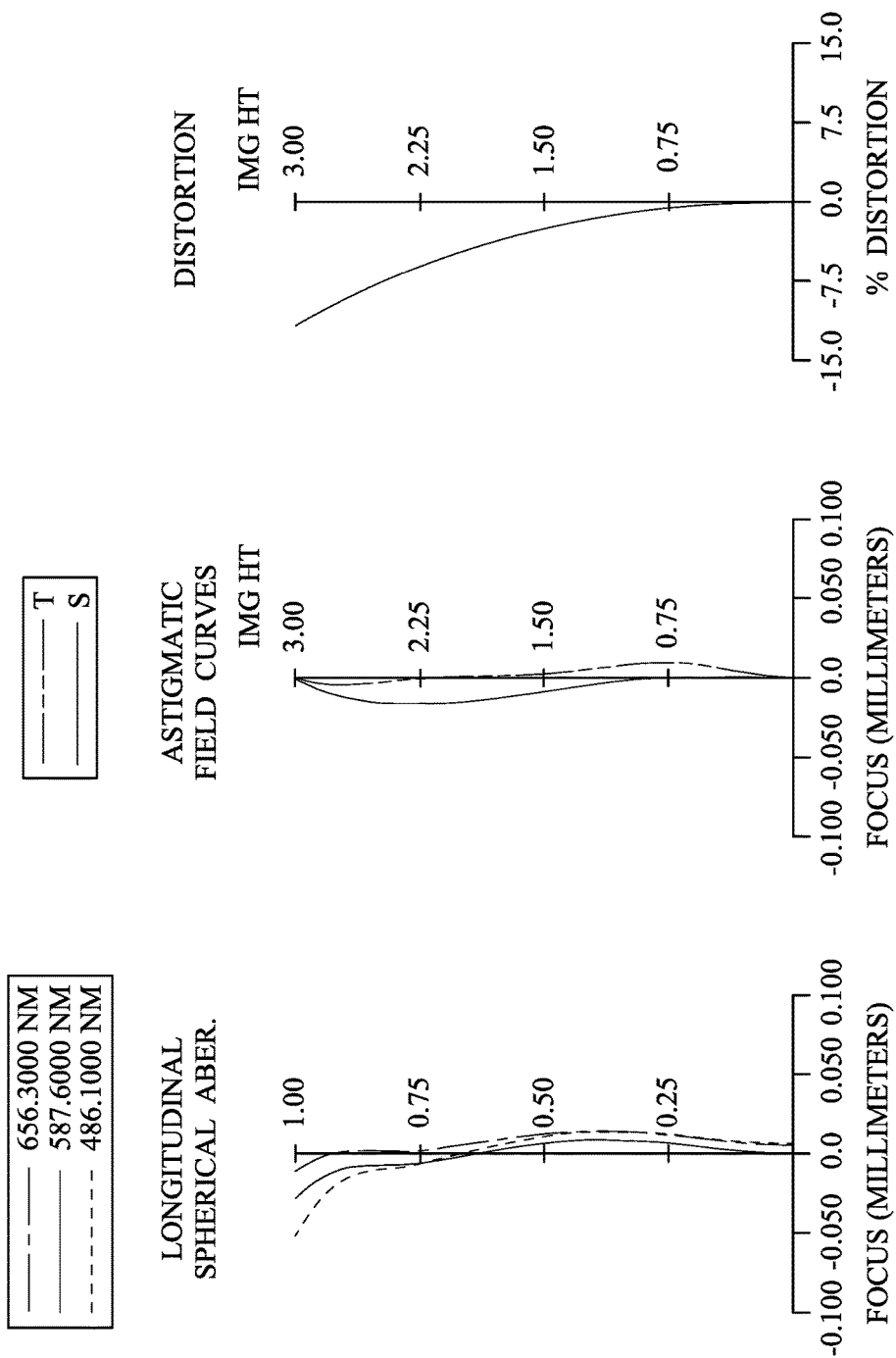
FIG. 6 shows spherical aberration curves, astigmatic field curves and a distortion curve of the image capturing apparatus according to the 3rd embodiment.

FIG. 5 is a schematic view of an image capturing apparatus according to the 3rd embodiment of the present disclosure. FIG. 6 shows spherical aberration curves, astigmatic field curves and a distortion curve of the image capturing apparatus according to the 3rd embodiment. In FIG. 5, the image capturing apparatus includes an optical image assembly (its reference numeral is omitted) and an image sensor 395. The optical image assembly includes, in order from an object side to an image side, a first lens element 310, a second lens element 320, a third lens element 330, an aperture stop 300, a fourth lens element 340, a stop 301, a fifth lens element 350, a sixth lens element 360, a filter 370, a cover glass 380 and an image surface 390, wherein the image sensor 395 is disposed on the image surface 390 of the optical image assembly. The optical image assembly includes six lens elements (310, 320, 330, 340, 350, and 360) without additional one or more lens elements inserted between the first lens element 310 and the sixth lens element 360.

The first lens element 310 with negative refractive power has an object-side surface 311 being convex in a paraxial region thereof and an image-side surface 312 being concave in a paraxial region thereof. The first lens element 310 is made of a glass material, and has the object-side surface 311 and the image-side surface 312 being both spherical.

The second lens element 320 with negative refractive power has an object-side surface 321 being concave in a paraxial region thereof and an image-side surface 322 being convex in a paraxial region thereof. The second lens element 320 is made of a plastic material, and has the object-side surface 321 and the image-side surface 322 being both aspheric. Furthermore, the image-side surface 322 includes at least one inflection point.

The third lens element 330 with positive refractive power has an object-side surface 331 being convex in a paraxial region thereof and an image-side surface 332 being convex in a paraxial region thereof. The third lens element 330 is made of a glass material, and has the object-side surface 331 and the image-side surface 332 being both spherical.

The fourth lens element 340 with positive refractive power has an object-side surface 341 being convex in a paraxial region thereof and an image-side surface 342 being convex in a paraxial region thereof. The fourth lens element 340 is made of a plastic material, and has the object-side surface 341 and the image-side surface 342 being both aspheric. Furthermore, the image-side surface 342 includes at least one inflection point.

The fifth lens element 350 with positive refractive power has an object-side surface 351 being convex in a paraxial region thereof and an image-side surface 352 being convex in a paraxial region thereof. The fifth lens element 350 is made of a plastic material, and has the object-side surface 351 and the image-side surface 352 being both aspheric. Furthermore, the object-side surface 351 includes at least one inflection point.

The sixth lens element 360 with negative refractive power has an object-side surface 361 being concave in a paraxial region thereof and an image-side surface 362 being convex in a paraxial region thereof. The sixth lens element 360 is made of a plastic material, and has the object-side surface 361 and the image-side surface 362 being both aspheric. Furthermore, each of the object-side surface 361 and the image-side surface 362 includes at least one inflection point, and the image-side surface 362 includes a concave shape in an off-axial thereof.

The filter 370 is made of a glass material, and the filter 370 and the cover glass 380 are located between the sixth lens element 360 and the image surface 390 in order, and will not affect the focal length of the optical image assembly.

The detailed optical data of the 3rd embodiment are shown in Table 5 and the aspheric surface data are shown in Table 6 below.

TABLE 5

3rd Embodiment
f = 6.20 mm, Fno = 1.65, HFOV = 28.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.000 | | 2.115 | Glass | 1.569 | 56.0 | −27.13 |
| 2 | | 4.764 | | 1.967 | | | | |
| 3 | Lens 2 | −2.936 | ASP | 1.014 | Plastic | 1.639 | 23.5 | −6.57 |
| 4 | | −11.095 | ASP | 0.100 | | | | |
| 5 | Lens 3 | 14.623 | | 2.217 | Glass | 1.954 | 32.3 | 7.09 |
| 6 | | −11.643 | | 0.109 | | | | |
| 7 | Ape. Stop | Plano | | 2.861 | | | | |
| 8 | Lens 4 | 6.427 | ASP | 2.560 | Plastic | 1.534 | 55.9 | 7.10 |
| 9 | | −7.946 | ASP | 0.043 | | | | |
| 10 | Stop | Plano | | 0.057 | | | | |
| 11 | Lens 5 | 23.968 | ASP | 2.522 | Plastic | 1.534 | 55.9 | 5.34 |
| 12 | | −3.115 | ASP | 0.202 | | | | |
| 13 | Lens 6 | −2.007 | ASP | 1.120 | Plastic | 1.639 | 23.5 | −4.57 |
| 14 | | −7.808 | ASP | 2.000 | | | | |
| 15 | Filter | Plano | | 0.300 | Glass | 1.517 | 64.2 | — |
| 16 | | Plano | | 0.300 | | | | |
| 17 | Cover glass | Plano | | 0.400 | Glass | 1.517 | 64.2 | — |
| 18 | | Plano | | 1.121 | | | | |
| 19 | Image | Plano | | — | | | | |

Reference wavelength is 587.6 nm (d-line).
Effective radius of the stop on surface 10 is 3.370 mm.

TABLE 6

Aspheric Coefficients

| Surface # | | | | |
|---|---|---|---|---|
| | 3 | 4 | 8 | 9 |
| k = | −2.7121E+00 | −4.2039E+01 | −2.0098E+00 | −1.0129E+01 |
| A4 = | −8.7736E−04 | 3.6919E−03 | −5.9049E−04 | −3.6077E−03 |
| A6 = | 3.9279E−05 | −4.3343E−05 | −2.0503E−05 | 4.0664E−04 |
| A8 = | | | 7.1409E−06 | −6.5785E−06 |

| Surface # | | | | |
|---|---|---|---|---|
| | 11 | 12 | 13 | 14 |
| k = | 2.1224E+01 | −7.4612E+00 | −4.0100E+00 | −4.4503E+01 |
| A4 = | −1.1378E−03 | −9.2670E−03 | 4.4096E−04 | 1.2431E−02 |
| A6 = | 6.1745E−05 | 1.1743E−03 | 1.1591E−04 | −1.0437E−03 |
| A8 = | 2.6049E−05 | −6.6886E−05 | −4.8621E−06 | 5.3537E−05 |
| A10 = | −2.2182E−06 | 1.4302E−06 | 6.9113E−07 | −2.7836E−07 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 6.20 | f/R9 | 0.26 |
| Fno | 1.65 | f/R3 + f/R4 | −2.67 |
| HFOV [deg.] | 28.7 | T12/f | 0.32 |
| tan(HFOV) | 0.55 | f/f1 | −0.23 |
| (V2 + V6)/2 | 23.49 | f2/f1 | 0.24 |

-continued

| 3rd Embodiment | | | |
|---|---|---|---|
| 10 × Fno/V5 | 0.30 | (\|P1\| + \|P2\| + \|P3\| + \|P4\|)/(\|P5\| + \|P6\|) | 1.16 |
| (N1 + N3)/2 | 1.761 | SL/TL | 0.64 |
| T23/T12 | 0.05 | SD62/SD11 | 0.76 |
| ΣCT/ΣAT | 2.16 | (2 × SD62)/EPD | 1.53 |
| (R9 + R10)/(R9 − R10) | 0.77 | Yp62/f | 0.12 |
| (R11 + R12)/(R11 − R12) | −1.69 | SAG52/SAG61 | 1.13 |

4th Embodiment

Figure 7:
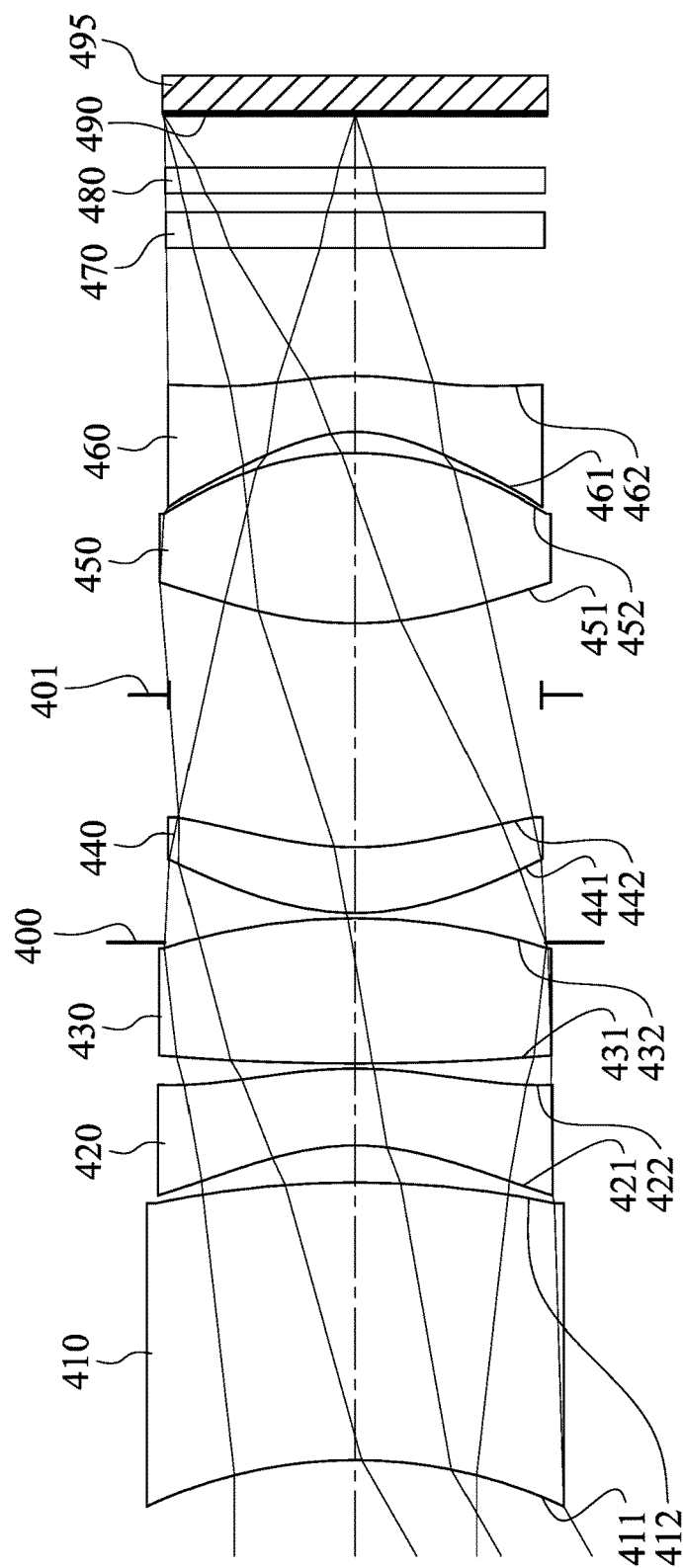
FIG. 7 is a schematic view of an image capturing apparatus according to the 4th embodiment of the present disclosure.
Figure 8:
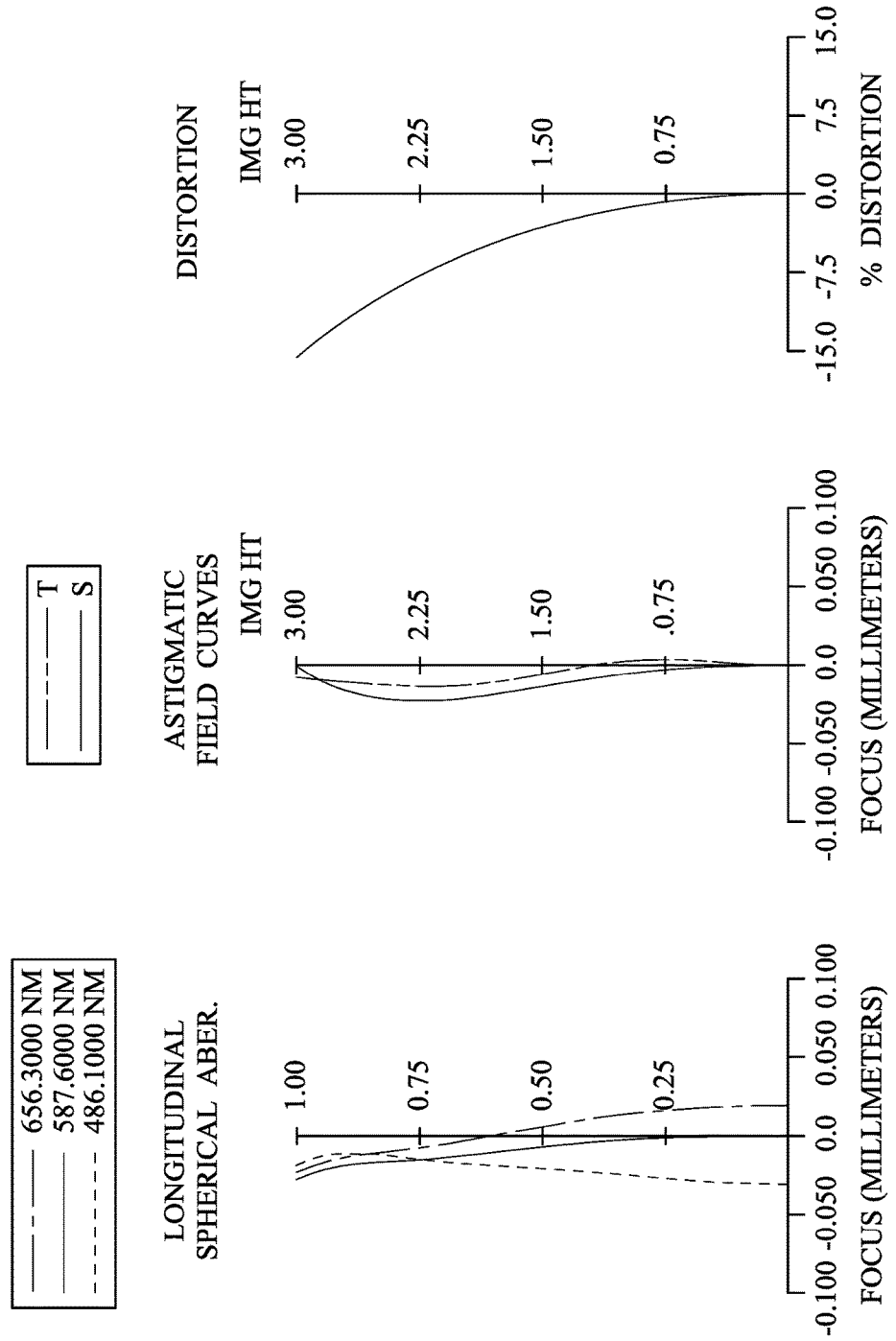
FIG. 8 shows spherical aberration curves, astigmatic field curves and a distortion curve of the image capturing apparatus according to the 4th embodiment.

FIG. 7 is a schematic view of an image capturing apparatus according to the 4th embodiment of the present disclosure. FIG. 8 shows spherical aberration curves, astigmatic field curves and a distortion curve of the image capturing apparatus according to the 4th embodiment. In FIG. 7, the image capturing apparatus includes an optical image assembly (its reference numeral is omitted) and an image sensor 495. The optical image assembly includes, in order from an object side to an image side, a first lens element 410, a second lens element 420, a third lens element 430, an aperture stop 400, a fourth lens element 440, a stop 401, a fifth lens element 450, a sixth lens element 460, a filter 470, a cover glass 480 and an image surface 490, wherein the image sensor 495 is disposed on the image surface 490 of the optical image assembly. The optical image assembly includes six lens elements (410, 420, 430, 440, 450, and 460) without additional one or more lens elements inserted between the first lens element 410 and the sixth lens element 460.

The first lens element 410 with negative refractive power has an object-side surface 411 being concave in a paraxial region thereof and an image-side surface 412 being convex in a paraxial region thereof. The first lens element 410 is made of a glass material, and has the object-side surface 411 and the image-side surface 412 being both spherical.

The second lens element 420 with negative refractive power has an object-side surface 421 being concave in a paraxial region thereof and an image-side surface 422 being convex in a paraxial region thereof. The second lens element 420 is made of a plastic material, and has the object-side surface 421 and the image-side surface 422 being both aspheric. Furthermore, each of the object-side surface 421 and the image-side surface 422 includes at least one inflection point.

The third lens element 430 with positive refractive power has an object-side surface 431 being convex in a paraxial region thereof and an image-side surface 432 being convex in a paraxial region thereof. The third lens element 430 is made of a glass material, and has the object-side surface 431 and the image-side surface 432 being both spherical.

The fourth lens element 440 with positive refractive power has an object-side surface 441 being convex in a paraxial region thereof and an image-side surface 442 being concave in a paraxial region thereof. The fourth lens element 440 is made of a plastic material, and has the object-side surface 441 and the image-side surface 442 being both aspheric. Furthermore, the image-side surface 442 includes at least one inflection point.

The fifth lens element 450 with positive refractive power has an object-side surface 451 being convex in a paraxial region thereof and an image-side surface 452 being convex in a paraxial region thereof. The fifth lens element 450 is made of a plastic material, and has the object-side surface 451 and the image-side surface 452 being both aspheric.

The sixth lens element 460 with negative refractive power has an object-side surface 461 being concave in a paraxial region thereof and an image-side surface 462 being convex in a paraxial region thereof. The sixth lens element 460 is made of a plastic material, and has the object-side surface 461 and the image-side surface 462 being both aspheric. Furthermore, the image-side surface 462 includes at least one inflection point and includes a concave shape in an off-axial region thereof.

The filter 470 is made of a glass material, and the filter 470 and the cover glass 480 are located between the sixth lens element 460 and the image surface 490 in order, and will not affect the focal length of the optical image assembly.

The detailed optical data of the 4th embodiment are shown in Table 7 and the aspheric surface data are shown in Table 8 below.

TABLE 7

4th Embodiment
f = 6.23 mm, Fno = 1.65, HFOV = 29.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −7.634 | | 4.333 | Glass | 1.804 | 46.5 | −26.42 |
| 2 | | −14.929 | | 0.579 | | | | |
| 3 | Lens 2 | −3.844 | ASP | 1.200 | Plastic | 1.639 | 23.5 | −14.91 |
| 4 | | −7.229 | ASP | 0.080 | | | | |
| 5 | Lens 3 | 37.314 | | 2.265 | Glass | 1.804 | 46.5 | 9.76 |
| 6 | | −9.676 | | −0.381 | | | | |
| 7 | Ape. Stop | Plano | | 0.461 | | | | |
| 8 | Lens 4 | 4.221 | ASP | 1.029 | Plastic | 1.534 | 55.9 | 30.44 |
| 9 | | 5.218 | ASP | 2.368 | | | | |
| 10 | Stop | Plano | | 1.124 | | | | |
| 11 | Lens 5 | 5.903 | ASP | 2.651 | Plastic | 1.534 | 55.9 | 5.67 |
| 12 | | −5.243 | ASP | 0.333 | | | | |
| 13 | Lens 6 | −2.257 | ASP | 0.874 | Plastic | 1.639 | 23.5 | −7.15 |
| 14 | | −5.135 | ASP | 2.000 | | | | |
| 15 | Filter | Plano | | 0.550 | Glass | 1.517 | 64.2 | — |
| 16 | | Plano | | 0.300 | | | | |
| 17 | Cover glass | Plano | | 0.400 | Glass | 1.517 | 64.2 | — |
| 18 | | Plano | | 0.841 | | | | |
| 19 | Image | Plano | | — | | | | |

Reference wavelength is 587.6 nm (d-line).

Effective radius of the stop on surface 10 is 2.900 mm.

TABLE 8

Aspheric Coefficients

| Surface # | | | | |
|---|---|---|---|---|
|  | 3 | 4 | 8 | 9 |
| k = | −3.3667E+00 | −4.2560E−01 | −6.3512E−01 | −1.0094E+00 |
| A4 = | 2.3890E−03 | 5.3873E−03 | −3.4429E−03 | −5.5602E−03 |
| A6 = | −5.3250E−05 | −7.1722E−05 | 6.0452E−05 | 1.2393E−04 |

| Surface # | | | | |
|---|---|---|---|---|
|  | 11 | 12 | 13 | 14 |
| k = | 2.9724E−01 | −1.0384E+01 | −2.4482E+00 | −5.8046E+00 |
| A4 = | −1.5767E−03 | −1.1726E−02 | 6.7368E−03 | 1.6056E−02 |
| A6 = | −1.0881E−04 | 1.1269E−03 | −1.0612E−03 | −1.3994E−03 |
| A8 = | −1.1188E−05 | −2.3371E−05 | 1.1214E−04 | 3.8441E−05 |
| A10 = | 1.1338E−06 | −1.7588E−06 | −6.0532E−06 |  |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 6.23 | f/R9 | 1.06 |
| Fno | 1.65 | f/R3 + f/R4 | −2.48 |
| HFOV [deg.] | 29.7 | T12/f | 0.09 |
| tan(HFOV) | 0.57 | f/f1 | −0.24 |
| (V2 + V6)/2 | 23.49 | f2/f1 | 0.56 |
| 10 × Fno/V5 | 0.30 | (\|P1\| + \|P2\| + \|P3\| + \|P4\|)/(\|P5\| + \|P6\|) | 0.76 |
| (N1 + N3)/2 | 1.804 | SL/TL | 0.62 |
| T23/T12 | 0.14 | SD62/SD11 | 0.90 |
| ΣCT/ΣAT | 2.71 | (2 × SD62)/EPD | 1.54 |
| (R9 + R10)/(R9 − R10) | 0.06 | Yp62/f | 0.16 |
| (R11 + R12)/(R11 − R12) | −2.57 | SAG52/SAG61 | 0.81 |

5th Embodiment

Figure 9:
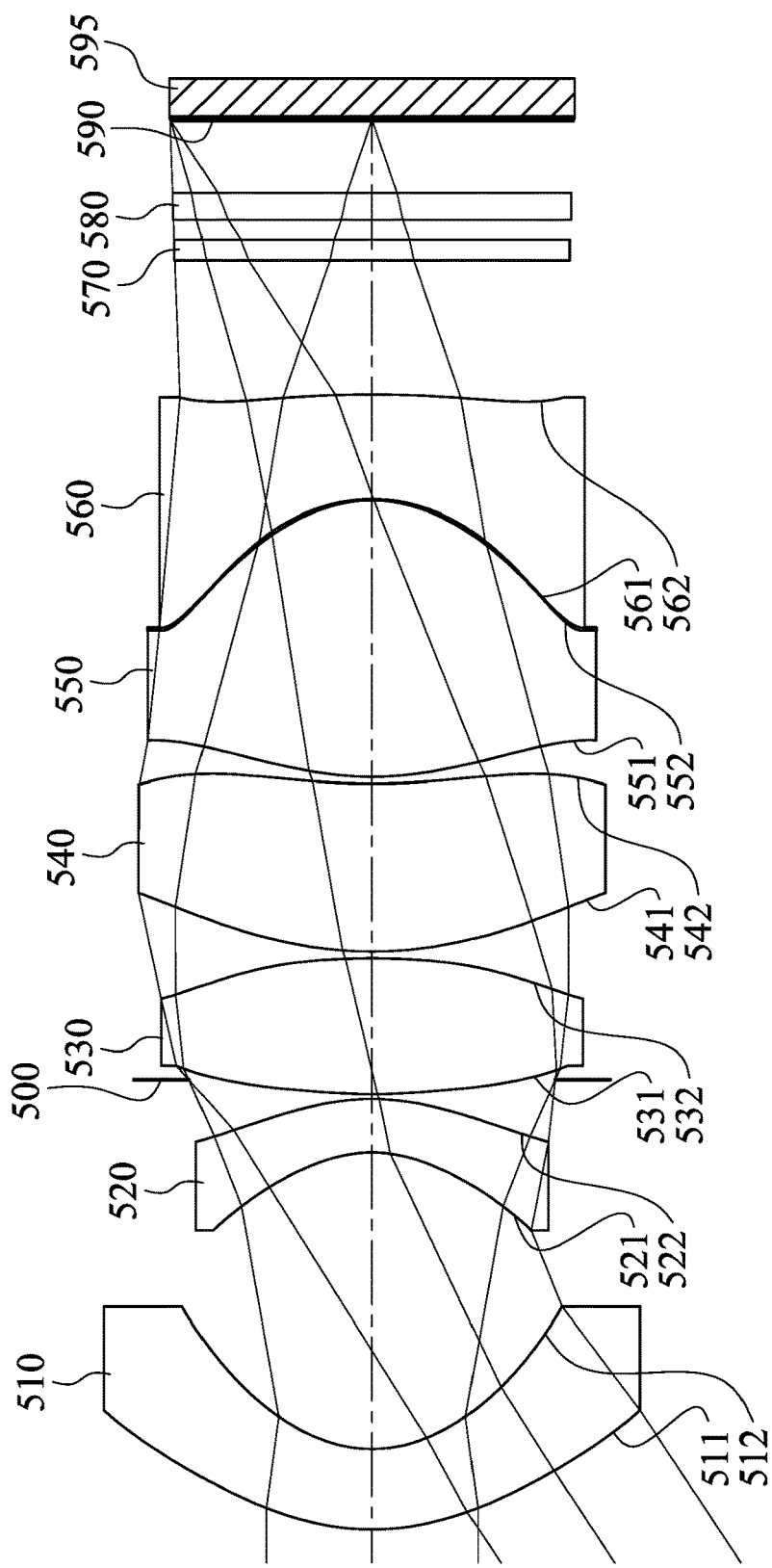
FIG. 9 is a schematic view of an image capturing apparatus according to the 5th embodiment of the present disclosure.
Figure 10:
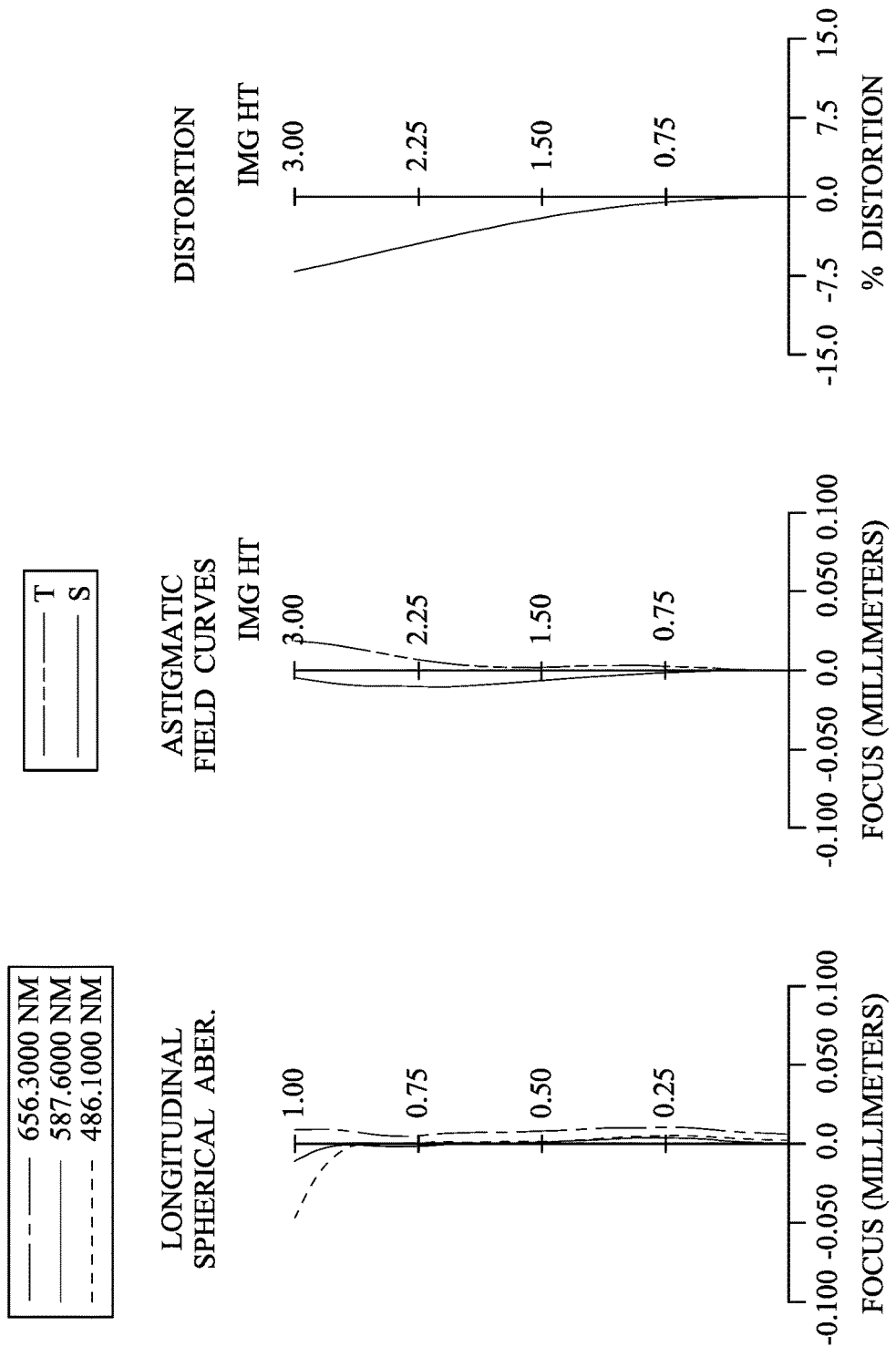
FIG. 10 shows spherical aberration curves, astigmatic field curves and a distortion curve of the image capturing apparatus according to the 5th embodiment.

FIG. 9 is a schematic view of an image capturing apparatus according to the 5th embodiment of the present disclosure. FIG. 10 shows spherical aberration curves, astigmatic field curves and a distortion curve of the image capturing apparatus according to the 5th embodiment. In FIG. 9, the image capturing apparatus includes an optical image assembly (its reference numeral is omitted) and an image sensor 595. The optical image assembly includes, in order from an object side to an image side, a first lens element 510, a second lens element 520, an aperture stop 500, a third lens element 530, a fourth lens element 540, a fifth lens element 550, a sixth lens element 560, a filter 570, a cover glass 580 and an image surface 590, wherein the image sensor 595 is disposed on the image surface 590 of the optical image assembly. The optical image assembly includes six lens elements (510, 520, 530, 540, 550, and 560) without additional one or more lens elements inserted between the first lens element 510 and the sixth lens element 560.

The first lens element 510 with negative refractive power has an object-side surface 511 being convex in a paraxial region thereof and an image-side surface 512 being concave in a paraxial region thereof. The first lens element 510 is made of a plastic material, and has the object-side surface 511 and the image-side surface 512 being both aspheric.

The second lens element 520 with negative refractive power has an object-side surface 521 being concave in a paraxial region thereof and an image-side surface 522 being convex in a paraxial region thereof. The second lens element 520 is made of a plastic material, and has the object-side surface 521 and the image-side surface 522 being both aspheric. Furthermore, the image-side surface 522 includes at least one inflection point.

The third lens element 530 with positive refractive power has an object-side surface 531 being convex in a paraxial region thereof and an image-side surface 532 being convex in a paraxial region thereof. The third lens element 530 is made of a plastic material, and has the object-side surface 531 and the image-side surface 532 being both aspheric. Furthermore, the image-side surface 532 includes at least one inflection point.

The fourth lens element 540 with positive refractive power has an object-side surface 541 being convex in a paraxial region thereof and an image-side surface 542 being concave in a paraxial region thereof. The fourth lens element 540 is made of a plastic material, and has the object-side surface 541 and the image-side surface 542 being both aspheric. Furthermore, each of the object-side surface 541 and the image-side surface 542 includes at least one inflection point.

The fifth lens element 550 with positive refractive power has an object-side surface 551 being convex in a paraxial region thereof and an image-side surface 552 being convex in a paraxial region thereof. The fifth lens element 550 is made of a plastic material, and has the object-side surface 551 and the image-side surface 552 being both aspheric. Furthermore, each of the object-side surface 551 and the image-side surface 552 includes at least one inflection point.

The sixth lens element 560 with negative refractive power has an object-side surface 561 being concave in a paraxial region thereof and an image-side surface 562 being convex in a paraxial region thereof. The sixth lens element 560 is made of a plastic material, and has the object-side surface 561 and the image-side surface 562 being both aspheric. Furthermore, the image-side surface 552 of the fifth lens element 550 and the object-side surface 561 of the sixth lens element 560 are cemented, each of the object-side surface 561 and the image-side surface 562 includes at least one inflection point, and the image-side surface 562 includes a concave shape in an off-axial region thereof.

The filter 570 is made of a glass material, and the filter 570 and the cover glass 580 are located between the sixth lens element 560 and the image surface 590 in order, and will not affect the focal length of the optical image assembly.

The detailed optical data of the 5th embodiment are shown in Table 9 and the aspheric surface data are shown in Table 10 below.

TABLE 9

5th Embodiment
f = 4.88 mm, Fno = 1.55, HFOV = 33.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.773 | ASP | 1.200 | Plastic | 1.545 | 56.0 | −10.78 |
| 2 | | 2.039 | ASP | 4.416 | | | | |
| 3 | Lens 2 | −1.964 | ASP | 0.800 | Plastic | 1.660 | 20.4 | −8.89 |
| 4 | | −3.432 | ASP | 0.286 | | | | |
| 5 | Ape. Stop | Plano | | −0.216 | | | | |
| 6 | Lens 3 | 8.703 | ASP | 2.019 | Plastic | 1.544 | 56.0 | 9.50 |
| 7 | | −11.686 | ASP | 0.100 | | | | |
| 8 | Lens 4 | 5.823 | ASP | 2.500 | Plastic | 1.639 | 23.5 | 17.63 |
| 9 | | 10.042 | ASP | 0.100 | | | | |
| 10 | Lens 5 | 4.771 | ASP | 4.115 | Plastic | 1.534 | 55.9 | 3.53 |
| 11 | | −2.183 | ASP | 0.018 | Cement | 1.485 | 53.2 | |
| 12 | Lens 6 | −2.518 | ASP | 1.562 | Plastic | 1.660 | 20.4 | −4.86 |
| 13 | | −14.626 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 1.104 | | | | |
| 18 | Image | Plano | | — | | | | |

Reference wavelength is 587.6 nm (d-line).

TABLE 10

Aspheric Coefficients

| Surface # | 1 | 2 | 3 | 4 | 6 | 7 |
|---|---|---|---|---|---|---|
| k = | −3.8213E−01 | −6.2959E−01 | −2.8071E+00 | −3.5003E+00 | −4.6289E+01 | 9.6458E+00 |
| A4 = | −2.8755E−03 | −3.2687E−03 | −5.8301E−03 | 2.6734E−03 | −2.0118E−03 | −6.1875E−03 |
| A6 = | −1.3345E−04 | −4.7350E−04 | −2.0124E−06 | −8.0820E−05 | 8.7576E−04 | 8.4041E−04 |
| A8 = | 7.9928E−06 | 1.3437E−05 | 5.3504E−05 | 5.3812E−05 | −6.4928E−05 | −4.9195E−05 |
| A10 = | −1.7316E−07 | −1.0728E−06 | −8.9721E−06 | −5.5172E−06 | 2.0325E−06 | 2.4033E−06 |

| Surface # | 8 | 9 | 10 | 11 | 12 | 13 |
|---|---|---|---|---|---|---|
| k = | 5.8440E−01 | −7.9696E+00 | −5.9038E+00 | −8.4528E−01 | −1.1322E+00 | −8.2518E+01 |
| A4 = | −2.5897E−03 | −3.5471E−03 | −2.2266E−03 | −1.1390E−03 | −1.0137E−02 | −1.5728E−03 |
| A6 = | 1.7851E−04 | 1.3412E−04 | 2.5430E−04 | 1.7401E−03 | 5.7316E−04 | 5.7022E−04 |
| A8 = | −1.8548E−05 | −3.0132E−05 | −3.5209E−05 | −3.3578E−04 | −4.2709E−06 | −3.5438E−05 |
| A10 = | 3.1394E−07 | 1.5463E−06 | 1.0918E−06 | 2.3127E−05 | 4.5815E−06 | 2.4842E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 4.88 | f/R9 | 1.02 |
| Fno | 1.55 | f/R3 + f/R4 | −3.91 |
| HFOV [deg.] | 33.5 | T12/f | 0.91 |
| tan(HFOV) | 0.66 | f/f1 | −0.45 |
| (V2 + V6)/2 | 20.40 | f2/f1 | 0.82 |
| 10 × Fno/V5 | 0.28 | (|P1| + |P2| + |P3| + |P4|)/ (|P5| + |P6|) | 0.75 |
| (N1 + N3)/2 | 1.544 | SL/TL | 0.68 |
| T23/T12 | 0.02 | SD62/SD11 | 0.72 |
| ΣCT/ΣAT | 2.59 | (2 × SD62)/EPD | 1.81 |

-continued

| 5th Embodiment | | | |
|---|---|---|---|
| (R9 + R10)/(R9 − R10) | 0.37 | Yp62/f | 0.31 |
| (R11 + R12)/(R11 − R12) | −1.42 | SAG52/SAG61 | 1.01 |

6th Embodiment

Figure 11:
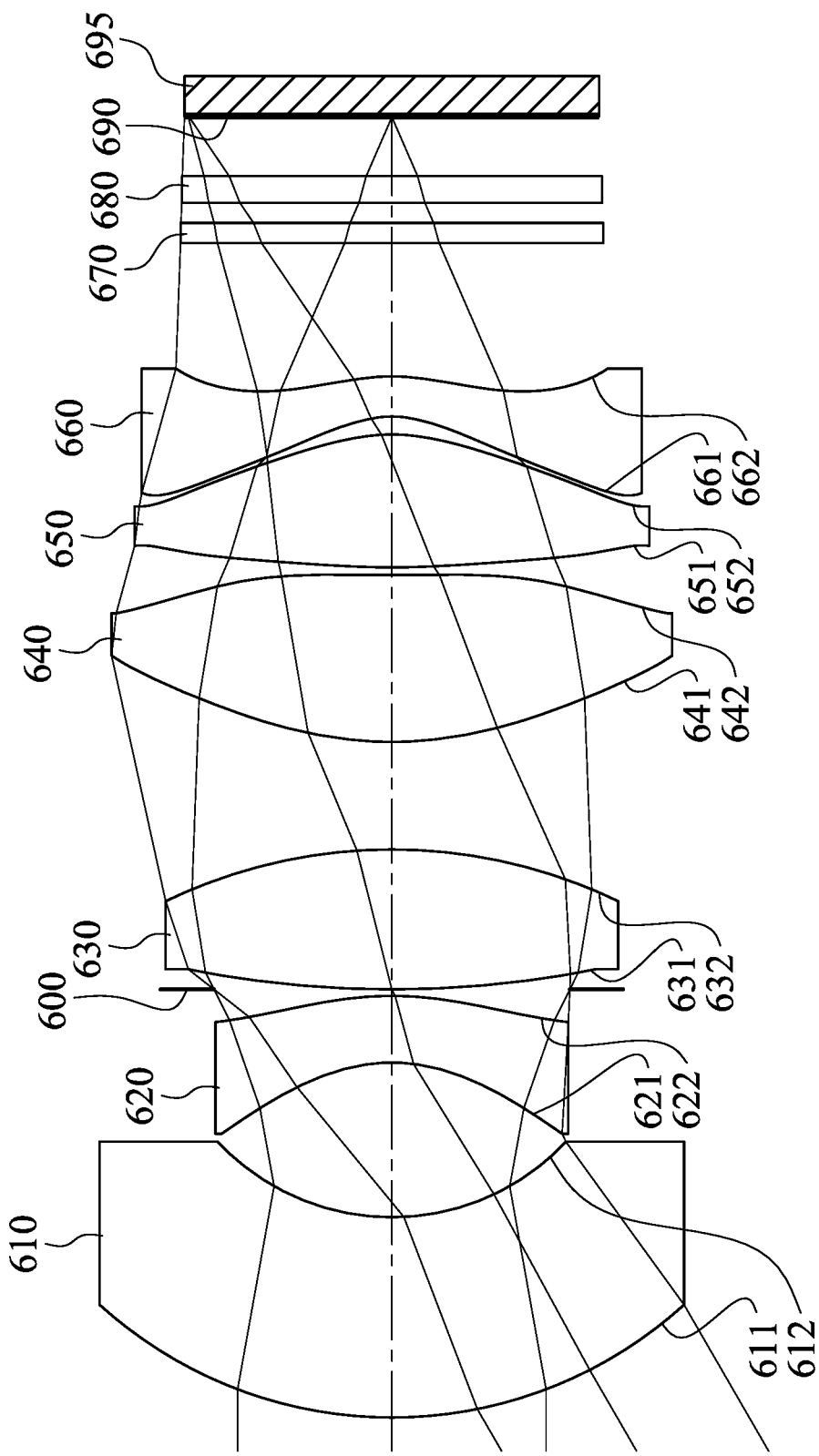
FIG. 11 is a schematic view of an image capturing apparatus according to the 6th embodiment of the present disclosure.
Figure 12:
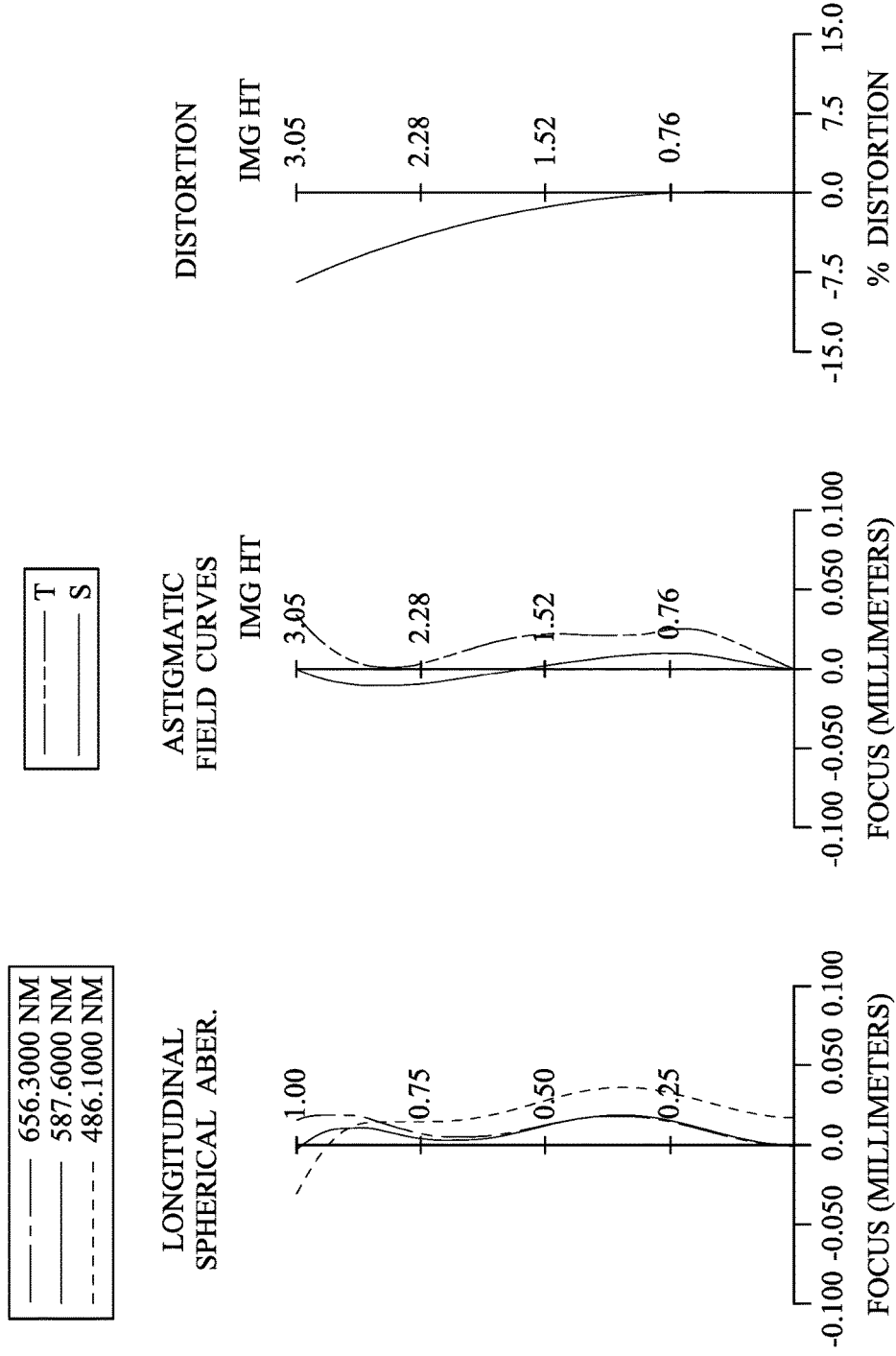
FIG. 12 shows spherical aberration curves, astigmatic field curves and a distortion curve of the image capturing apparatus according to the 6th embodiment.

FIG. 11 is a schematic view of an image capturing apparatus according to the 6th embodiment of the present disclosure. FIG. 12 shows spherical aberration curves, astigmatic field curves and a distortion curve of the image capturing apparatus according to the 6th embodiment. In FIG. 11, the image capturing apparatus includes an optical image assembly (its reference numeral is omitted) and an image sensor 695. The optical image assembly includes, in order from an object side to an image side, a first lens element 610, a second lens element 620, an aperture stop 600, a third lens element 630, a fourth lens element 640, a fifth lens element 650, a sixth lens element 660, a filter 670, a cover glass 680 and an image surface 690, wherein the image sensor 695 is disposed on the image surface 690 of the optical image assembly. The optical image assembly includes six lens elements (610, 620, 630, 640, 650, and 660) without additional one or more lens elements inserted between the first lens element 610 and the sixth lens element 660.

The first lens element 610 with negative refractive power has an object-side surface 611 being convex in a paraxial region thereof and an image-side surface 612 being concave in a paraxial region thereof. The first lens element 610 is made of a glass material, and has the object-side surface 611 and the image-side surface 612 being both spherical.

The second lens element 620 with negative refractive power has an object-side surface 621 being concave in a paraxial region thereof and an image-side surface 622 being convex in a paraxial region thereof. The second lens element 620 is made of a plastic material, and has the object-side surface 621 and the image-side surface 622 being both aspheric. Furthermore, the image-side surface 622 includes at least one inflection point.

The third lens element 630 with positive refractive power has an object-side surface 631 being convex in a paraxial region thereof and an image-side surface 632 being convex in a paraxial region thereof. The third lens element 630 is made of a glass material, and has the object-side surface 631 and the image-side surface 632 being both spherical.

The fourth lens element 640 with positive refractive power has an object-side surface 641 being convex in a paraxial region thereof and an image-side surface 642 being concave in a paraxial region thereof. The fourth lens element 640 is made of a plastic material, and has the object-side surface 641 and the image-side surface 642 being both aspheric. Furthermore, the image-side surface 642 includes at least one inflection point.

The fifth lens element 650 with positive refractive power has an object-side surface 651 being convex in a paraxial region thereof and an image-side surface 652 being convex in a paraxial region thereof. The fifth lens element 650 is made of a plastic material, and has the object-side surface 651 and the image-side surface 652 being both aspheric. Furthermore, each of the object-side surface 651 and the image-side surface 652 includes at least one inflection point.

The sixth lens element 660 with negative refractive power has an object-side surface 661 being concave in a paraxial region thereof and an image-side surface 662 being convex in a paraxial region thereof. The sixth lens element 660 is made of a plastic material, and has the object-side surface 661 and the image-side surface 662 being both aspheric. Furthermore, each of the object-side surface 661 and the image-side surface 662 includes at least one inflection point, and the image-side surface 662 includes a concave shape in an off-axial region thereof.

The filter 670 is made of a glass material, and the filter 670 and the cover glass 680 are located between the sixth lens element 660 and the image surface 690 in order, and will not affect the focal length of the optical image assembly.

The detailed optical data of the 6th embodiment are shown in Table 11 and the aspheric surface data are shown in Table 12 below.

TABLE 11

6th Embodiment
f = 5.77 mm, Fno = 1.25, HFOV = 30.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.500 | | 3.000 | Glass | 1.923 | 18.9 | −16.77 |
| 2 | | 3.564 | | 2.319 | | | | |
| 3 | Lens 2 | −2.605 | ASP | 0.996 | Plastic | 1.650 | 21.5 | −9.06 |
| 4 | | −5.373 | ASP | 0.100 | | | | |
| 5 | Ape. Stop | Plano | | 0.000 | | | | |
| 6 | Lens 3 | 15.545 | | 2.097 | Glass | 1.799 | 42.3 | 6.75 |
| 7 | | −7.766 | | 1.612 | | | | |
| 8 | Lens 4 | 5.728 | ASP | 2.500 | Plastic | 1.544 | 56.0 | 11.90 |
| 9 | | 42.010 | ASP | 0.116 | | | | |
| 10 | Lens 5 | 13.421 | ASP | 1.991 | Plastic | 1.544 | 56.0 | 4.36 |
| 11 | | −2.732 | ASP | 0.269 | | | | |
| 12 | Lens 6 | −1.549 | ASP | 0.600 | Plastic | 1.650 | 21.5 | −5.77 |
| 13 | | −3.043 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 0.900 | | | | |
| 18 | Image | Plano | | — | | | | |

Reference wavelength is 587.6 nm (d-line).

TABLE 12

Aspheric Coefficients

| | Surface # | | | |
|---|---|---|---|---|
| | 3 | 4 | 8 | 9 |
| k = | −7.9876E−01 | −4.2810E+00 | −7.4324E+00 | 9.3180E+01 |
| A4 = | 5.7085E−03 | 2.3616E−03 | 2.8430E−03 | −8.4612E−03 |
| A6 = | 1.7303E−05 | 1.5254E−04 | −2.2979E−04 | 4.8216E−04 |
| A8 = | | | 7.0554E−06 | −9.6586E−06 |

| | Surface # | | | |
|---|---|---|---|---|
| | 10 | 11 | 12 | 13 |
| k = | −7.7506E+01 | −7.7416E+00 | −4.4372E+00 | −1.3793E+01 |
| A4 = | 2.3667E−04 | −1.2000E−03 | 4.7239E−03 | 1.0801E−02 |
| A6 = | −3.4160E−04 | 3.1352E−04 | −2.4633E−04 | −4.5033E−04 |
| A8 = | 5.6119E−05 | −4.0596E−05 | −2.2108E−05 | 2.8705E−06 |
| A10 = | −2.2030E−06 | 1.7614E−06 | 1.9907E−06 | 9.2350E−07 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 5.77 | f/R9 | 0.43 |
| Fno | 1.25 | f/R3 + f/R4 | −3.29 |
| HFOV [deg.] | 30.0 | T12/f | 0.40 |
| tan(HFOV) | 0.58 | f/f1 | −0.34 |
| (V2 + V6)/2 | 21.47 | f2/f1 | 0.54 |
| 10 × Fno/V5 | 0.22 | (|P1| + |P2| + |P3| + |P4|)/(|P5| + |P6|) | 1.00 |
| (N1 + N3)/2 | 1.861 | SL/TL | 0.67 |
| T23/T12 | 0.04 | SD62/SD11 | 0.74 |
| ΣCT/ΣAT | 2.53 | (2 × SD62)/EPD | 1.40 |
| (R9 + R10)/(R9 − R10) | 0.66 | Yp62/f | 0.16 |
| (R11 + R12)/(R11 − R12) | −3.07 | SAG52/SAG61 | 0.94 |

7th Embodiment

Figure 13:
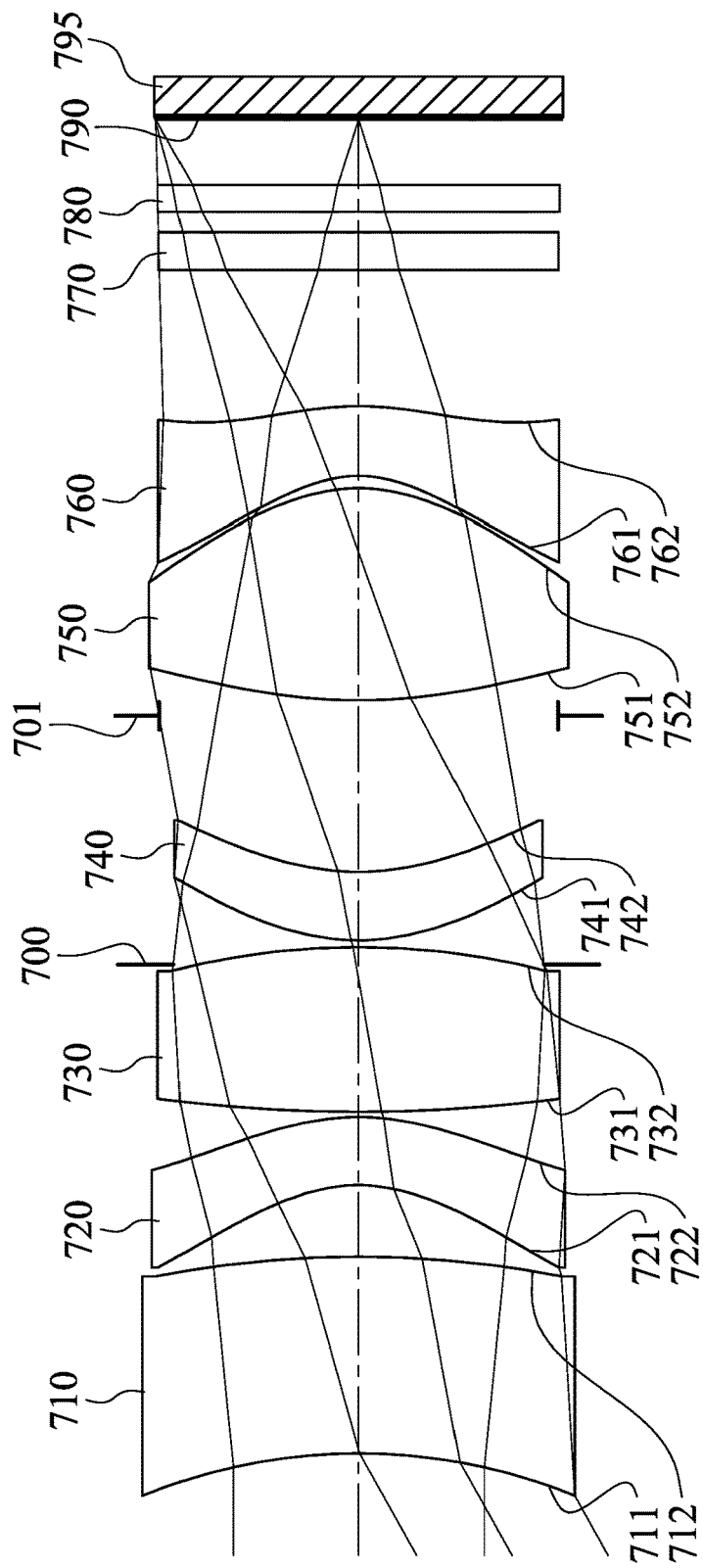
FIG. 13 is a schematic view of an image capturing apparatus according to the 7th embodiment of the present disclosure.
Figure 14:
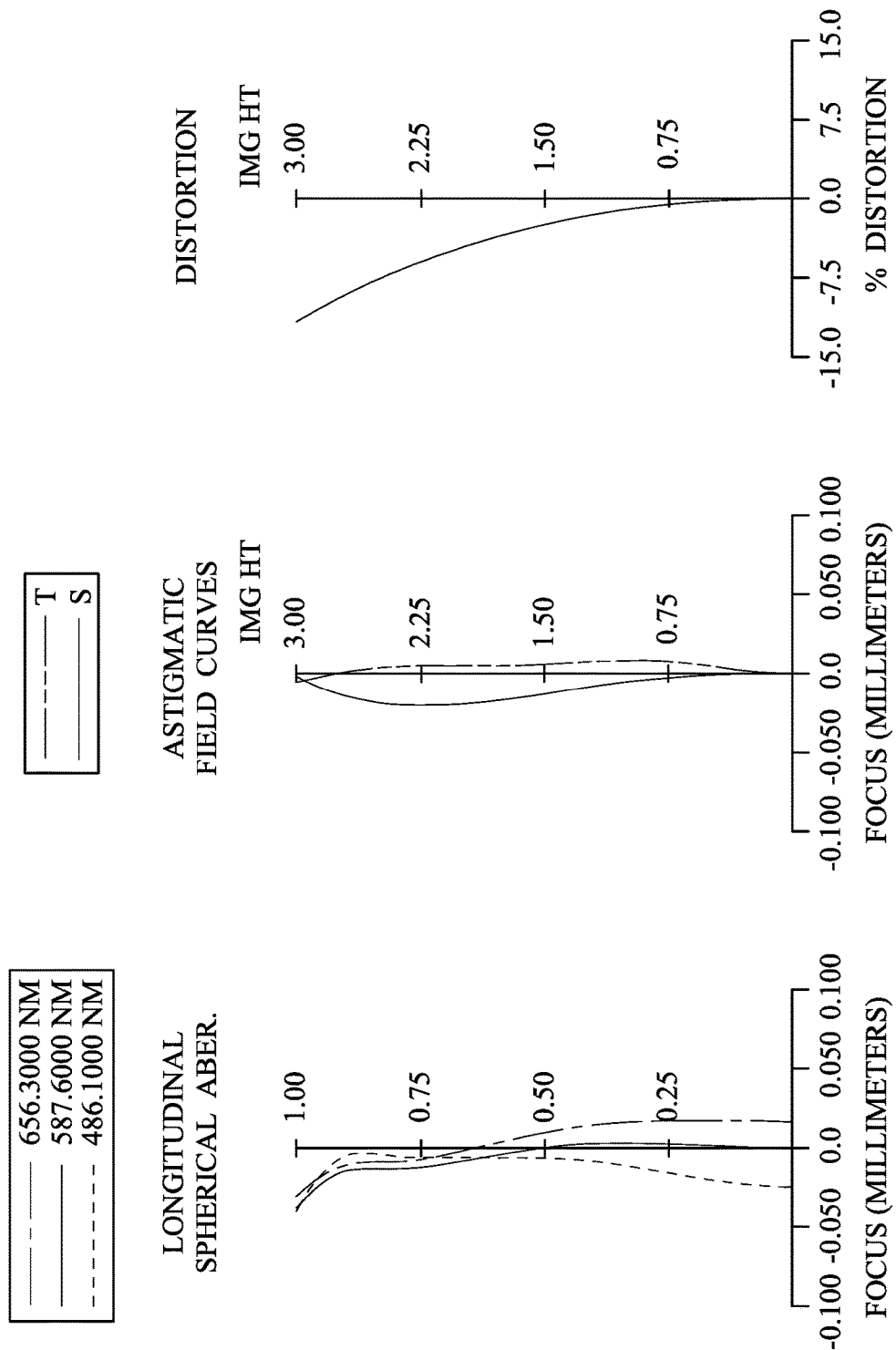
FIG. 14 shows spherical aberration curves, astigmatic field curves and a distortion curve of the image capturing apparatus according to the 7th embodiment.

FIG. 13 is a schematic view of an image capturing apparatus according to the 7th embodiment of the present disclosure. FIG. 14 shows spherical aberration curves, astigmatic field curves and a distortion curve of the image capturing apparatus according to the 7th embodiment. In FIG. 13, the image capturing apparatus includes an optical image assembly (its reference numeral is omitted) and an image sensor 795. The optical image assembly includes, in order from an object side to an image side, a first lens element 710, a second lens element 720, a third lens element 730, an aperture stop 700, a fourth lens element 740, a stop 701, a fifth lens element 750, a sixth lens element 760, a filter 770, a cover glass 780 and an image surface 790, wherein the image sensor 795 is disposed on the image surface 790 of the optical image assembly. The optical image assembly includes six lens elements (710, 720, 730, 740, 750, and 760) without additional one or more lens elements inserted between the first lens element 710 and the sixth lens element 760.

The first lens element 710 with negative refractive power has an object-side surface 711 being concave in a paraxial region thereof and an image-side surface 712 being convex in a paraxial region thereof. The first lens element 710 is made of a glass material, and has the object-side surface 711 and the image-side surface 712 being both spherical.

The second lens element 720 with negative refractive power has an object-side surface 721 being concave in a paraxial region thereof and an image-side surface 722 being convex in a paraxial region thereof. The second lens element 720 is made of a plastic material, and has the object-side surface 721 and the image-side surface 722 being both aspheric. Furthermore, each of the object-side surface 721 and the image-side surface 722 includes at least one inflection point.

The third lens element 730 with positive refractive power has an object-side surface 731 being convex in a paraxial region thereof and an image-side surface 732 being convex in a paraxial region thereof. The third lens element 730 is made of a glass material, and has the object-side surface 731 and the image-side surface 732 being both spherical.

The fourth lens element 740 with positive refractive power has an object-side surface 741 being convex in a paraxial region thereof and an image-side surface 742 being concave in a paraxial region thereof. The fourth lens element 740 is made of a plastic material, and has the object-side surface 741 and the image-side surface 742 being both aspheric.

The fifth lens element 750 with positive refractive power has an object-side surface 751 being convex in a paraxial region thereof and an image-side surface 752 being convex in a paraxial region thereof. The fifth lens element 750 is made of a plastic material, and has the object-side surface 751 and the image-side surface 752 being both aspheric. Furthermore, the image-side surface 752 includes at least one inflection point.

The sixth lens element 760 with negative refractive power has an object-side surface 761 being concave in a paraxial region thereof and an image-side surface 762 being convex in a paraxial region thereof. The sixth lens element 760 is made of a plastic material, and has the object-side surface 761 and the image-side surface 762 being both aspheric. Furthermore, each of the object-side surface 761 and the image-side surface 762 includes at least one inflection point, and the image-side surface 762 includes a concave shape in an off-axial region thereof.

The filter 770 is made of a glass material, and the filter 770 and the cover glass 780 are located between the sixth lens element 760 and the image surface 790 in order, and will not affect the focal length of the optical image assembly.

The detailed optical data of the 7th embodiment are shown in Table 13 and the aspheric surface data are shown in Table 14 below.

TABLE 13

7th Embodiment
f = 6.08 mm, Fno = 1.65, HFOV = 29.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −8.397 | | 2.890 | Glass | 1.804 | 46.5 | −27.97 |
| 2 | | −15.455 | | 1.056 | | | | |
| 3 | Lens 2 | −2.410 | ASP | 1.000 | Plastic | 1.639 | 23.5 | −14.51 |
| 4 | | −3.784 | ASP | 0.080 | | | | |
| 5 | Lens 3 | 22.843 | | 2.420 | Glass | 1.804 | 46.5 | 9.48 |
| 6 | | −10.899 | | −0.258 | | | | |
| 7 | Ape. Stop | Plano | | 0.358 | | | | |
| 8 | Lens 4 | 3.522 | ASP | 1.008 | Plastic | 1.534 | 55.9 | 32.70 |
| 9 | | 3.973 | ASP | 2.290 | | | | |
| 10 | Stop | Plano | | 0.231 | | | | |
| 11 | Lens 5 | 8.798 | ASP | 3.114 | Plastic | 1.534 | 55.9 | 4.11 |
| 12 | | −2.564 | ASP | 0.182 | | | | |
| 13 | Lens 6 | −1.778 | ASP | 1.030 | Plastic | 1.639 | 23.5 | −5.59 |
| 14 | | −4.340 | ASP | 2.000 | | | | |
| 15 | Filter | Plano | | 0.550 | Glass | 1.517 | 64.2 | — |
| 16 | | Plano | | 0.300 | | | | |
| 17 | Cover glass | Plano | | 0.400 | Glass | 1.517 | 64.2 | — |
| 18 | | Plano | | 0.995 | | | | |
| 19 | Image | Plano | | — | | | | |

Reference wavelength is 587.6 nm (d-line).
Effective radius of the stop on surface 10 is 2.930 mm.

TABLE 14

Aspheric Coefficients

| Surface # | | | | |
|---|---|---|---|---|
| | 3 | 4 | 8 | 9 |
| k = | −2.0043E+00 | −1.9369E+00 | −8.8468E−01 | 2.3993E−01 |
| A4 = | 2.9150E−03 | 3.9879E−03 | −2.4779E−03 | −5.0690E−03 |
| A6 = | −6.1768E−05 | −5.8884E−05 | −2.7146E−06 | −1.4755E−04 |

| Surface # | | | | |
|---|---|---|---|---|
| | 11 | 12 | 13 | 14 |
| k = | 4.8852E+00 | −4.0436E+00 | −2.6916E+00 | −8.5769E+00 |
| A4 = | −6.4658E−04 | −9.0838E−03 | 2.7511E−03 | 9.3168E−03 |
| A6 = | −1.0989E−04 | 1.3464E−03 | −7.5227E−05 | −5.1578E−04 |
| A8 = | −2.5722E−05 | −1.1002E−04 | 7.1937E−06 | 1.4179E−05 |
| A10 = | 1.7073E−06 | 3.8049E−06 | −4.7363E−07 | |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 6.08 | f/R9 | 0.69 |
| Fno | 1.65 | f/R3 + f/R4 | −4.13 |
| HFOV [deg.] | 29.2 | T12/f | 0.17 |
| tan(HFOV) | 0.56 | f/f1 | −0.22 |

-continued

| 7th Embodiment | | | |
|---|---|---|---|
| (V2 + V6)/2 | 23.49 | f2/f1 | 0.52 |
| 10 × Fno/V5 | 0.30 | (\|P1\| + \|P2\| + \|P3\| + \|P4\|)/(\|P5\| + \|P6\|) | 0.57 |
| (N1 + N3)/2 | 1.804 | SL/TL | 0.63 |
| T23/T12 | 0.08 | SD62/SD11 | 0.90 |
| ΣCT/ΣAT | 2.91 | (2 × SD62)/EPD | 1.56 |
| (R9 + R10)/(R9 − R10) | 0.55 | Yp62/f | 0.19 |
| (R11 + R12)/(R11 − R12) | −2.39 | SAG52/SAG61 | 1.09 |

8th Embodiment

Figure 15:
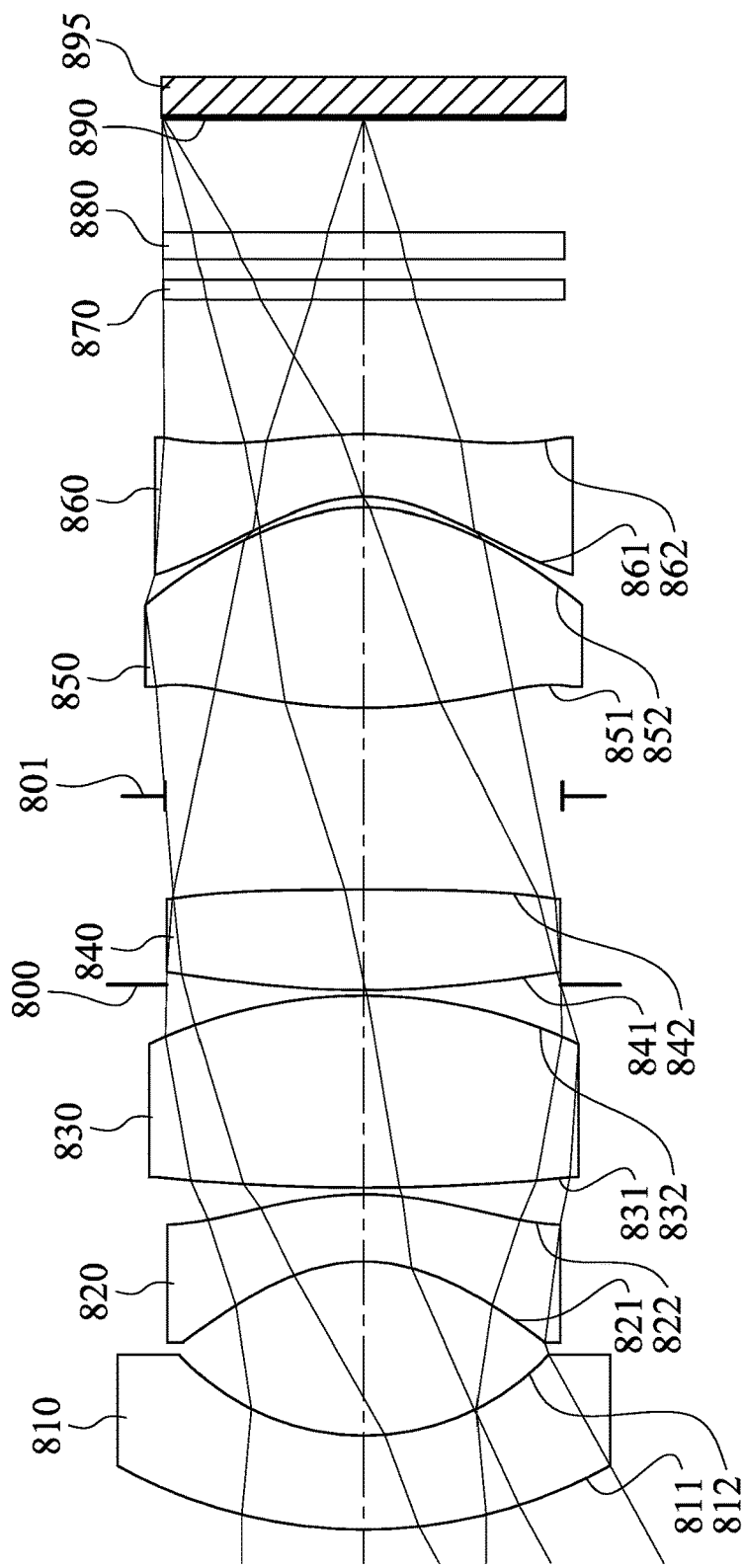
FIG. 15 is a schematic view of an image capturing apparatus according to the 8th embodiment of the present disclosure.
Figure 16:
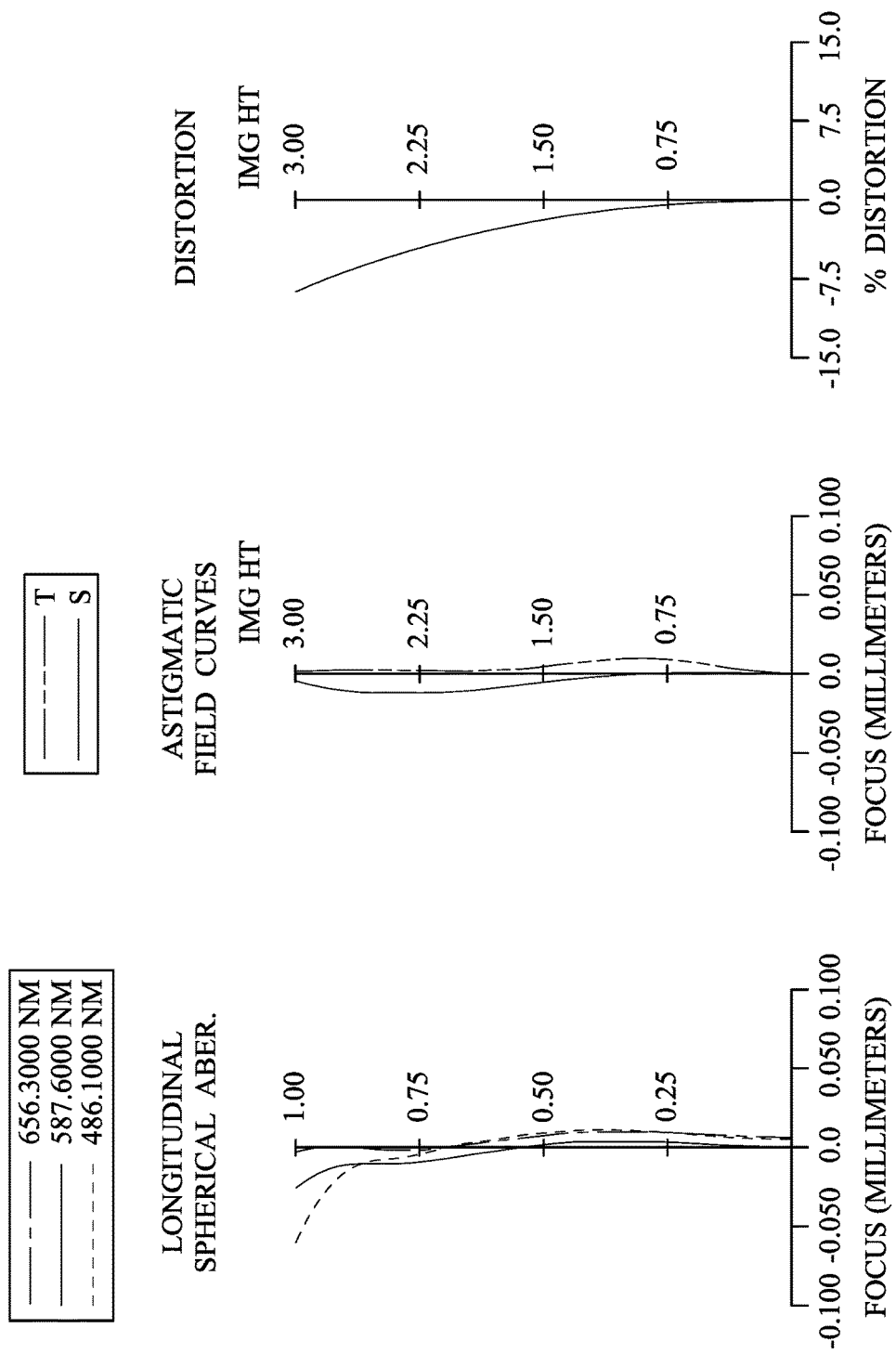
FIG. 16 shows spherical aberration curves, astigmatic field curves and a distortion curve of the image capturing apparatus according to the 8th embodiment.

FIG. 15 is a schematic view of an image capturing apparatus according to the 8th embodiment of the present disclosure. FIG. 16 shows spherical aberration curves, astigmatic field curves and a distortion curve of the image capturing apparatus according to the 8th embodiment. In FIG. 15, the image capturing apparatus includes an optical image assembly (its reference numeral is omitted) and an image sensor 895. The optical image assembly includes, in order from an object side to an image side, a first lens element 810, a second lens element 820, a third lens element 830, an aperture stop 800, a fourth lens element 840, a stop 801, a fifth lens element 850, a sixth lens element 860, a filter 870, a cover glass 880 and an image surface 890, wherein the image sensor 895 is disposed on the image surface 890 of the optical image assembly. The optical image assembly includes six lens elements (810, 820, 830, 840, 850, and 860) without additional one or more lens elements inserted between the first lens element 810 and the sixth lens element 860.

The first lens element 810 with negative refractive power has an object-side surface 811 being convex in a paraxial region thereof and an image-side surface 812 being concave in a paraxial region thereof. The first lens element 810 is made of a glass material, and has the object-side surface 811 and the image-side surface 812 being both spherical.

The second lens element 820 with negative refractive power has an object-side surface 821 being concave in a paraxial region thereof and an image-side surface 822 being convex in a paraxial region thereof. The second lens element 820 is made of a plastic material, and has the object-side surface 821 and the image-side surface 822 being both aspheric. Furthermore, the image-side surface 822 includes at least one inflection point.

The third lens element 830 with positive refractive power has an object-side surface 831 being convex in a paraxial region thereof and an image-side surface 832 being convex in a paraxial region thereof. The third lens element 830 is made of a glass material, and has the object-side surface 831 and the image-side surface 832 being both spherical.

The fourth lens element 840 with positive refractive power has an object-side surface 841 being convex in a paraxial region thereof and an image-side surface 842 being convex in a paraxial region thereof. The fourth lens element 840 is made of a plastic material, and has the object-side surface 841 and the image-side surface 842 being both aspheric.

The fifth lens element 850 with positive refractive power has an object-side surface 851 being convex in a paraxial region thereof and an image-side surface 852 being convex in a paraxial region thereof. The fifth lens element 850 is made of a plastic material, and has the object-side surface 851 and the image-side surface 852 being both aspheric. Furthermore, the object-side surface 851 includes at least one inflection point.

The sixth lens element 860 with negative refractive power has an object-side surface 861 being concave in a paraxial region thereof and an image-side surface 862 being convex in a paraxial region thereof. The sixth lens element 860 is made of a plastic material, and has the object-side surface 861 and the image-side surface 862 being both aspheric. Furthermore, each of the object-side surface 861 and the image-side surface 862 includes at least one inflection point, and the image-side surface 862 includes a concave shape in an off-axial region thereof.

The filter 870 is made of a glass material, and the filter 870 and the cover glass 880 are located between the sixth lens element 860 and the image surface 890 in order, and will not affect the focal length of the optical image assembly.

The detailed optical data of the 8th embodiment are shown in Table 15 and the aspheric surface data are shown in Table 16 below.

TABLE 15

8th Embodiment
f = 5.99 mm, Fno = 1.65, HFOV = 28.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 7.500 | | 1.400 | Glass | 1.569 | 56.0 | −15.01 |
| 2 | | 3.722 | | 2.589 | | | | |
| 3 | Lens 2 | −2.554 | ASP | 1.000 | Plastic | 1.639 | 23.5 | −9.73 |
| 4 | | −5.000 | ASP | 0.100 | | | | |
| 5 | Lens 3 | 30.454 | | 2.855 | Glass | 1.804 | 46.5 | 7.64 |
| 6 | | −7.381 | | 0.158 | | | | |
| 7 | Ape. Stop | Plano | | −0.078 | | | | |
| 8 | Lens 4 | 13.590 | ASP | 1.500 | Plastic | 1.534 | 55.9 | 22.05 |
| 9 | | −84.481 | ASP | 1.391 | | | | |
| 10 | Stop | Plano | | 1.310 | | | | |
| 11 | Lens 5 | 8.287 | ASP | 2.981 | Plastic | 1.534 | 55.9 | 4.33 |
| 12 | | −2.805 | ASP | 0.158 | | | | |
| 13 | Lens 6 | −2.046 | ASP | 0.934 | Plastic | 1.639 | 23.5 | −5.27 |
| 14 | | −6.137 | ASP | 2.000 | | | | |
| 15 | Filter | Plano | | 0.300 | Glass | 1.517 | 64.2 | — |
| 16 | | Plano | | 0.300 | | | | |
| 17 | Cover glass | Plano | | 0.400 | Glass | 1.517 | 64.2 | — |
| 18 | | Plano | | 1.709 | | | | |
| 19 | Image | Plano | | — | | | | |

Reference wavelength is 587.6 nm (d-line).
Effective radius of the stop on surface 10 is 2.950 mm.

TABLE 16

| Aspheric Coefficients | | | |
|---|---|---|---|
| Surface # | | | |
| 3 | 4 | 8 | 9 |
| k = −1.2814E+00 | −3.6682E+00 | −1.4601E+01 | 9.9000E+01 |
| A4 = 2.3404E−03 | 2.6665E−03 | 3.6988E−04 | −7.9415E−04 |
| A6 = −2.3488E−05 | 1.1512E−04 | −9.7125E−05 | −1.4099E−04 |
| A8 = | | 5.6438E−06 | 8.8427E−06 |
| Surface # | | | |
| 11 | 12 | 13 | 14 |
| k = 4.7207E+00 | −5.3835E+00 | −3.6565E+00 | −2.3028E+01 |
| A4 = −1.1079E−03 | −9.1334E−03 | −1.4292E−03 | 7.3098E−03 |
| A6 = −2.3551E−04 | 1.1873E−03 | 4.4368E−04 | −4.1059E−04 |
| A8 = −9.0115E−06 | −9.0401E−05 | −2.5842E−05 | 1.3435E−05 |
| A10 = −1.2804E−06 | 2.4771E−06 | 1.0241E−06 | −1.7747E−07 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 5.99 | f/R9 | 0.72 |
| Fno | 1.65 | f/R3 + f/R4 | −3.54 |
| HFOV [deg.] | 28.8 | T12/f | 0.43 |
| tan(HFOV) | 0.55 | f/f1 | −0.40 |
| (V2 + V6)/2 | 23.49 | f2/f1 | 0.65 |
| 10 × Fno/V5 | 0.30 | (|P1| + |P2| + |P3| + |P4|)/(|P5| + |P6|) | 0.82 |
| (N1 + N3)/2 | 1.687 | SL/TL | 0.61 |
| T23/T12 | 0.04 | SD62/SD11 | 0.81 |
| ΣCT/ΣAT | 1.90 | (2 × SD62)/EPD | 1.63 |
| (R9 + R10)/(R9 − R10) | 0.49 | Yp62/f | 0.17 |
| (R11 + R12)/(R11 − R12) | −2.00 | SAG52/SAG61 | 1.26 |

9th Embodiment

Figure 17:
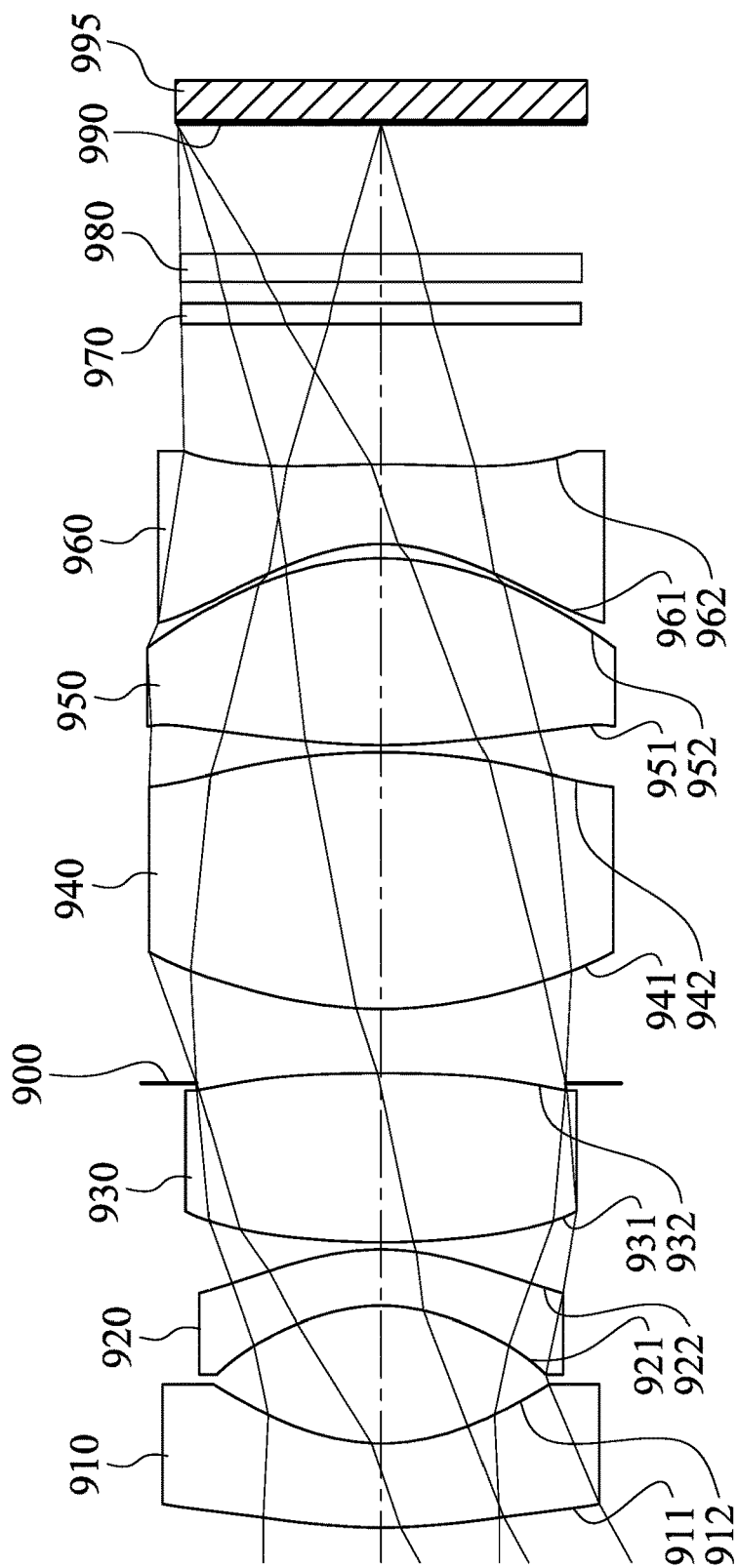
FIG. 17 is a schematic view of an image capturing apparatus according to the 9th embodiment of the present disclosure.
Figure 18:
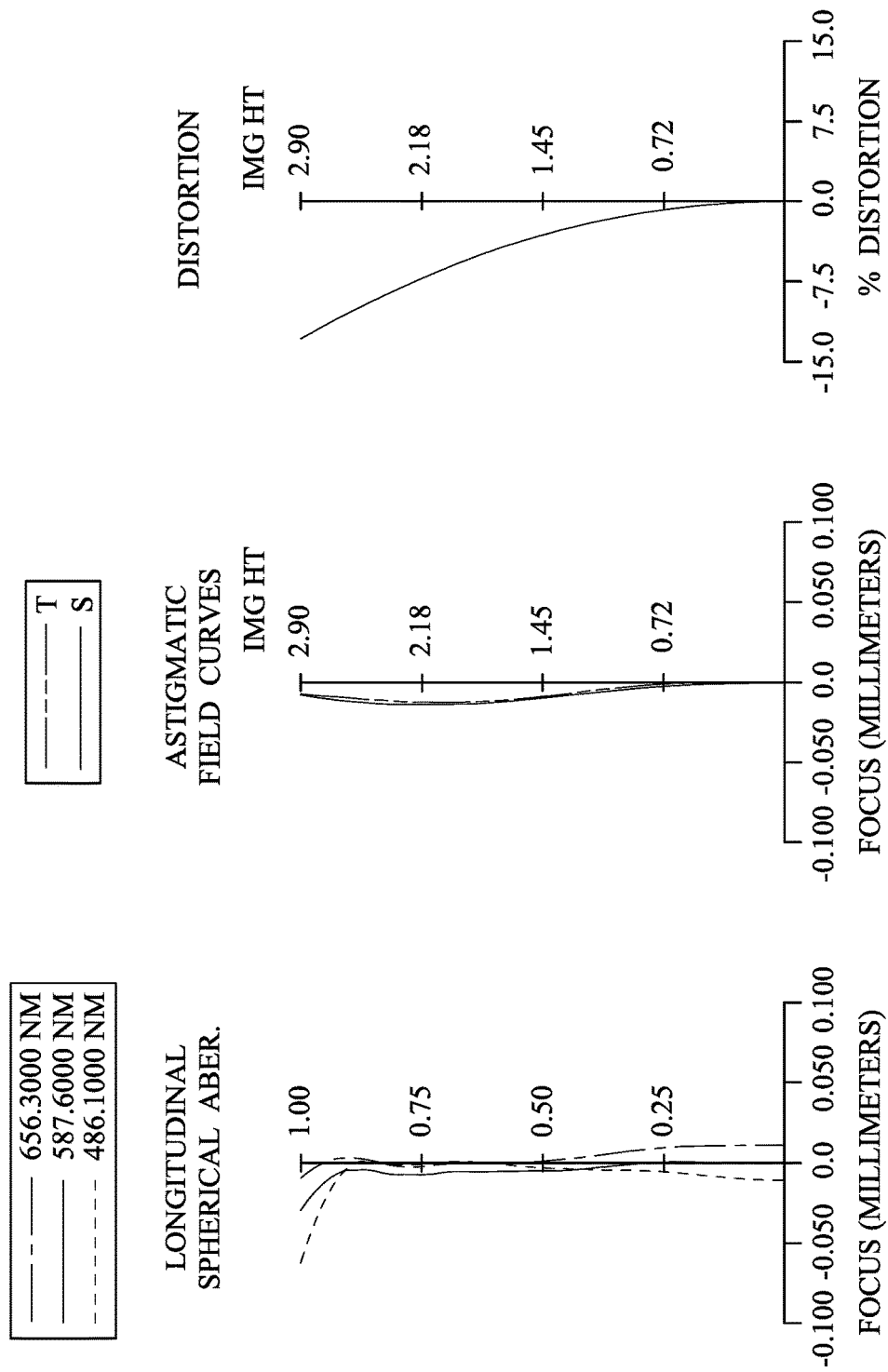
FIG. 18 shows spherical aberration curves, astigmatic field curves and a distortion curve of the image capturing apparatus according to the 9th embodiment.

FIG. 17 is a schematic view of an image capturing apparatus according to the 9th embodiment of the present disclosure. FIG. 18 shows spherical aberration curves, astigmatic field curves and a distortion curve of the image capturing apparatus according to the 9th embodiment. In FIG. 17, the image capturing apparatus includes an optical image assembly (its reference numeral is omitted) and an image sensor 995. The optical image assembly includes, in order from an object side to an image side, a first lens element 910, a second lens element 920, a third lens element 930, an aperture stop 900, a fourth lens element 940, a fifth lens element 950, a sixth lens element 960, a filter 970, a cover glass 980 and an image surface 990, wherein the image sensor 995 is disposed on the image surface 990 of the optical image assembly. The optical image assembly includes six lens elements (910, 920, 930, 940, 950, and 960) without additional one or more lens elements inserted between the first lens element 910 and the sixth lens element 960.

The first lens element 910 with negative refractive power has an object-side surface 911 being convex in a paraxial region thereof and an image-side surface 912 being concave in a paraxial region thereof. The first lens element 910 is made of a plastic material, and has the object-side surface 911 and the image-side surface 912 being both aspheric. Furthermore, the object-side surface 911 includes at least one inflection point.

The second lens element 920 with negative refractive power has an object-side surface 921 being concave in a paraxial region thereof and an image-side surface 922 being convex in a paraxial region thereof. The second lens element 920 is made of a plastic material, and has the object-side surface 921 and the image-side surface 922 being both aspheric. Furthermore, the image-side surface 922 includes at least one inflection point.

The third lens element 930 with positive refractive power has an object-side surface 931 being convex in a paraxial region thereof and an image-side surface 932 being convex in a paraxial region thereof. The third lens element 930 is made of a plastic material, and has the object-side surface 931 and the image-side surface 932 being both aspheric. Furthermore, the image-side surface 932 includes at least one inflection point.

The fourth lens element 940 with positive refractive power has an object-side surface 941 being convex in a paraxial region thereof and an image-side surface 942 being convex in a paraxial region thereof. The fourth lens element 940 is made of a plastic material, and has the object-side surface 941 and the image-side surface 942 being both aspheric. Furthermore, the image-side surface 942 includes at least one inflection point.

The fifth lens element 950 with positive refractive power has an object-side surface 951 being convex in a paraxial region thereof and an image-side surface 952 being convex in a paraxial region thereof. The fifth lens element 950 is made of a plastic material, and has the object-side surface 951 and the image-side surface 952 being both aspheric. Furthermore, the object-side surface 951 includes at least one inflection point.

The sixth lens element 960 with negative refractive power has an object-side surface 961 being concave in a paraxial region thereof and an image-side surface 962 being convex in a paraxial region thereof. The sixth lens element 960 is made of a plastic material, and has the object-side surface 961 and the image-side surface 962 being both aspheric. Furthermore, each of the object-side surface 961 and the image-side surface 962 includes at least one inflection point, and the image-side surface 962 includes a concave shape in an off-axial region thereof.

The filter 970 is made of a glass material, and the filter 970 and the cover glass 980 are located between the sixth lens element 960 and the image surface 990 in order, and will not affect the focal length of the optical image assembly.

The detailed optical data of the 9th embodiment are shown in Table 17 and the aspheric surface data are shown in Table 18 below.

TABLE 17

9th Embodiment
f = 6.04 mm, Fno = 1.80, HFOV = 28.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 8.000 | ASP | 1.200 | Plastic | 1.545 | 56.0 | −9.86 |
| 2 | | 3.043 | ASP | 1.962 | | | | |
| 3 | Lens 2 | −2.474 | ASP | 0.800 | Plastic | 1.639 | 23.5 | −21.2 |
| 4 | | −3.409 | ASP | 0.100 | | | | |
| 5 | Lens 3 | 10.712 | ASP | 2.411 | Plastic | 1.544 | 55.9 | 15.39 |
| 6 | | −35.213 | ASP | −0.143 | | | | |
| 7 | Ape. Stop | Plano | | 1.054 | | | | |
| 8 | Lens 4 | 6.094 | ASP | 3.654 | Plastic | 1.534 | 55.9 | 7.69 |
| 9 | | −9.957 | ASP | 0.100 | | | | |
| 10 | Lens 5 | 9.196 | ASP | 2.666 | Plastic | 1.534 | 55.9 | 5.61 |
| 11 | | −3.988 | ASP | 0.207 | | | | |
| 12 | Lens 6 | −2.436 | ASP | 1.127 | Plastic | 1.639 | 23.5 | −4.91 |
| 13 | | −12.932 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 1.868 | | | | |
| 18 | Image | Plano | | — | | | | |

Reference wavelength is 587.6 nm (d-line).

TABLE 18

Aspheric Coefficients

| Surface # | 1 | 2 | 3 | 4 | 5 | 6 |
|---|---|---|---|---|---|---|
| k = | −8.5869E+00 | −6.4134E−01 | −3.2610E+00 | −3.5607E+00 | 9.9803E+00 | 1.5706E+01 |
| A4 = | −2.3319E−03 | −3.3315E−03 | −1.1135E−03 | 4.3997E−03 | −3.5082E−03 | −6.2278E−03 |
| A6 = | −1.4867E−04 | −2.4685E−04 | −3.9643E−04 | −4.1150E−04 | 5.5148E−04 | 5.6181E−04 |
| A8 = | 2.6688E−05 | −1.8860E−05 | −1.0015E−04 | 3.4911E−05 | −1.7246E−05 | −3.4334E−05 |
| A10 = | −3.9745E−07 | 3.5289E−06 | 3.6339E−06 | −7.5310E−07 | −6.3415E−07 | 3.1320E−06 |

| Surface # | 8 | 9 | 10 | 11 | 12 | 13 |
|---|---|---|---|---|---|---|
| k = | −1.1030E+00 | −1.3885E+01 | −1.5131E+01 | −8.8143E+00 | −4.2539E+00 | −9.9000E+01 |
| A4 = | −1.2740E−03 | −3.8612E−03 | −2.4867E−03 | −1.0797E−02 | −1.1083E−03 | 1.1093E−02 |
| A6 = | −7.7428E−05 | 4.0325E−04 | 5.6567E−05 | 1.1472E−03 | −1.9023E−04 | −1.4429E−03 |
| A8 = | 1.5730E−05 | −1.2938E−05 | 4.6990E−05 | −5.7469E−05 | 4.3262E−05 | 1.2349E−04 |
| A10 = | −2.9141E−07 | 4.1059E−07 | −4.0147E−06 | 8.1261E−07 | −9.8505E−07 | −2.8472E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 6.04 | f/R9 | 0.66 |
| Fno | 1.80 | f/R3 + f/R4 | −4.22 |
| HFOV [deg.] | 28.8 | T12/f | 0.32 |
| tan(HFOV) | 0.55 | f/f1 | −0.61 |
| (V2 + V6)/2 | 23.49 | f2/f1 | 2.15 |
| 10 × Fno/V5 | 0.32 | (|P1| + |P2| + |P3| + |P4|)/(|P5| + |P6|) | 0.90 |
| (N1 + N3)/2 | 1.544 | SL/TL | 0.68 |
| T23/T12 | 0.05 | SD62/SD11 | 0.90 |
| ΣCT/ΣAT | 3.62 | (2 × SD62)/EPD | 1.67 |

-continued

| 9th Embodiment | | | |
|---|---|---|---|
| (R9 + R10)/(R9 − R10) | 0.40 | Yp62/f | 0.11 |
| (R11 + R12)/(R11 − R12) | −1.46 | SAG52/SAG61 | 1.14 |

10th Embodiment

Figure 19:
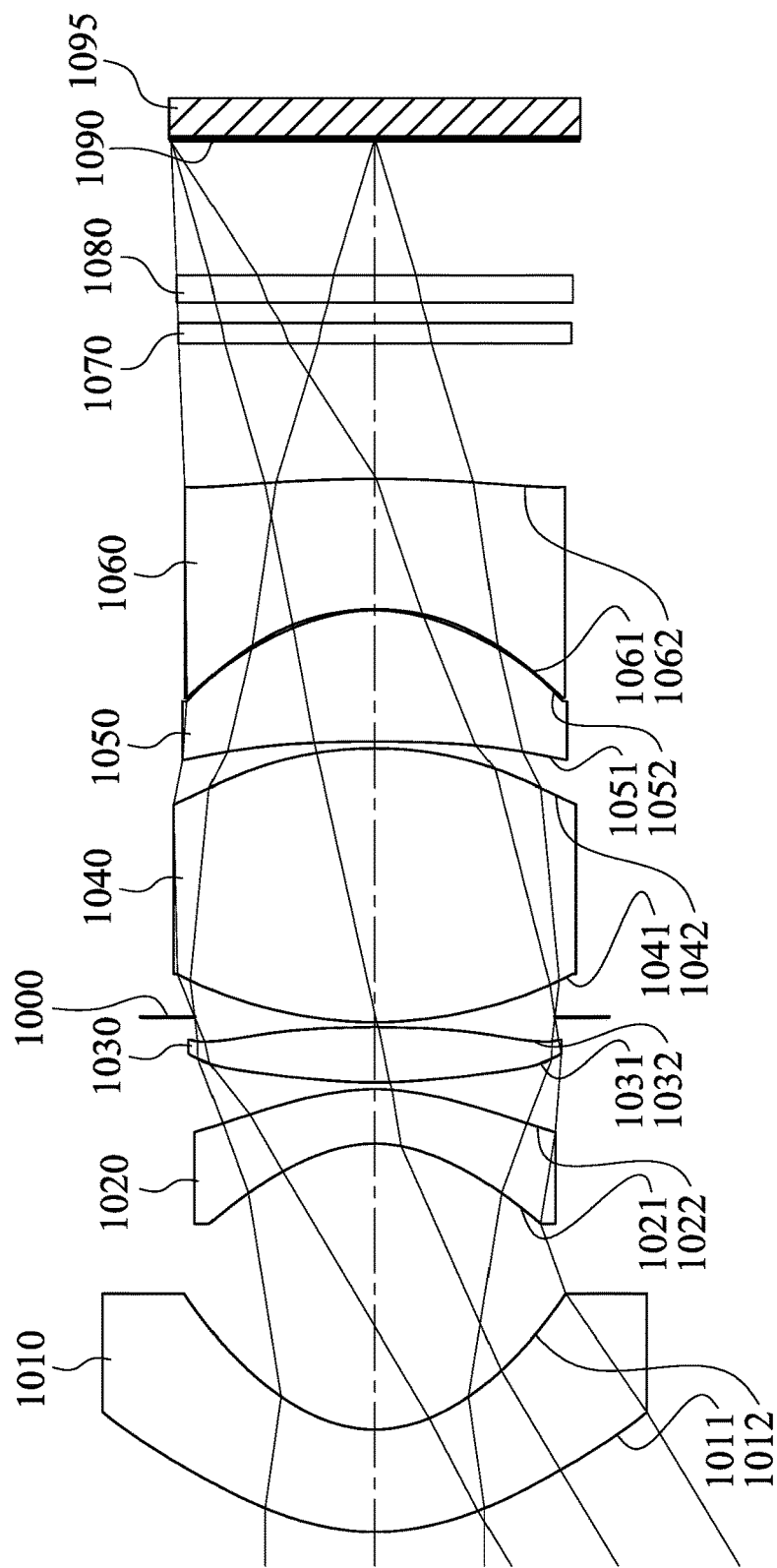
FIG. 19 is a schematic view of an image capturing apparatus according to the 10th embodiment of the present disclosure.
Figure 20:
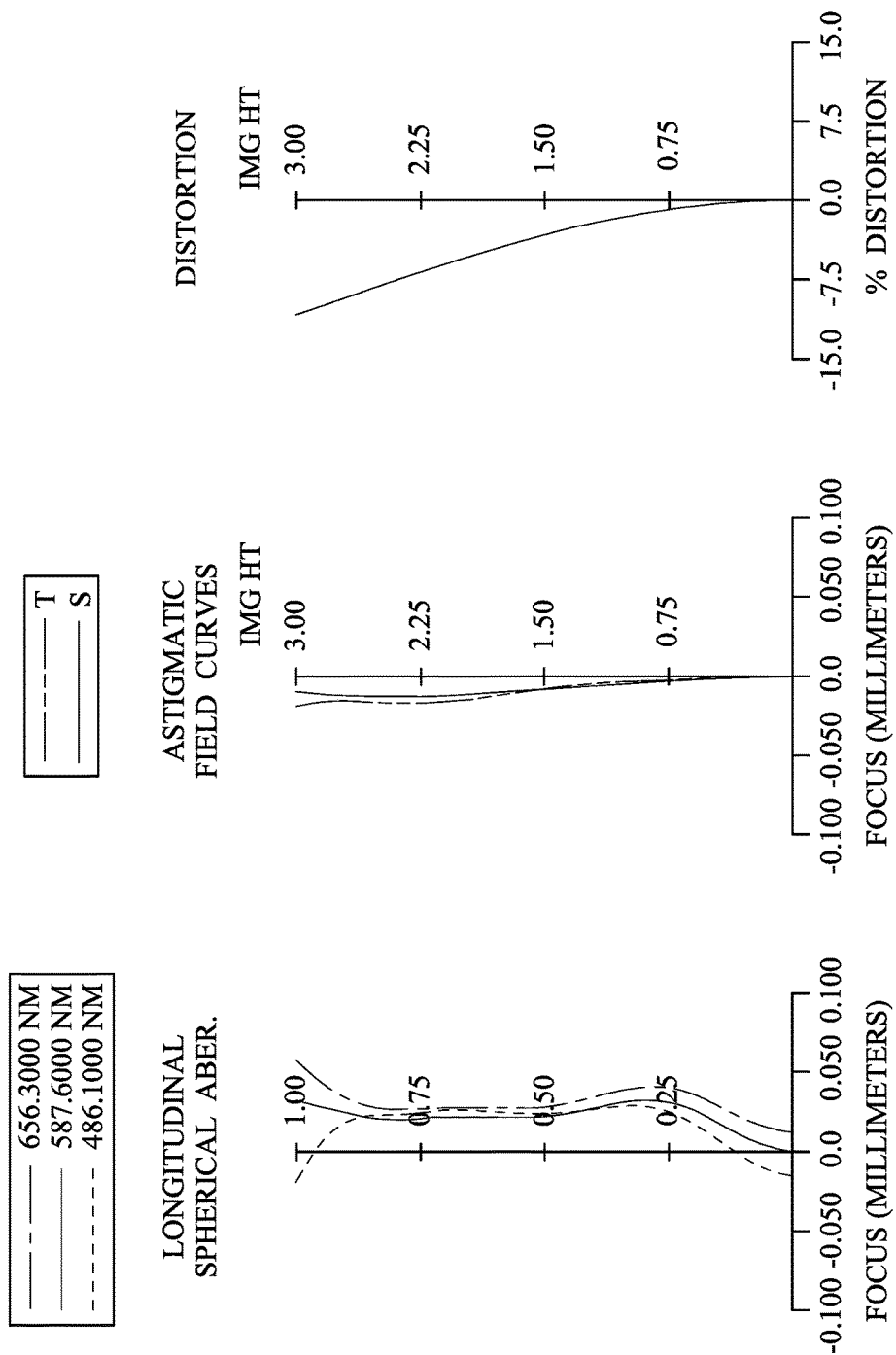
FIG. 20 shows spherical aberration curves, astigmatic field curves and a distortion curve of the image capturing apparatus according to the 10th embodiment.

FIG. 19 is a schematic view of an image capturing apparatus according to the 10th embodiment of the present disclosure. FIG. 20 shows spherical aberration curves, astigmatic field curves and a distortion curve of the image capturing apparatus according to the 10th embodiment. In FIG. 19, the image capturing apparatus includes an optical image assembly (its reference numeral is omitted) and an image sensor 1095. The optical image assembly includes, in order from an object side to an image side, a first lens element 1010, a second lens element 1020, a third lens element 1030, an aperture stop 1000, a fourth lens element 1040, a fifth lens element 1050, a sixth lens element 1060, a filter 1070, a cover glass 1080 and an image surface 1090, wherein the image sensor 1095 is disposed on the image surface 1090 of the optical image assembly. The optical image assembly includes six lens elements (1010, 1020, 1030, 1040, 1050, and 1060) without additional one or more lens elements inserted between the first lens element 1010 and the sixth lens element 1060.

The first lens element 1010 with negative refractive power has an object-side surface 1011 being convex in a paraxial region thereof and an image-side surface 1012 being concave in a paraxial region thereof. The first lens element 1010 is made of a plastic material, and has the object-side surface 1011 and the image-side surface 1012 being both aspheric.

The second lens element 1020 with negative refractive power has an object-side surface 1021 being concave in a paraxial region thereof and an image-side surface 1022 being convex in a paraxial region thereof. The second lens element 1020 is made of a plastic material, and has the object-side surface 1021 and the image-side surface 1022 being both aspheric. Furthermore, the image-side surface 1022 includes at least one inflection point.

The third lens element 1030 with positive refractive power has an object-side surface 1031 being convex in a paraxial region thereof and an image-side surface 1032 being convex in a paraxial region thereof. The third lens element 1030 is made of a plastic material, and has the object-side surface 1031 and the image-side surface 1032 being both aspheric. Furthermore, the image-side surface 1032 includes at least one inflection point.

The fourth lens element 1040 with positive refractive power has an object-side surface 1041 being convex in a paraxial region thereof and an image-side surface 1042 being convex in a paraxial region thereof. The fourth lens element 1040 is made of a plastic material, and has the object-side surface 1041 and the image-side surface 1042 being both aspheric. Furthermore, the image-side surface 1042 includes at least one inflection point.

The fifth lens element 1050 with positive refractive power has an object-side surface 1051 being concave in a paraxial region thereof and an image-side surface 1052 being convex in a paraxial region thereof. The fifth lens element 1050 is made of a plastic material, and has the object-side surface 1051 and the image-side surface 1052 being both aspheric. Furthermore, the object-side surface 1051 includes at least one inflection point.

The sixth lens element 1060 with negative refractive power has an object-side surface 1061 being concave in a paraxial region thereof and an image-side surface 1062 being convex in a paraxial region thereof. The sixth lens element 1060 is made of a plastic material, and has the object-side surface 1061 and the image-side surface 1062 being both aspheric. Furthermore, the image-side surface 1052 of the fifth lens element 1050 and the object-side surface 1061 of the sixth lens element 1060 are cemented, the image-side surface 1062 includes at least one inflection point and includes a concave shape in an off-axial region thereof.

The filter 1070 is made of a glass material, and the filter 1070 and the cover glass 1080 are located between the sixth lens element 1060 and the image surface 1090 in order, and will not affect the focal length of the optical image assembly.

The detailed optical data of the 10th embodiment are shown in Table 19 and the aspheric surface data are shown in Table 20 below.

TABLE 19

10th Embodiment
f = 5.56 mm, Fno = 1.72, HFOV = 31.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.625 | ASP | 1.510 | Plastic | 1.545 | 56.0 | −11.81 |
| 2 | | 1.978 | ASP | 4.212 | | | | |
| 3 | Lens 2 | −1.907 | ASP | 0.800 | Plastic | 1.671 | 19.5 | −8.02 |
| 4 | | −3.452 | ASP | 0.100 | | | | |
| 5 | Lens 3 | 7.906 | ASP | 0.807 | Plastic | 1.639 | 23.3 | 8.59 |
| 6 | | −17.183 | ASP | 0.150 | | | | |
| 7 | Ape. Stop | Plano | | −0.080 | | | | |
| 8 | Lens 4 | 5.826 | ASP | 4.034 | Plastic | 1.544 | 55.9 | 5.99 |
| 9 | | −5.580 | ASP | 0.100 | | | | |
| 10 | Lens 5 | −25.641 | ASP | 1.937 | Plastic | 1.534 | 55.9 | 5.37 |
| 11 | | −2.646 | ASP | 0.018 | Cement | 1.485 | 53.2 | |
| 12 | Lens 6 | −3.365 | ASP | 1.912 | Plastic | 1.671 | 19.5 | −6.19 |
| 13 | | −21.739 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 2.006 | | | | |
| 18 | Image | Plano | | — | | | | |

Reference wavelength is 587.6 nm (d-line).

TABLE 20

Aspheric Coefficients

| Surface # | 1 | 2 | 3 | 4 | 5 | 6 |
|---|---|---|---|---|---|---|
| k = | −8.5634E−01 | −6.3282E−01 | −3.0333E+00 | −7.1259E+00 | −1.3789E+01 | −2.0358E+00 |
| A4 = | −1.8969E−03 | −5.3058E−03 | −4.0843E−03 | 3.0167E−04 | −4.5583E−03 | −5.4978E−03 |
| A6 = | −1.4484E−04 | −6.9339E−04 | −5.2799E−04 | −4.8066E−04 | 5.7465E−04 | 8.4025E−04 |
| A8 = | 9.2474E−06 | 2.5619E−05 | 5.8194E−05 | 1.1038E−04 | −2.2967E−05 | −9.7011E−05 |
| A10 = | −7.3144E−08 | −2.3087E−06 | 9.9445E−07 | −6.1270E−06 | 5.7399E−06 | 1.2659E−05 |

| Surface # | 8 | 9 | 10 | 11 | 12 | 13 |
|---|---|---|---|---|---|---|
| k = | 1.1898E+00 | −2.7601E+00 | −4.9267E+00 | −6.7109E−01 | 8.2467E−02 | −2.2401E+01 |
| A4 = | −3.0620E−03 | −4.0097E−03 | −3.5731E−03 | 7.8439E−03 | −3.8646E−03 | −1.1076E−03 |
| A6 = | 1.5068E−04 | 2.9369E−04 | 2.3441E−04 | 5.7074E−04 | 8.7340E−04 | 2.1815E−04 |
| A8 = | −1.4649E−06 | −1.2537E−05 | −1.1942E−05 | −2.6285E−04 | −2.6906E−05 | 1.6519E−06 |
| A10 = | −3.7267E−07 | 1.3285E−06 | 1.1813E−06 | 1.7121E−05 | 4.3717E−06 | 5.8685E−09 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

10th Embodiment

| f [mm] | 5.56 | f/R9 | −0.22 |
|---|---|---|---|
| Fno | 1.72 | f/R3 + f/R4 | −4.53 |
| HFOV [deg.] | 31.1 | T12/f | 0.76 |
| tan(HFOV) | 0.60 | f/f1 | −0.47 |
| (V2 + V6)/2 | 19.48 | f2/f1 | 0.68 |
| 10 × Fno/V5 | 0.31 | (|P1| + |P2| + |P3| + |P4|)/(|P5| + |P6|) | 1.42 |
| (N1 + N3)/2 | 1.592 | SL/TL | 0.63 |
| T23/T12 | 0.02 | SD62/SD11 | 0.70 |
| ΣCT/ΣAT | 2.44 | (2 × SD62)/EPD | 1.73 |
| (R9 + R10)/(R9 − R10) | 1.23 | Yp62/f | 0.34 |
| (R11 + R12)/(R11 − R12) | −1.37 | SAG52/SAG61 | 1.03 |

11th Embodiment

Figure 21:
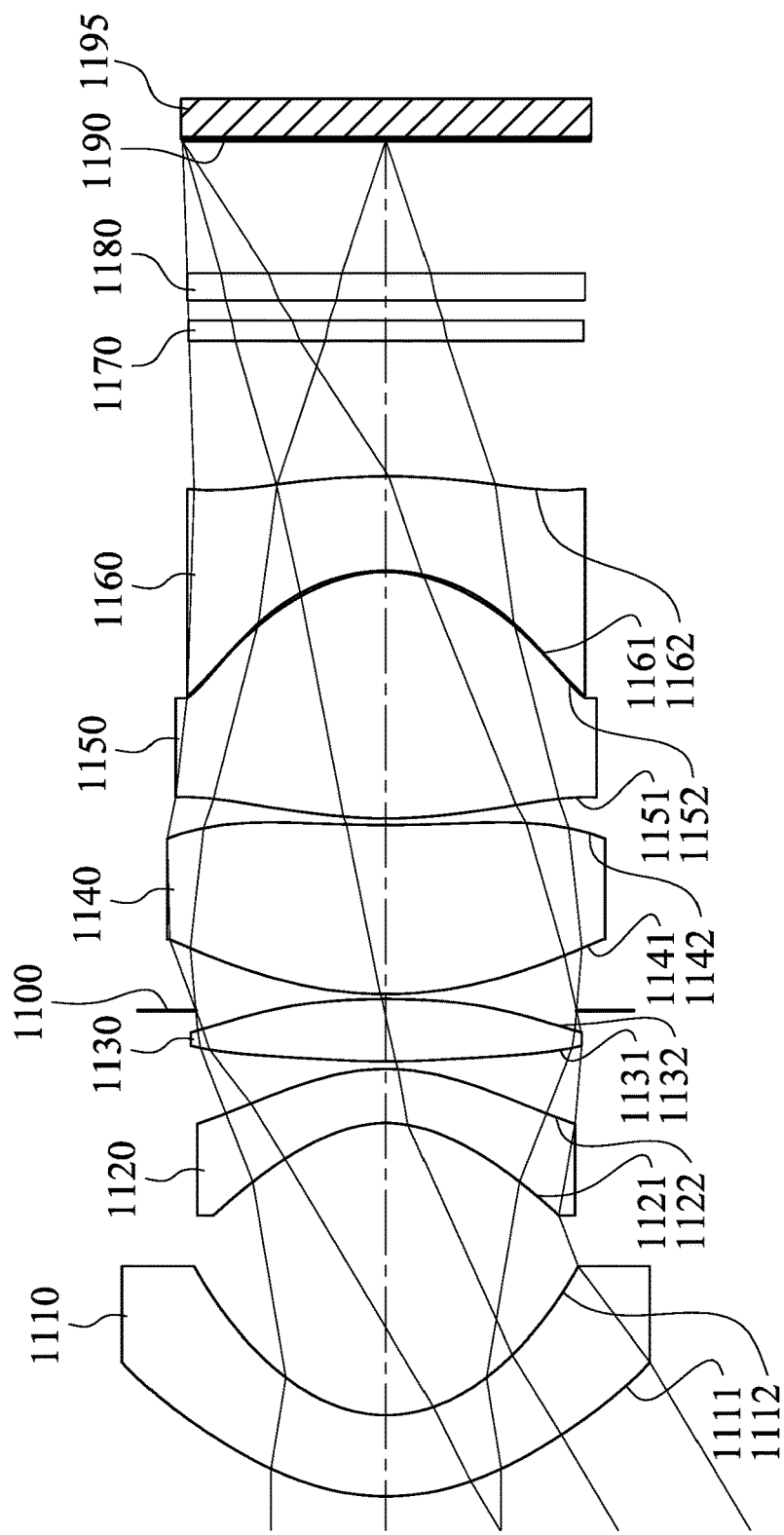
FIG. 21 is a schematic view of an image capturing apparatus according to the 11th embodiment of the present disclosure.
Figure 22:
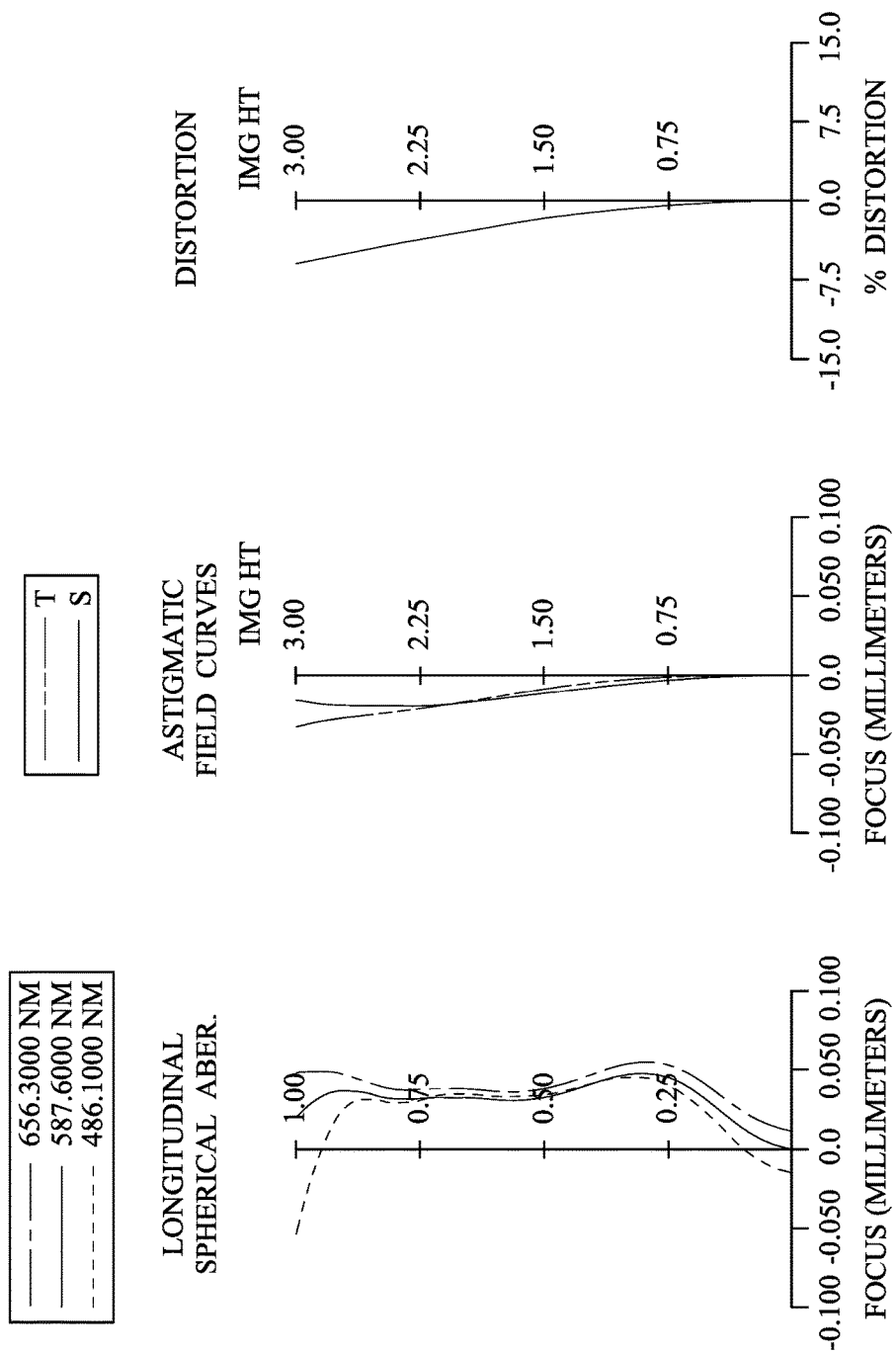
FIG. 22 shows spherical aberration curves, astigmatic field curves and a distortion curve of the image capturing apparatus according to the 11th embodiment.

FIG. 21 is a schematic view of an image capturing apparatus according to the 11th embodiment of the present disclosure. FIG. 22 shows spherical aberration curves, astigmatic field curves and a distortion curve of the image capturing apparatus according to the 11th embodiment. In FIG. 21, the image capturing apparatus includes an optical image assembly (its reference numeral is omitted) and an image sensor 1195. The optical image assembly includes, in order from an object side to an image side, a first lens element 1110, a second lens element 1120, a third lens element 1130, an aperture stop 1100, a fourth lens element 1140, a fifth lens element 1150, a sixth lens element 1160, a filter 1170, a cover glass 1180 and an image surface 1190, wherein the image sensor 1195 is disposed on the image surface 1190 of the optical image assembly. The optical image assembly includes six lens elements (1110, 1120, 1130, 1140, 1150, and 1160) without additional one or more lens elements inserted between the first lens element 1110 and the sixth lens element 1160.

The first lens element 1110 with negative refractive power has an object-side surface 1111 being convex in a paraxial region thereof and an image-side surface 1112 being concave in a paraxial region thereof. The first lens element 1110 is made of a plastic material, and has the object-side surface 1111 and the image-side surface 1112 being both aspheric.

The second lens element 1120 with negative refractive power has an object-side surface 1121 being concave in a paraxial region thereof and an image-side surface 1122 being convex in a paraxial region thereof. The second lens element 1120 is made of a plastic material, and has the object-side surface 1121 and the image-side surface 1122 being both aspheric. Furthermore, the image-side surface 1122 includes at least one inflection point.

The third lens element 1130 with positive refractive power has an object-side surface 1131 being convex in a paraxial region thereof and an image-side surface 1132 being convex in a paraxial region thereof. The third lens element 1130 is made of a plastic material, and has the object-side surface 1131 and the image-side surface 1132 being both aspheric. Furthermore, the image-side surface 1132 includes at least one inflection point.

The fourth lens element 1140 with positive refractive power has an object-side surface 1141 being convex in a paraxial region thereof and an image-side surface 1142 being concave in a paraxial region thereof. The fourth lens element 1140 is made of a plastic material, and has the object-side surface 1141 and the image-side surface 1142 being both aspheric. Furthermore, the image-side surface 1142 includes at least one inflection point.

The fifth lens element 1150 with positive refractive power has an object-side surface 1151 being convex in a paraxial region thereof and an image-side surface 1152 being convex in a paraxial region thereof. The fifth lens element 1150 is made of a plastic material, and has the object-side surface 1151 and the image-side surface 1152 being both aspheric. Furthermore, each of the object-side surface 1151 and the image-side surface 1152 includes at least one inflection point.

The sixth lens element 1160 with negative refractive power has an object-side surface 1161 being concave in a paraxial region thereof and an image-side surface 1162 being convex in a paraxial region thereof. The sixth lens element 1160 is made of a plastic material, and has the object-side surface 1161 and the image-side surface 1162 being both aspheric. Furthermore, the image-side surface 1152 of the fifth lens element 1150 and the object-side surface 1161 of the sixth lens element 1160 are cemented, each of the object-side surface 1161 and the image-side surface 1162 includes at least one inflection point, and the image-side surface 1162 includes a concave shape in an off-axial region thereof.

The filter 1170 is made of a glass material, and the filter 1170 and the cover glass 1180 are located between the sixth lens element 1160 and the image surface 1190 in order, and will not affect the focal length of the optical image assembly.

The detailed optical data of the 11th embodiment are shown in Table 21 and the aspheric surface data are shown in Table 22 below.

TABLE 21

11th Embodiment
f = 5.35 mm, Fno = 1.58, HFOV = 30.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 3.448 | ASP | 1.200 | Plastic | 1.545 | 56.0 | −12.46 |
| 2 | | 2.006 | ASP | 4.308 | | | | |
| 3 | Lens 2 | −1.798 | ASP | 0.800 | Plastic | 1.671 | 19.5 | −9.21 |
| 4 | | −2.989 | ASP | 0.100 | | | | |
| 5 | Lens 3 | 11.852 | ASP | 0.924 | Plastic | 1.544 | 56.0 | 10.77 |
| 6 | | −11.274 | ASP | −0.171 | | | | |
| 7 | Ape. Stop | Plano | | 0.241 | | | | |
| 8 | Lens 4 | 5.639 | ASP | 2.500 | Plastic | 1.639 | 23.5 | 11.53 |
| 9 | | 19.911 | ASP | 0.100 | | | | |
| 10 | Lens 5 | 7.566 | ASP | 3.629 | Plastic | 1.534 | 55.9 | 3.56 |
| 11 | | −2.111 | ASP | 0.018 | Cement | 1.485 | 53.2 | |
| 12 | Lens 6 | −2.568 | ASP | 1.388 | Plastic | 1.671 | 19.5 | −5.68 |
| 13 | | −9.601 | ASP | 2.000 | | | | |
| 14 | Filter | Plano | | 0.300 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 1.969 | | | | |
| 18 | Image | Plano | | — | | | | |

Reference wavelength is 587.6 nm (d-line).

TABLE 22

Aspheric Coefficients

| Surface # | 1 | 2 | 3 | 4 | 5 | 6 |
|---|---|---|---|---|---|---|
| k = | −6.5625E−01 | −6.3154E−01 | −2.4924E+00 | −4.8295E+00 | −3.3263E+01 | 1.1500E+01 |
| A4 = | −1.9993E−03 | −3.2740E−03 | −3.1092E−03 | −6.9546E−04 | −4.7405E−03 | −5.4140E−03 |
| A6 = | −9.1278E−05 | −3.5866E−04 | −8.0153E−04 | −2.4911E−04 | 5.9434E−04 | 9.6206E−04 |
| A8 = | 2.6145E−06 | −1.1282E−05 | 1.5146E−04 | 8.6026E−05 | −1.9864E−06 | −7.4630E−05 |
| A10 = | 1.3834E−07 | −1.6670E−08 | −7.0283E−06 | −4.4108E−06 | −7.0044E−07 | 5.0391E−06 |

| Surface # | 8 | 9 | 10 | 11 | 12 | 13 |
|---|---|---|---|---|---|---|
| k = | 1.2022E+00 | −3.0981E+01 | −6.2881E+00 | −1.0394E+00 | −1.5470E+00 | −1.2501E+01 |
| A4 = | −2.9402E−03 | −3.9445E−03 | −2.9270E−03 | 6.0572E−03 | −1.1783E−02 | −1.2109E−04 |
| A6 = | 1.0938E−04 | 1.0257E−04 | 3.5719E−04 | −2.7453E−04 | 2.1933E−04 | 2.9739E−04 |
| A8 = | −1.3678E−05 | −2.4231E−05 | −4.8006E−05 | −2.4234E−04 | 3.0040E−05 | 2.7112E−06 |
| A10 = | −2.2746E−07 | 1.3934E−06 | 1.6735E−06 | 2.5312E−05 | 3.5583E−06 | 6.1424E−08 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th Embodiment | | | |
|---|---|---|---|
| f [mm] | 5.35 | f/R9 | 0.71 |
| Fno | 1.58 | f/R3 + f/R4 | −4.77 |
| HFOV [deg.] | 30.7 | T12/f | 0.80 |
| tan(HFOV) | 0.59 | f/f1 | −0.43 |
| (V2 + V6)/2 | 19.48 | f2/f1 | 0.74 |
| 10 × Fno/V5 | 0.28 | (\|P1\| + \|P2\| + \|P3\| + \|P4\|)/(\|P5\| + \|P6\|) | 0.81 |
| (N1 + N3)/2 | 1.544 | SL/TL | 0.64 |
| T23/T12 | 0.02 | SD62/SD11 | 0.73 |
| ΣCT/ΣAT | 2.27 | (2 × SD62)/EPD | 1.67 |

-continued

| 11th Embodiment | | | |
|---|---|---|---|
| (R9 + R10)/(R9 − R10) | 0.56 | Yp62/f | 0.31 |
| (R11 + R12)/(R11 − R12) | −1.73 | SAG52/SAG61 | 1.01 |

12th Embodiment

Figure 23:
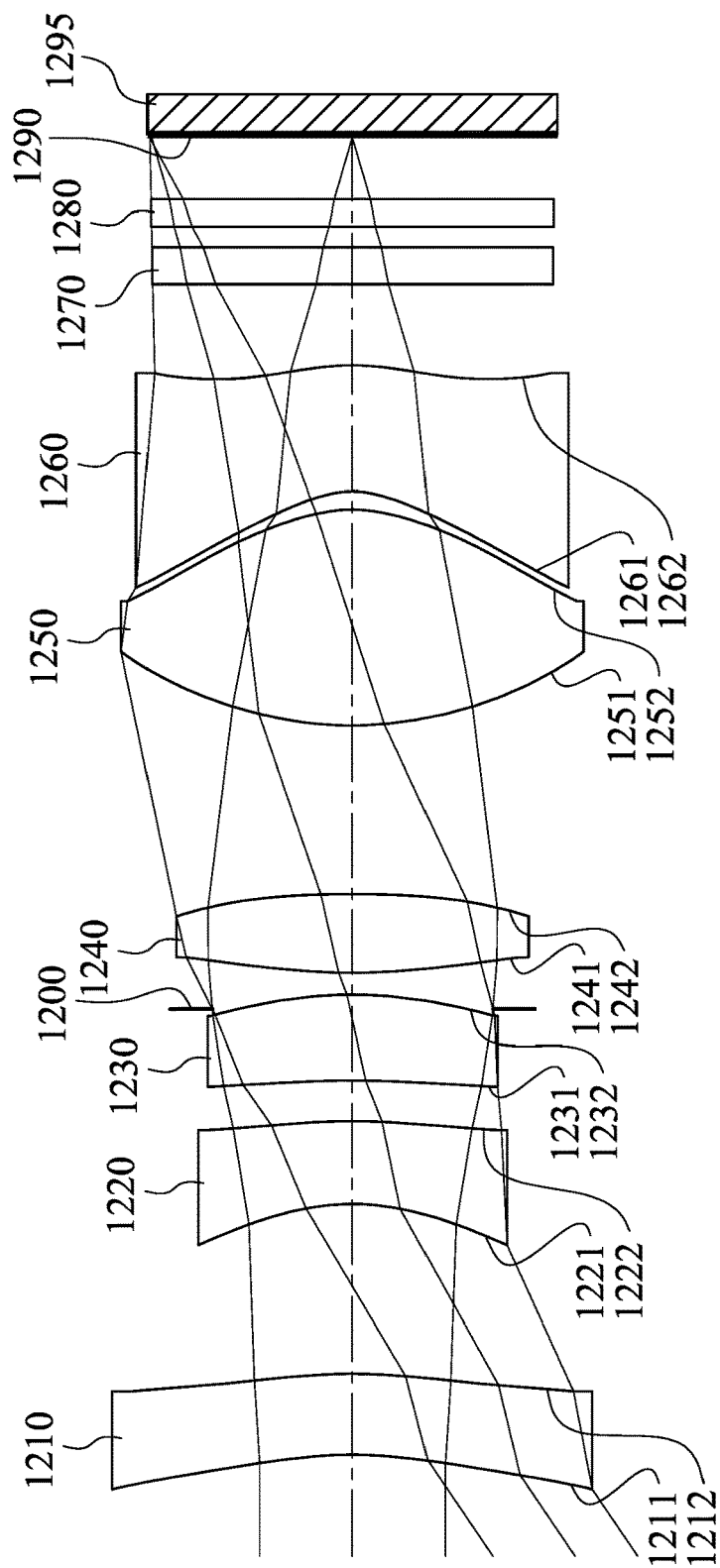
FIG. 23 is a schematic view of an image capturing apparatus according to the 12th embodiment of the present disclosure.
Figure 24:
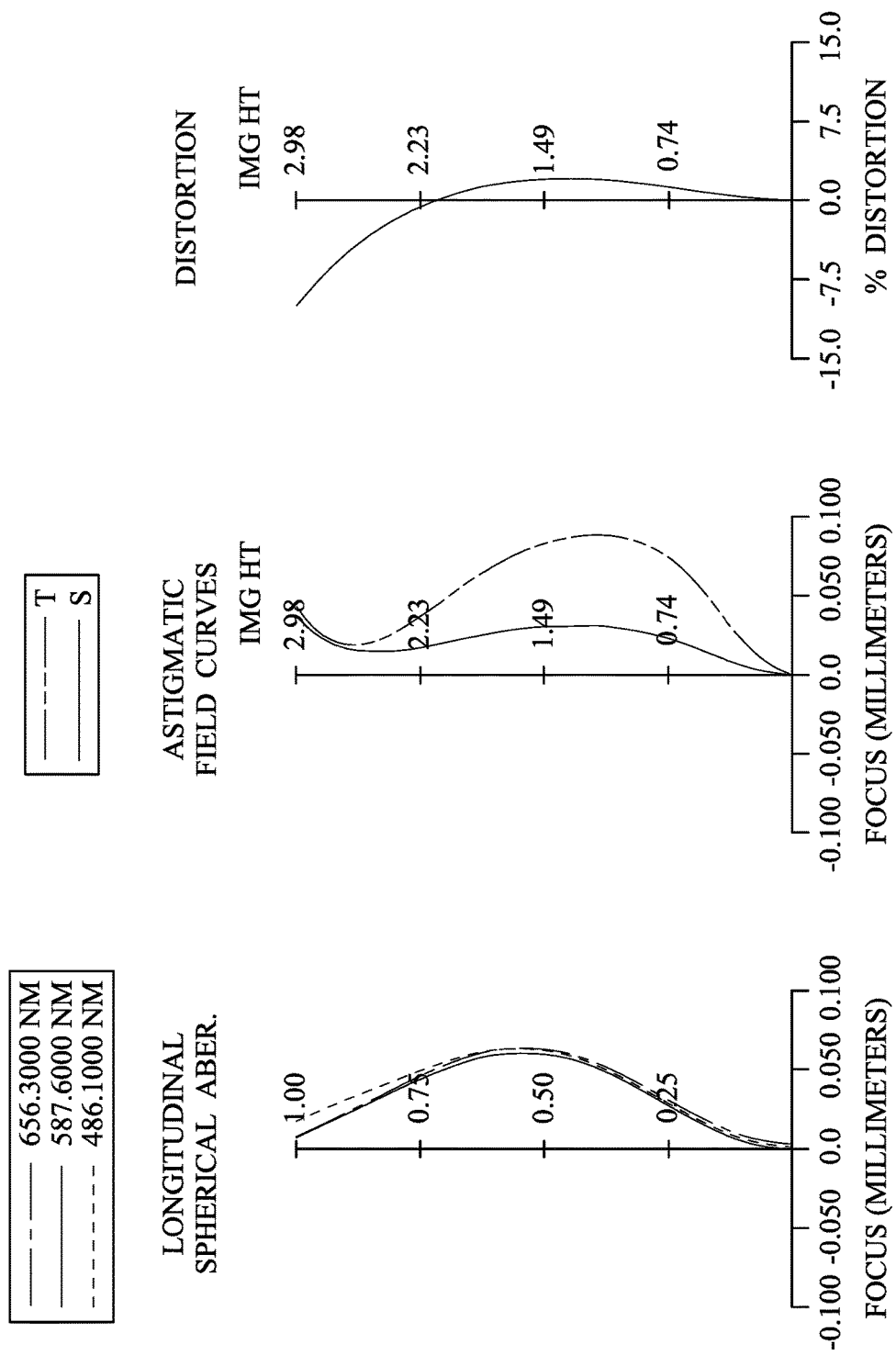
FIG. 24 shows spherical aberration curves, astigmatic field curves and a distortion curve of the image capturing apparatus according to the 12th embodiment.

FIG. 23 is a schematic view of an image capturing apparatus according to the 12th embodiment of the present disclosure. FIG. 24 shows spherical aberration curves, astigmatic field curves and a distortion curve of the image capturing apparatus according to the 12th embodiment. In FIG. 23, the image capturing apparatus includes an optical image assembly (its reference numeral is omitted) and an image sensor 1295. The optical image assembly includes, in order from an object side to an image side, a first lens element 1210, a second lens element 1220, a third lens element 1230, an aperture stop 1200, a fourth lens element 1240, a fifth lens element 1250, a sixth lens element 1260, a filter 1270, a cover glass 1280 and an image surface 1290, wherein the image sensor 1295 is disposed on the image surface 1290 of the optical image assembly. The optical image assembly includes six lens elements (1210, 1220, 1230, 1240, 1250, and 1260) without additional one or more lens elements inserted between the first lens element 1210 and the sixth lens element 1260.

The first lens element 1210 with negative refractive power has an object-side surface 1211 being concave in a paraxial region thereof and an image-side surface 1212 being convex in a paraxial region thereof. The first lens element 1210 is made of a glass material, and has the object-side surface 1211 and the image-side surface 1212 being both aspheric. Furthermore, the image-side surface 1212 includes at least one inflection point.

The second lens element 1220 with negative refractive power has an object-side surface 1221 being concave in a paraxial region thereof and an image-side surface 1222 being convex in a paraxial region thereof. The second lens element 1220 is made of a plastic material, and has the object-side surface 1221 and the image-side surface 1222 being both aspheric. Furthermore, the image-side surface 1222 includes at least one inflection point.

The third lens element 1230 with positive refractive power has an object-side surface 1231 being concave in a paraxial region thereof and an image-side surface 1232 being convex in a paraxial region thereof. The third lens element 1230 is made of a plastic material, and has the object-side surface 1231 and the image-side surface 1232 being both aspheric. Furthermore, the object-side surface 1231 includes at least one inflection point.

The fourth lens element 1240 with positive refractive power has an object-side surface 1241 being convex in a paraxial region thereof and an image-side surface 1242 being convex in a paraxial region thereof. The fourth lens element 1240 is made of a plastic material, and has the object-side surface 1241 and the image-side surface 1242 being both aspheric.

The fifth lens element 1250 with positive refractive power has an object-side surface 1251 being convex in a paraxial region thereof and an image-side surface 1252 being convex in a paraxial region thereof. The fifth lens element 1250 is made of a plastic material, and has the object-side surface 1251 and the image-side surface 1252 being both aspheric. Furthermore, the image-side surface 1252 includes at least one inflection point.

The sixth lens element 1260 with negative refractive power has an object-side surface 1261 being concave in a paraxial region thereof and an image-side surface 1262 being convex in a paraxial region thereof. The sixth lens element 1260 is made of a plastic material, and has the object-side surface 1261 and the image-side surface 1262 being both aspheric. Furthermore, each of the object-side surface 1261 and the image-side surface 1262 includes at least one inflection point, and the image-side surface 1262 includes a concave shape in an off-axial region thereof.

The filter 1270 is made of a glass material, and the filter 1270 and the cover glass 1280 are located between the sixth lens element 1260 and the image surface 1290 in order, and will not affect the focal length of the optical image assembly.

The detailed optical data of the 12th embodiment are shown in Table 23 and the aspheric surface data are shown in Table 24 below.

TABLE 23

12th Embodiment
f = 4.88 mm, Fno = 1.78, HFOV = 34.1 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −6.299 | ASP | 1.200 | Glass | 1.757 | 47.7 | −61.48 |
| 2 | | −7.883 | ASP | 2.505 | | | | |
| 3 | Lens 2 | −3.525 | ASP | 1.226 | Plastic | 1.671 | 19.5 | −8.48 |
| 4 | | −10.573 | ASP | 0.601 | | | | |
| 5 | Lens 3 | −17.064 | ASP | 1.265 | Plastic | 1.671 | 19.5 | 14.83 |
| 6 | | −6.471 | ASP | −0.214 | | | | |
| 7 | Ape. Stop | Plano | | 0.537 | | | | |
| 8 | Lens 4 | 8.892 | ASP | 1.164 | Plastic | 1.534 | 55.9 | 11.94 |
| 9 | | −21.513 | ASP | 2.488 | | | | |
| 10 | Lens 5 | 5.258 | ASP | 3.199 | Plastic | 1.534 | 55.9 | 3.32 |
| 11 | | −2.109 | ASP | 0.266 | | | | |
| 12 | Lens 6 | −1.427 | ASP | 1.863 | Plastic | 1.671 | 19.5 | −5.27 |
| 13 | | −3.646 | ASP | 1.200 | | | | |
| 14 | Filter | Plano | | 0.550 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 0.959 | | | | |
| 18 | Image | Plano | | — | | | | |

Reference wavelength is 587.6 nm (d-line).

TABLE 24

Aspheric Coefficients

| Surface # | 1 | 2 | 3 | 4 | 5 | 6 |
|---|---|---|---|---|---|---|
| k = | −1.7107E+01 | −2.8834E+01 | −3.9109E+00 | 2.5543E+00 | 2.0128E+01 | −1.5737E+00 |
| A4 = | 1.5024E−03 | 2.6197E−03 | −1.6668E−03 | 3.9790E−03 | 1.9931E−03 | 5.7013E−04 |
| A6 = | −8.8326E−05 | −1.3293E−04 | 1.9844E−04 | 1.2940E−04 | 1.3055E−04 | 9.9084E−05 |

| Surface # | 8 | 9 | 10 | 11 | 12 | 13 |
|---|---|---|---|---|---|---|
| k = | −2.8111E+00 | 1.0758E+01 | 3.3229E−01 | −6.9719E+00 | −3.8211E+00 | −6.5740E+00 |
| A4 = | −4.5540E−03 | −6.0893E−03 | −2.8395E−03 | −9.3717E−03 | 3.1338E−03 | 1.9720E−02 |
| A6 = | 3.5578E−04 | 4.0626E−04 | 2.8835E−05 | 8.7802E−04 | −9.1677E−04 | −1.8700E−03 |
| A8 = | −7.0152E−06 | −5.0030E−06 | 1.5714E−05 | −2.2775E−05 | 9.1950E−05 | 4.8947E−05 |
| A10 = | | | −8.5978E−07 | −6.1383E−08 | −2.8073E−06 | 2.1161E−06 |

In the 12th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 12th embodiment, so an explanation in this regard will not be provided again.

Moreover, these parameters can be calculated from Table 23 and Table 24 as the following values and satisfy the following conditions:

| 12th Embodiment | | | |
|---|---|---|---|
| f [mm] | 4.88 | f/R9 | 0.93 |
| Fno | 1.78 | f/R3 + f/R4 | −1.84 |
| HFOV [deg.] | 34.1 | T12/f | 0.51 |
| tan(HFOV) | 0.68 | f/f1 | −0.08 |
| (V2 + V6)/2 | 19.48 | f2/f1 | 0.14 |
| 10 × Fno/V5 | 0.32 | (|P1| + |P2| + |P3| + |P4|)/(|P5| + |P6|) | 0.58 |
| (N1 + N3)/2 | 1.714 | SL/TL | 0.66 |
| T23/T12 | 0.24 | SD62/SD11 | 0.83 |
| ΣCT/ΣAT | 1.60 | (2 × SD62)/EPD | 2.13 |
| (R9 + R10)/(R9 − R10) | 0.43 | Yp62/f | 0.19 |
| (R11 + R12)/(R11 − R12) | −2.29 | SAG52/SAG61 | 0.95 |

13th Embodiment

Figure 25:
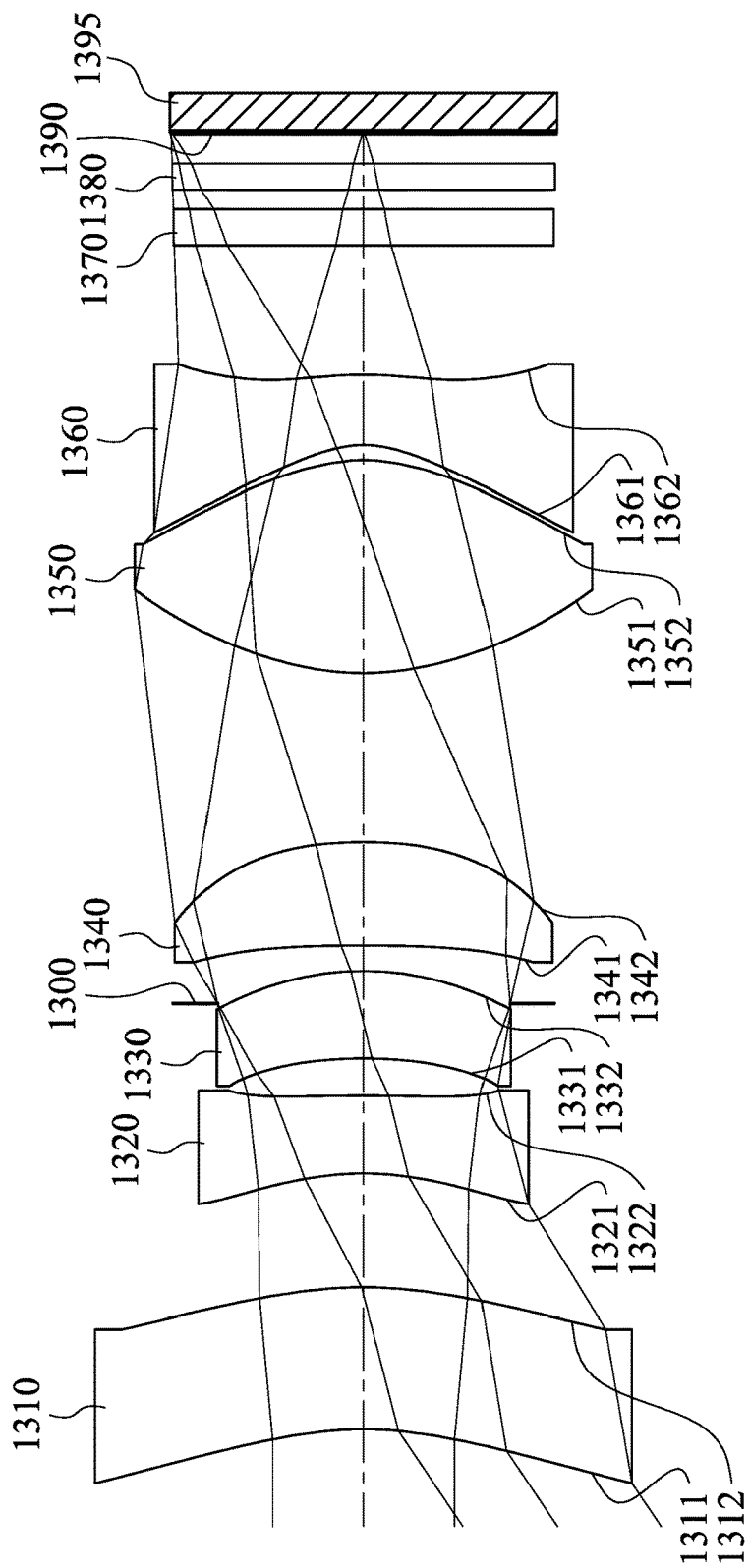
FIG. 25 is a schematic view of an image capturing apparatus according to the 13th embodiment of the present disclosure.
Figure 26:
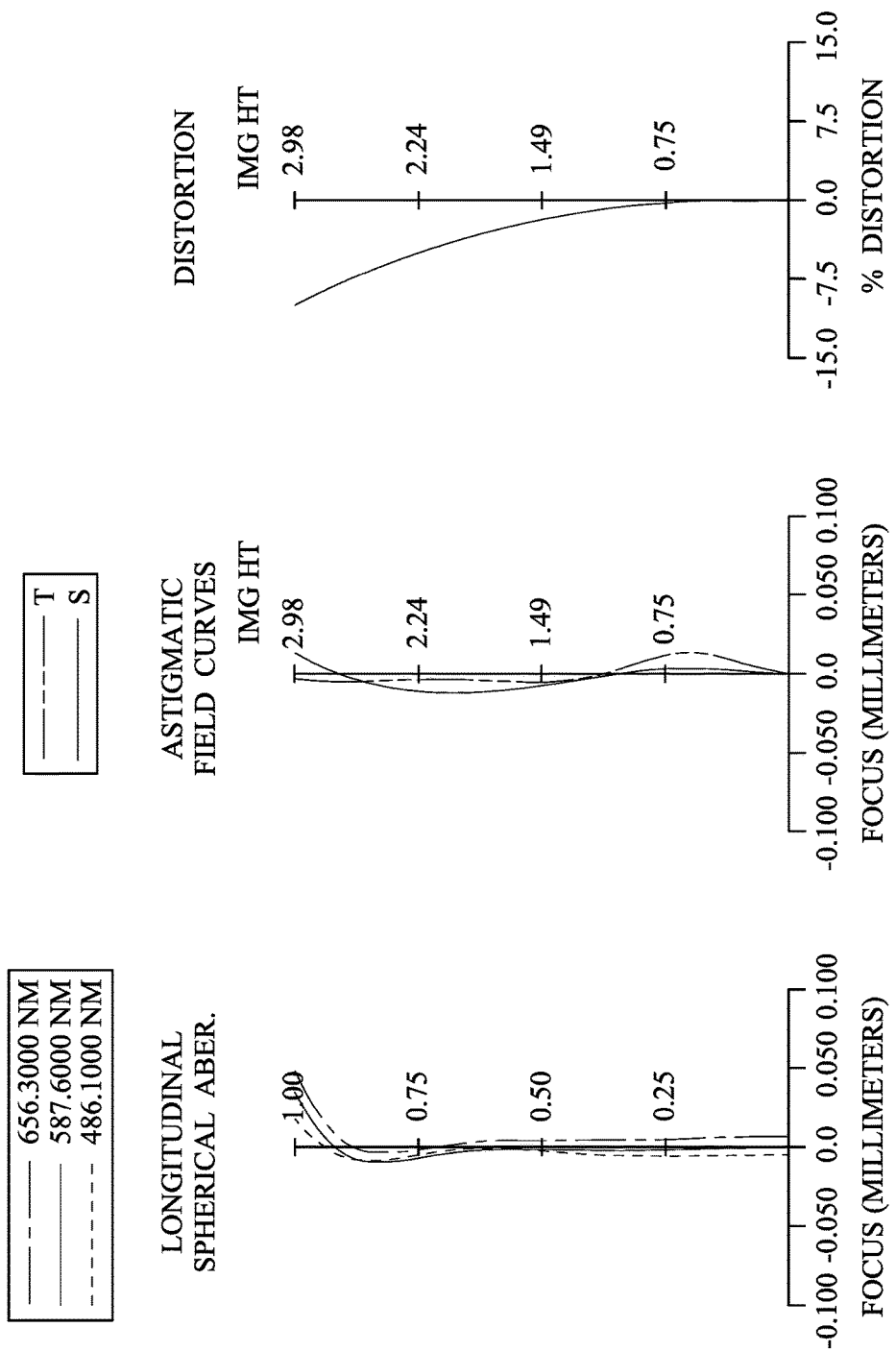
FIG. 26 shows spherical aberration curves, astigmatic field curves and a distortion curve of the image capturing apparatus according to the 13th embodiment.

FIG. 25 is a schematic view of an image capturing apparatus according to the 13th embodiment of the present disclosure. FIG. 26 shows spherical aberration curves, astigmatic field curves and a distortion curve of the image capturing apparatus according to the 13th embodiment. In FIG. 25, the image capturing apparatus includes an optical image assembly (its reference numeral is omitted) and an image sensor 1395. The optical image assembly includes, in order from an object side to an image side, a first lens element 1310, a second lens element 1320, a third lens element 1330, an aperture stop 1300, a fourth lens element 1340, a fifth lens element 1350, a sixth lens element 1360, a filter 1370, a cover glass 1380 and an image surface 1390, wherein the image sensor 1395 is disposed on the image surface 1390 of the optical image assembly. The optical image assembly includes six lens elements (1310, 1320, 1330, 1340, 1350, and 1360) without additional one or more lens elements inserted between the first lens element 1310 and the sixth lens element 1360.

The first lens element 1310 with positive refractive power has an object-side surface 1311 being concave in a paraxial region thereof and an image-side surface 1312 being convex in a paraxial region thereof. The first lens element 1310 is made of a glass material, and has the object-side surface 1311 and the image-side surface 1312 being both aspheric. Furthermore, each of the object-side surface 1311 and the image-side surface 1312 includes at least one inflection point.

The second lens element 1320 with negative refractive power has an object-side surface 1321 being concave in a paraxial region thereof and an image-side surface 1322 being convex in a paraxial region thereof. The second lens element 1320 is made of a plastic material, and has the object-side surface 1321 and the image-side surface 1322 being both aspheric. Furthermore, each of the object-side surface 1321 and the image-side surface 1322 includes at least one inflection point.

The third lens element 1330 with positive refractive power has an object-side surface 1331 being concave in a paraxial region thereof and an image-side surface 1332 being convex in a paraxial region thereof. The third lens element 1330 is made of a plastic material, and has the object-side surface 1331 and the image-side surface 1332 being both aspheric.

The fourth lens element 1340 with positive refractive power has an object-side surface 1341 being concave in a paraxial region thereof and an image-side surface 1342 being convex in a paraxial region thereof. The fourth lens element 1340 is made of a plastic material, and has the object-side surface 1341 and the image-side surface 1342 being both aspheric.

The fifth lens element 1350 with positive refractive power has an object-side surface 1351 being convex in a paraxial region thereof and an image-side surface 1352 being convex in a paraxial region thereof. The fifth lens element 1350 is made of a plastic material, and has the object-side surface 1351 and the image-side surface 1352 being both aspheric. Furthermore, the image-side surface 1352 includes at least one inflection point.

The sixth lens element 1360 with negative refractive power has an object-side surface 1361 being concave in a paraxial region thereof and an image-side surface 1362 being convex in a paraxial region thereof. The sixth lens element 1360 is made of a plastic material, and has the object-side surface 1361 and the image-side surface 1362 being both aspheric. Furthermore, each of the object-side surface 1361 and the image-side surface 1362 includes at least one inflection point, and the image-side surface 1362 includes a concave shape in an off-axial region thereof.

The filter 1370 is made of a glass material, and the filter 1370 and the cover glass 1380 are located between the sixth lens element 1360 and the image surface 1390 in order, and will not affect the focal length of the optical image assembly.

The detailed optical data of the 13th embodiment are shown in Table 25 and the aspheric surface data are shown in Table 26 below.

TABLE 25

13th Embodiment
f = 4.91 mm, Fno = 1.75, HFOV = 34.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −5.685 | ASP | 2.188 | Glass | 1.883 | 40.8 | 150.78 |
| 2 | | −6.436 | ASP | 1.759 | | | | |
| 3 | Lens 2 | −4.613 | ASP | 1.200 | Plastic | 1.671 | 19.5 | −8.31 |
| 4 | | −29.550 | ASP | 0.577 | | | | |
| 5 | Lens 3 | −7.098 | ASP | 1.342 | Plastic | 1.671 | 19.5 | 15.63 |
| 6 | | −4.554 | ASP | −0.500 | | | | |
| 7 | Ape. Stop | Plano | | 0.892 | | | | |
| 8 | Lens 4 | −35.286 | ASP | 1.604 | Plastic | 1.534 | 55.9 | 14.34 |
| 9 | | −6.390 | ASP | 2.597 | | | | |
| 10 | Lens 5 | 4.284 | ASP | 3.285 | Plastic | 1.534 | 55.9 | 3.69 |
| 11 | | −2.670 | ASP | 0.234 | | | | |
| 12 | Lens 6 | −1.613 | ASP | 1.086 | Plastic | 1.671 | 19.5 | −3.94 |
| 13 | | −5.253 | ASP | 2.000 | | | | |
| 14 | Filter | Plano | | 0.550 | Glass | 1.517 | 64.2 | — |
| 15 | | Plano | | 0.300 | | | | |
| 16 | Cover glass | Plano | | 0.400 | Glass | 1.517 | 64.2 | — |
| 17 | | Plano | | 0.489 | | | | |
| 18 | Image | Plano | | — | | | | |

Reference wavelength is 587.6 nm (d-line).

TABLE 26

Aspheric Coefficients

| Surface # | 1 | 2 | 3 | 4 | 5 | 6 |
|---|---|---|---|---|---|---|
| k = | −7.2836E+00 | −8.6845E+00 | −9.0513E+00 | 5.9745E+01 | 9.3818E+00 | 1.5863E−02 |
| A4 = | 1.2146E−03 | 1.6010E−03 | −2.6120E−03 | 4.4887E−03 | −3.4946E−03 | −9.4626E−04 |
| A6 = | −7.5021E−05 | −1.5249E−04 | 2.5919E−04 | 6.2599E−04 | 1.4167E−03 | 4.7852E−04 |
| A8 = | 1.9047E−06 | 5.3292E−06 | 3.1332E−05 | 7.0534E−05 | −8.2570E−05 | −5.0379E−05 |

| Surface # | 8 | 9 | 10 | 11 | 12 | 13 |
|---|---|---|---|---|---|---|
| k = | 9.9000E+01 | 2.5704E+00 | −7.7425E−02 | −7.9331E+00 | −4.0841E+00 | −3.0253E+01 |
| A4 = | −3.9721E−03 | −7.3677E−03 | −4.0832E−03 | −8.2878E−03 | 4.0676E−03 | 1.8357E−02 |
| A6 = | 1.6255E−04 | 3.7219E−04 | −2.8585E−05 | 7.9719E−04 | −1.0176E−03 | −2.1162E−03 |
| A8 = | −4.4131E−06 | −1.4730E−05 | 2.1573E−05 | −2.8435E−05 | 9.1439E−05 | 1.1719E−04 |
| A10 = | | | −1.1332E−06 | 2.4806E−07 | −2.6786E−06 | −1.2573E−06 |

In the 13th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 13th embodiment, so an explanation in this regard will not be provided again.

Moreover, these parameters can be calculated from Table 25 and Table 26 as the following values and satisfy the following conditions:

| 13th Embodiment | | | |
|---|---|---|---|
| f [mm] | 4.91 | f/R9 | 1.15 |
| Fno | 1.75 | f/R3 + f/R4 | −1.23 |
| HFOV [deg.] | 34.0 | T12/f | 0.36 |
| tan(HFOV) | 0.67 | f/f1 | 0.03 |
| (V2 + V6)/2 | 19.48 | f2/f1 | −0.06 |
| 10 × Fno/V5 | 0.31 | (|P1| + |P2| + |P3| + |P4|)/(|P5| + |P6|) | 0.50 |
| (N1 + N3)/2 | 1.777 | SL/TL | 0.67 |
| T23/T12 | 0.33 | SD62/SD11 | 0.69 |
| ΣCT/ΣAT | 1.93 | (2 × SD62)/EPD | 2.03 |
| (R9 + R10)/(R9 − R10) | 0.23 | Yp62/f | 0.15 |
| (R11 + R12)/(R11 − R12) | −1.89 | SAG52/SAG61 | 0.96 |

14th Embodiment

Figure 31:
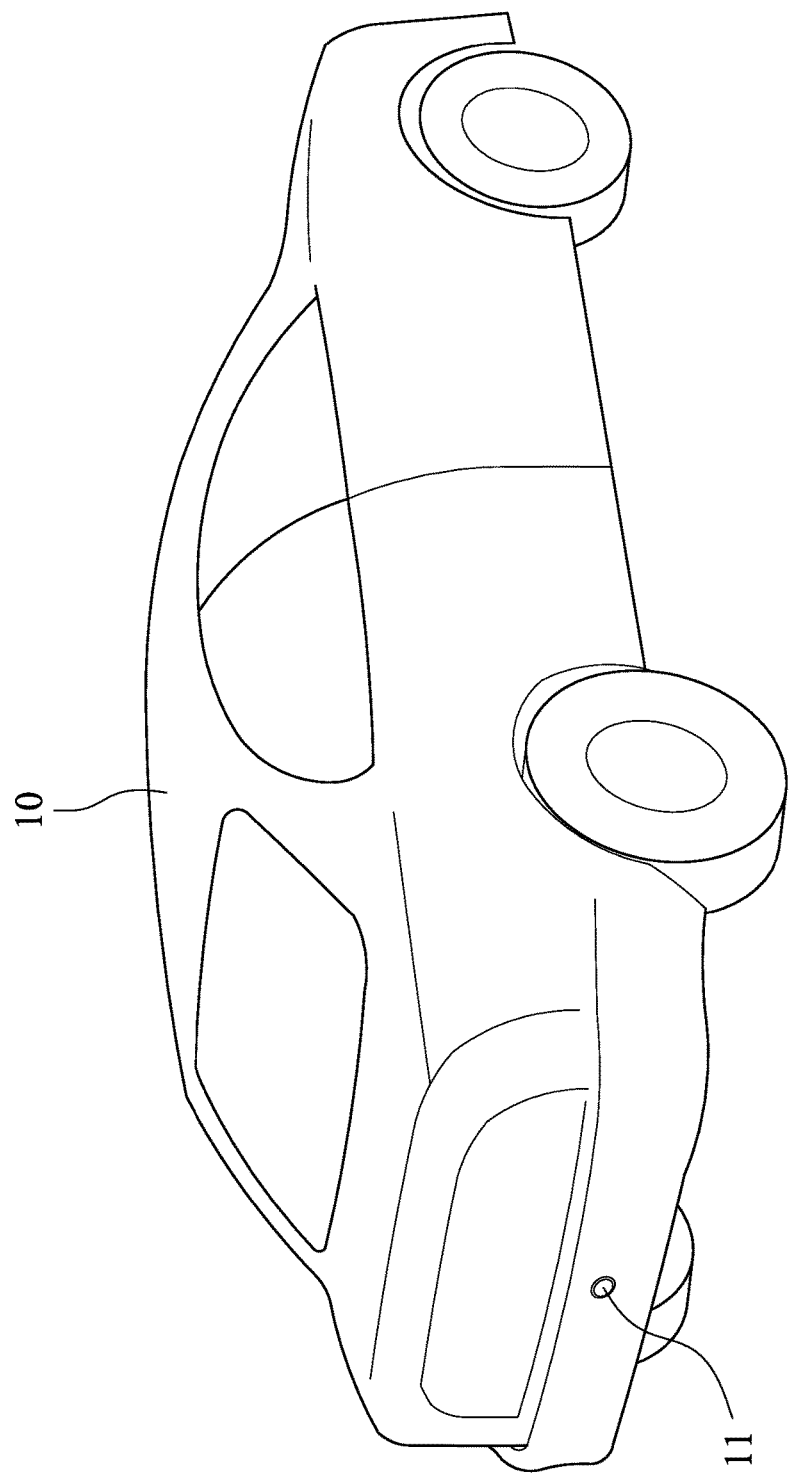
FIG. 31 is a schematic view of an electronic device according to the 14th embodiment of the present disclosure.

FIG. 31 is a schematic view of an electronic device 10 according to the 14th embodiment of the present disclosure. According to the 14th embodiment, the electronic device 10 is a rearview camera system, the electronic device 10 includes an image capturing apparatus 11, the image capturing apparatus 11 includes an optical image assembly according to the present disclosure (its reference numeral is omitted) and an image sensor (its reference numeral is omitted), wherein the image sensor is disposed on an image surface of the optical image assembly.

15th Embodiment

Figure 32:
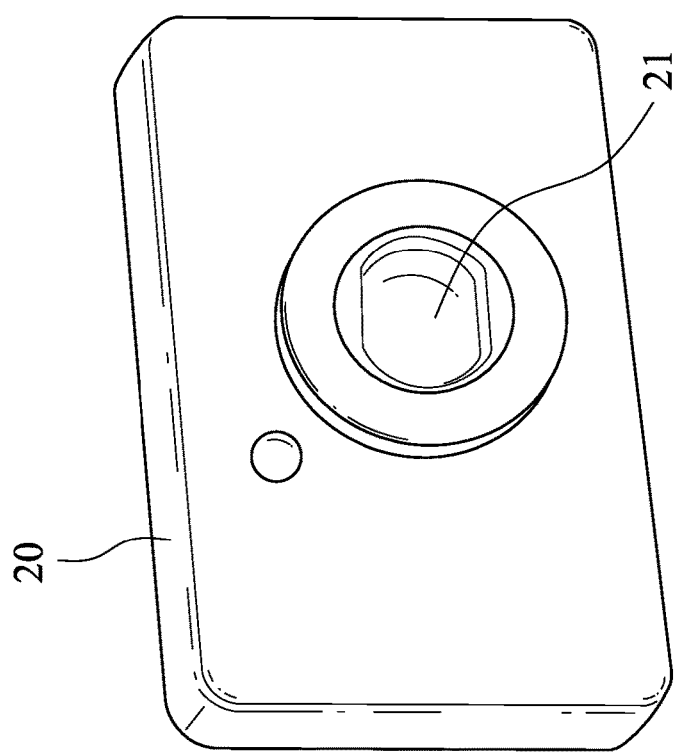
FIG. 32 is a schematic view of an electronic device according to the 15th embodiment of the present disclosure.

FIG. 32 is a schematic view of an electronic device 20 according to the 15th embodiment of the present disclosure. According to the 15th embodiment, the electronic device 20 is a driving recording system, the electronic device 20 includes an image capturing apparatus 21, the image capturing apparatus 21 includes an optical image assembly according to the present disclosure (its reference numeral is omitted) and an image sensor (its reference numeral is omitted), wherein the image sensor is disposed on an image surface of the optical image assembly.

16th Embodiment

Figure 33:
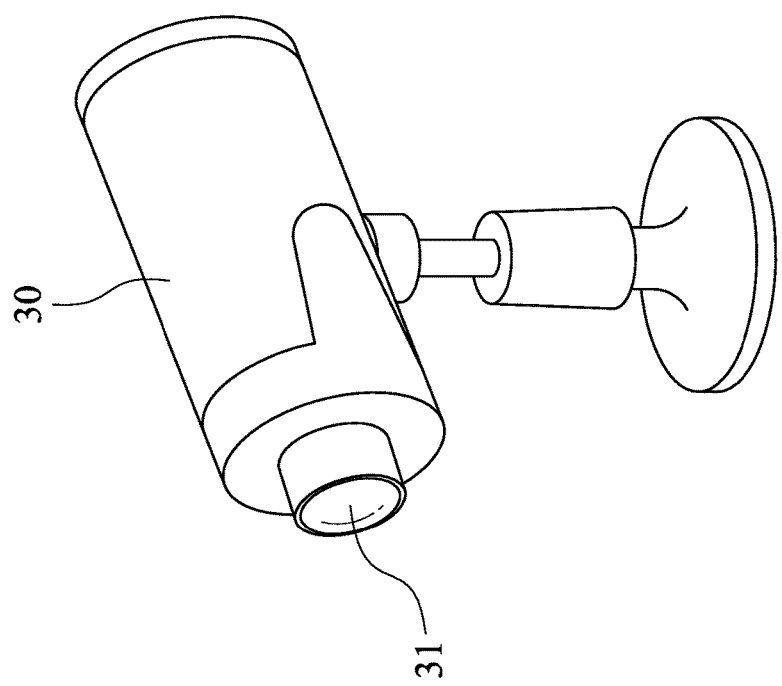
FIG. 33 is a schematic view of an electronic device according to the 16th embodiment of the present disclosure.

FIG. 33 is a schematic view of an electronic device 30 according to the 16th embodiment of the present disclosure. The electronic device 30 of the 16th embodiment is a surveillance device, wherein the electronic device 30 includes an image capturing apparatus 31. The image capturing apparatus 31 includes an optical image assembly (its reference numeral is omitted) according to the present disclosure and an image sensor (its reference numeral is omitted), wherein the image sensor is disposed on an image surface of the optical image assembly.

The foregoing description, for purpose of explanation, has been described with reference to specific embodiments. It is to be noted that Tables 1-26 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image assembly comprising six lens elements, the six lens elements being, in order from an object side to an image side:
    a first lens element;
    a second lens element with negative refractive power having an object-side surface being concave in a paraxial region thereof and an image-side surface being convex in a paraxial region thereof;
    a third lens element having positive refractive power;
    a fourth lens element having positive refractive power;
    a fifth lens element having positive refractive power; and
    a sixth lens element having negative refractive power;
    wherein a sum of central thicknesses of the lens elements of the optical image assembly is $\Sigma CT$, a sum of axial distances between every two of the lens elements of the optical image assembly that are adjacent to each other is $\Sigma AT$, a focal length of the first lens element is f1, a focal length of the second lens element is f2, a focal length of the optical image assembly is f, a curvature radius of an object-side surface of the fifth lens element is R9, and the following conditions are satisfied:

$1.90 \leq \Sigma CT/\Sigma AT < 4.50;$ $-0.38 < f2/f1 < 15.0;$ and $-1.30 < f/R9 < 5.0.$ 2. The optical image assembly of claim 1, wherein the focal length of the optical image assembly is f, the focal length of the first lens element is f1, and the following condition is satisfied:

$-0.95 < f/f1 < 0.40.$

3. The optical image assembly of claim 1, further comprising:
    an aperture stop, wherein an axial distance between the aperture stop and an image surface is SL, an axial distance between an object-side surface of the first lens element and the image surface is TL, and the following condition is satisfied:

$0 < SL/TL < 0.75.$

4. The optical image assembly of claim 1, wherein an axial distance between the first lens element and the second lens element is T12, an axial distance between the second lens element and the third lens element is T23, and the following condition is satisfied:

$0.01 < T23/T12 < 0.40.$

5. The optical image assembly of claim 1, wherein the focal length of the first lens element is f1, the focal length of the second lens element is f2, the focal length of the optical image assembly is f, the curvature radius of the object-side surface of the fifth lens element is R9, and the following conditions are satisfied:

$-0.25 < f2/f1 < 8.50;$ and $-0.90 < f/R9 < 3.50.$

6. The optical image assembly of claim 1, wherein the focal length of the first lens element is f1, the focal length of the second lens element is f2, the focal length of the optical image assembly is f, the curvature radius of the object-side surface of the fifth lens element is R9, and the following conditions are satisfied:

$-0.10 < f2/f1 < 4.50;$ and $-0.50 < f/R9 < 2.0.$

7. The optical image assembly of claim 1, wherein an Abbe number of the second lens element is V2, an Abbe number of the sixth lens element is V6, and the following condition is satisfied:

$0 < (V2+V6)/2 < 25.0.$

8. The optical image assembly of claim 1, wherein an f-number of the optical image assembly is Fno, an Abbe number of the fifth lens element is V5, and the following condition is satisfied:

$0.10 < 10 \times Fno/V5 < 0.35.$

9. The optical image assembly of claim 1, wherein a maximum effective radius of an object-side surface of the first lens element is SD11, a maximum effective radius of the image-side surface of the sixth lens element is SD62, and the following condition is satisfied:

$0.10 < SD62/SD11 < 0.95.$

10. The optical image assembly of claim 1, wherein a maximum effective radius of the image-side surface of the sixth lens element is SD62, an entrance pupil diameter of the optical image assembly is EPD, and the following condition is satisfied:

$1.35<(2\times SD62)/EPD<2.30.$

11. The optical image assembly of claim 1, wherein at least one of the lens elements has an object-side surface and an image-side surface being both aspheric, a half of a maximum field of view of the optical image assembly is HFOV, and the following condition is satisfied:

$0.35<\tan(HFOV)<1.0.$

12. The optical image assembly of claim 1, wherein at least one of the lens elements has at least one surface comprising at least one inflection point.

13. An image capturing apparatus, comprising:
the optical image assembly of claim 1; and
an image sensor, wherein the image sensor is disposed on an image surface of the optical image assembly.

14. An electronic device, comprising:
the image capturing apparatus of claim 13.

15. An optical image assembly comprising six lens elements, the six lens elements being, in order from an object side to an image side:
a first lens element having negative refractive power;
a second lens element with negative refractive power having an object-side surface being concave in a paraxial region thereof and an image-side surface being convex in a paraxial region thereof;
a third lens element having positive refractive power;
a fourth lens element having positive refractive power;
a fifth lens element having positive refractive power; and
a sixth lens element having negative refractive power;
wherein a focal length of the optical image assembly is f, a curvature radius of the object-side surface of the second lens element is R3, a curvature radius of the image-side surface of the second lens element is R4, a curvature radius of an object-side surface of the fifth lens element is R9, a curvature radius of an image-side surface of the fifth lens element is R10, and the following conditions are satisfied:

$-9.0<f/R3+f/R4<-1.10;$ and $-1.80<(R9+R10)/(R9-R10)<1.80.$

16. The optical image assembly of claim 15, wherein the fifth lens element has the image-side surface being convex in a paraxial region thereof, and the sixth lens element has an object-side surface being concave in a paraxial region thereof.

17. The optical image assembly of claim 15, wherein a displacement in parallel with an optical axis from an axial vertex on the image-side surface of the fifth lens element to a maximum effective radius position on the image-side surface of the fifth lens element is SAG52, a displacement in parallel with an optical axis from an axial vertex on an object-side surface of the sixth lens element to a maximum effective radius position on the object-side surface of the sixth lens element is SAG61, and the following condition is satisfied:

$1.0<SAG52/SAG61<2.30.$

18. The optical image assembly of claim 15, wherein at least one of the lens elements has at least one surface comprising at least one inflection point, a curvature radius of an object-side surface of the sixth lens element is R11, a curvature radius of an image-side surface of the sixth lens element is R12, and the following condition is satisfied:

$-4.50<(R11+R12)/(R11-R12)<-0.30.$

19. The optical image assembly of claim 15, wherein an axial distance between the first lens element and the second lens element is T12, the focal length of the optical image assembly is f, and the following condition is satisfied:

$0<T12/f<0.95.$

20. The optical image assembly of claim 15, wherein a refractive power of the first lens element is P1, a refractive power of the second lens element is P2, a refractive power of the third lens element is P3, a refractive power of the fourth lens element is P4, a refractive power of the fifth lens element is P5, a refractive power of the sixth lens element is P6, and the following condition is satisfied:

$(|P1|+|P2|+|P3|+|P4|)<1.65.$

21. The optical image assembly of claim 15, wherein the focal length of the optical image assembly is f, the curvature radius of the object-side surface of the second lens element is R3, the curvature radius of the image-side surface of the second lens element is R4, and the following condition is satisfied:

$-7.5<f/R3+f/R4<-1.50.$

22. The optical image assembly of claim 15, wherein an Abbe number of the second lens element is V2, an Abbe number of the sixth lens element is V6, and the following condition is satisfied:

$0<(V2+V6)/2<25.0.$

23. The optical image assembly of claim 15, wherein a refractive index of the first lens element is N1, a refractive index of the third lens element is N3, and the following condition is satisfied:

$1.750<(N1+N3)/2.$

24. An optical image assembly comprising six lens elements, the six lens elements being, in order from an object side to an image side:
a first lens element;
a second lens element with negative refractive power having an object-side surface being concave in a paraxial region thereof and an image-side surface being convex in a paraxial region thereof;
a third lens element having positive refractive power;
a fourth lens element having positive refractive power;
a fifth lens element having positive refractive power; and
a sixth lens element with negative refractive power having an image-side surface being convex in a paraxial region thereof, wherein the image-side surface of the sixth lens element comprises a concave shape in an off-axial region thereof.

25. The optical image assembly of claim 24, wherein a vertical distance between an inflection point closest to an optical axis on the image-side surface of the sixth lens element and the optical axis is Yp62, a focal length of the optical image assembly is f, and the following condition is satisfied:

$0<Yp62/f<1.0.$

* * * * *